United States Patent [19]

Elad et al.

[11] Patent Number: 5,428,712
[45] Date of Patent: Jun. 27, 1995

[54] SYSTEM AND METHOD FOR REPRESENTING AND SOLVING NUMERIC AND SYMBOLIC PROBLEMS

[75] Inventors: Joseph B. Elad, Claymont; Apperson H. Johnson, Wilmington, both of Del.; Laurence A. Kramer, North East, Md.; Jeffrey C. Kirk, Newtown Square, Pa.; Irene H. Philips, New Castle, Del.; Susan M. Zickus, Wilmington, Del.; Daniel L. Chester, Newark, Del.; Erwin M. Saniga, Little Britain; William M. Norman, III, Landenberg, both of Pa.

[73] Assignee: Quantum Development Corporation, Claymont, Del.

[21] Appl. No.: 980,282

[22] Filed: Nov. 23, 1992

Related U.S. Application Data

[63] Continuation of Ser. No. 546,447, Jul. 2, 1990, Pat. No. 5,195,172.

[51] Int. Cl.[6] .............................................. G06F 15/18
[52] U.S. Cl. ...................................... 395/51; 395/600; 395/11
[58] Field of Search ........................ 395/51, 12, 11, 62, 395/925, 600, 53

[56] References Cited

U.S. PATENT DOCUMENTS

| | | | |
|---|---|---|---|
| 4,788,538 | 11/1988 | Klein et al. | 340/747 |
| 4,866,634 | 9/1989 | Reboh et al. | 364/513 |
| 4,918,620 | 4/1990 | Ulug | 364/513 |
| 5,051,932 | 9/1991 | Inoue et al. | 364/550 |
| 5,182,793 | 1/1993 | Alexander et al. | 395/13 |

OTHER PUBLICATIONS

Skalak, D. B., "Options for Controlling Mixed Paradigm Systems," Proceedings of a Workshop on Case--Based Reasoning, 1989, 318-323.

Badie, et al, "Operations Research and Artificial Intelligence Cooperation to Solve Scheduling Problems," IEE Conf. on Expert Planning Systems, 27-29 Jun. 1990, 1-5.

"Business Wits" (Promotional Documentation), Mar. 1990.

Dhar, et al, "Integer Programming vs Expert Systems: An Experimental Comparison," Communications of the ACM, 33 (3), Mar. 1990, 323-336.

Gelernter, et al, "Spending Your Free Time," Byte, May 1990, 213-214, 216-219.

Rissland, et al, "Combining Case-Based and Rule--Based Reasoning: A Heuristic Approach," IJCAI, 1989, 524-530.

Winston, et al, LISP, Addison-Wesley Publishing Co., Chapt. 22, "Implementing Frames," 1981, 291-301.

Haberman, et al, Ada for Experienced Programmers, Addison-Wesley, Pub. 1983, 275-295.

Charniak, et al., Artificial Intelligence Programming, Lawrence Erlbaum Assoc., 1987, 230-303.

McClelland, et al, Explorations in Parallel Distributed Processing: A Handbook of Models Programs, Exercises, MIT Press, 1988, pp. 2, 3, 137-145.

Piersol, K. W., "Object Oriented Spreadsheets: The Analytic Spreadsheet Package" OOPSLA 86 Proceedings, Sep. 1986, 385-390.

Lowrie et al, "Learning Heuristic Functions for Numeric Optimization Problems," Twelfth Intl. Compt. Software and Appl. Conf., Oct. 1988, 443-450.

Winters et al, "Heuristic Versus Optimization Methods for Solving Muscle Load-Sharing Problems," Proc.

(List continued on next page.)

Primary Examiner—Robert W. Downs
Attorney, Agent, or Firm—Banner, Birch, McKie & Beckett

[57] ABSTRACT

A system and method for representing and solving problems allows a user to enter objects and attributes, and to form a table of at least two dimensions having object-attribute pairs. An object hierarchy is then implemented using the entered objects. A score is maintained reflecting how closely the constraints of a particular problem are to being satisfied and the degree of progress in the direction of stated objectives of the problem.

30 Claims, 33 Drawing Sheets

OTHER PUBLICATIONS

Ann. Intl. Conf. of the IEEE Engr. in Med. & Bio. Soc., Nov. 1988, 1726, 1727.

Carr, C., "Spreadsheet Sketches for Rule-based Systems," AI Expert, Nov. 1989, 30-35.

Barr, et al., The Handbook of Artificial Intelligence vol. IV, Addison-Wesley Pub., 1989, 4-17.

Yakowitz, et al., An Introduction to Numerical Computations, Macmillan Publishing Company, New York, Chapter 3.2, "Numerical Differentiation," pp. 80-84 (1986).

Donnelly, Robert A., Jr., "Expert Systems in Aggregate Production Planning," University of Delaware dissertation (1987).

Guru (Promotional Document), Aug., 1987.

Simon, "Two Heads Are Better Than One: The Collaboration Between AI and OR," Interfaces, 17:8-15 (1987).

Fletcher, R., Practical Methods of Optimization, 2nd ed., John Wiley & Sons, Ltd., pp. 140-142 (1987).

Fischer, et al., "Knowledge-Based Spreadsheets," Proc. AAAI-88 Seventh National Conference on Artificial Intelligence, pp. 802-807, Aug., 1988.

Lee, J. S., "Structure Frame Based Model Management System," University of Pennsylvania (Wharton) dissertation, Abstract and Chapter 1 (1988).

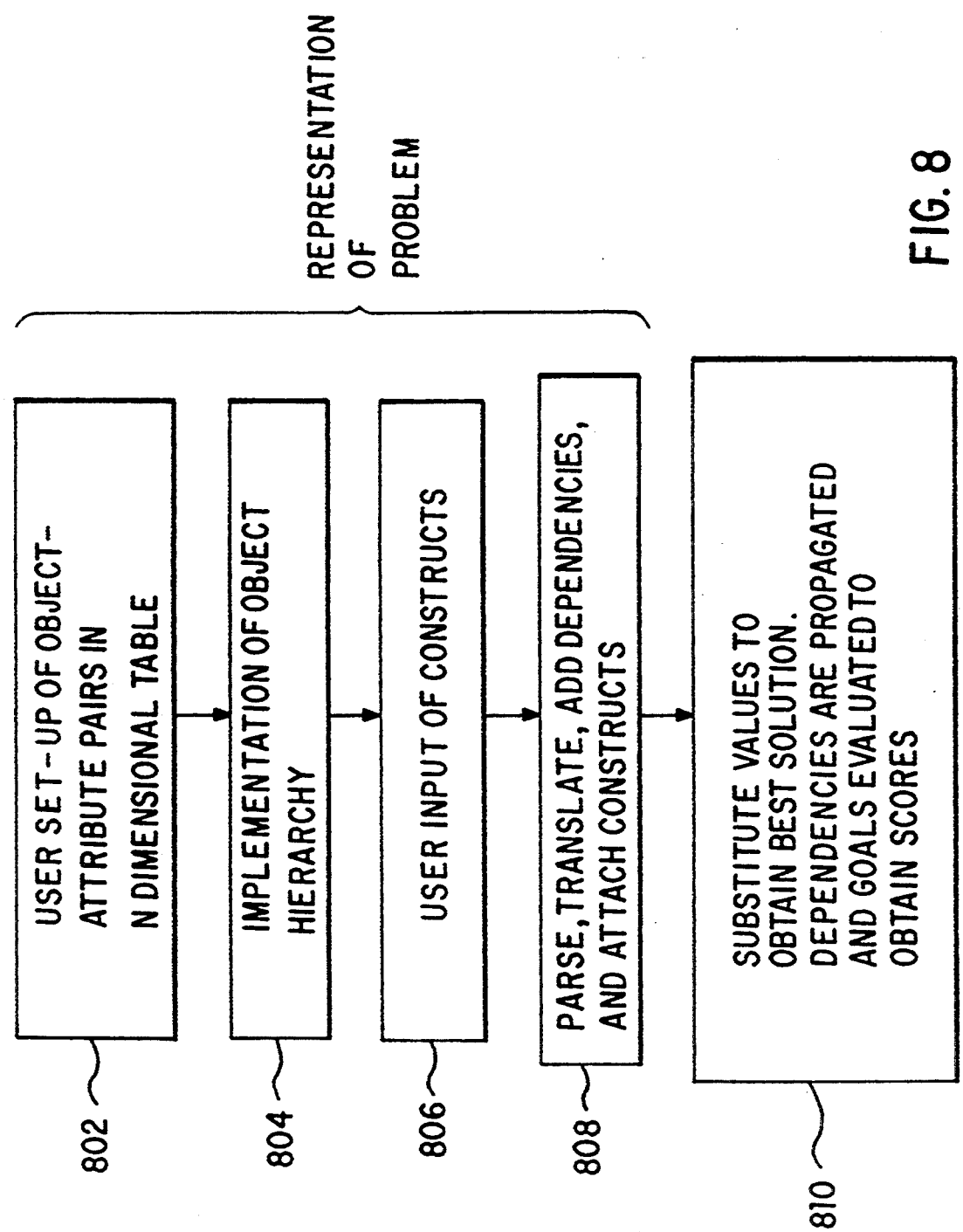

| FILE | EDIT | FORMAT | VIEW | SOLVE | DATA | GRAPH | OPTIONS | HELP | | |
|---|---|---|---|---|---|---|---|---|---|---|

PROJECT ─────────────────── (CAPITAL BUDGETING) ───────────────

| PROJECTS> | p1 | p2 | p3 | p4 | p5 | p6 | p7 | p8 | p9 | p10 |
|---|---|---|---|---|---|---|---|---|---|---|
| REVENUE | 280 | 160 | 130 | 240 | 680 | 715 | 310 | 110 | 420 | 328 |
| COST | 200 | 80 | 32 | 160 | 355 | 486 | 201 | 51 | 114 | 186 |
| TAKEN | NO | NO | NO | NO | NO | NO | NO | NO | NO | NO |
| COUNTRY | JAPAN | CHINA | FRG | BELG | AFGHA | CHINA | FRANC | IRAN | FRG | JAPAN |
| WAR-RISK | 0.00 | 0.00 | 0.00 | 0.00 | 0.00 | 0.00 | 0.00 | 0.50 | 0.00 | 0.00 |

PROJ-SUM ──────────────────── (SUMMARY DATA) ────────────────

| SUMMARY | T_REVENUE | T_COST | RETURN | RISK | RR-RATIO | FEE | NP |
|---|---|---|---|---|---|---|---|
| SUMM | 0 | 0 | 0 | 101 | 0 | 0 | 0 |

FIG. 24

| FILE | EDIT | FORMAT | VIEW | SOLVE | DATA | GRAPH | OPTIONS | HELP |
|------|------|--------|------|-------|------|-------|---------|------|

―PROJEC───────────────────────────────────────────────〈CAPITAL BUDGETING〉―

| CELLS | | p3 | p4 | p5 | p6 | p7 | p8 | p9 | p10 |
|-------|--|----|----|----|----|----|----|----|-----|
| PROJEC | | | | | | | | | |
| REVENUE > FORMULA ^F | | 130 | 240 | 680 | 715 | 310 | 110 | 420 | 328 |
| COST     TRIGGERS ^T | | 32 | 160 | 355 | 486 | 201 | 51 | 114 | 186 |
| TAKEN   CRITICS ^I | | NO | NO | NO | NO | NO | NO | NO | NO |
| COUNTRY RULES ^U | | FRG | BELG | AFGHA | CHINA | FRANC | IRAN | FRG | JAPAN |
| WAR-RIS | | 0.00 | 0.00 | 0.00 | 0.00 | 0.00 | 0.00 | 0.00 | 0.00 |

OBJECTIVES ^ O

― ENTER FORMULA FOR ALL SUMMARY OR SUMM SPECIFICALLY ─────
RISK := 101 - np ^ 2 + TOTAL PROJECT.WAR-RISK

FIG.25

| FILE | EDIT | FORMAT | VIEW | SOLVE | DATA | GRAPH | OPTIONS | HELP | |
|---|---|---|---|---|---|---|---|---|---|
| PROJEC | | | | | | | | —(CAPITAL BUDGETING)— | |
| PROJEC | CELLS | | p3 | p4 | p5 | p6 | p7 | p8 | p9 | p10 |
| REVENUE | FORMULAS ^F | | 130 | 240 | 680 | 715 | 310 | 110 | 420 | 328 |
| COST | >TRIGGERS ^T | | 32 | 160 | 355 | 486 | 201 | 51 | 114 | 186 |
| TAKEN | CRITICS ^I | | NO | NO | NO | NO | NO | NO | NO | NO |
| COUNTRY | RULES ^U | | FRG | BELG | AFGHA | CHINA | FRANC | IRAN | FRG | JAPAN |
| WAR-RIS | | | 0.00 | 0.00 | 0.00 | 0.00 | 0.00 | 0.00 | 0.00 | 0.00 |
| OBJECTIVES ^O | | | | | | | | | | |

—ENTER TRIGGER FOR ALL PROJECTS OR FOR P1 SPECIFICALLY—
TAKEN => IF TAKEN IS"NO" THEN WAR-RISK :=0

FIG.26

| FILE | EDIT | FORMAT | VIEW | SOLVE | DATA | GRAPH | OPTIONS | HELP |
|------|------|--------|------|-------|------|-------|---------|------|

┌─PROJEC─────────────┐
│ CELLS              │
│   FORMULAS ^F      │
│   TRIGGERS ^T      │
│   CRITICS  ^I      │
│  >RULES    ^U      │
│ ─────────────────  │
│   OBJECTIVES ^O    │
└────────────────────┘

─────────────────────────────────(CAPITAL BUDGETING)─

|         | p3   | p4   | p5    | p6    | p7    | p8   | p9   | p10   |
|---------|------|------|-------|-------|-------|------|------|-------|
| PROJEC  |      |      |       |       |       |      |      |       |
| REVENUE | 130  | 240  | 680   | 715   | 310   | 110  | 420  | 328   |
| COST    | 32   | 160  | 355   | 486   | 201   | 51   | 114  | 186   |
| TAKEN   | NO   | NO   | NO    | NO    | NO    | NO   | NO   | NO    |
| COUNTRY | FRG  | BELG | AFGHA | CHINA | FRANC | IRAN | FRG  | JAPAN |
| WAR-RIS | 0.00 | 0.00 | 0.00  | 0.00  | 0.00  | 0.00 | 0.00 | 0.00  |

─ ENTER RULE ─
IF TAKEN IS EQUAL TO 'YES' & ?Z IS ASSIGNED TO COUNTRY & !?Z.WAR IS 'NO'
THEN WAR-RISK BECOMES ZERO

FIG.27

| FILE | EDIT | FORMAT | VIEW | SOLVE | DATA | GRAPH | OPTIONS | HELP | |
|---|---|---|---|---|---|---|---|---|---|
| ┌PROJEC──────────┐ | | | | | | | | —(CAPITAL BUDGETING)— | |
| │ PROJEC │ | | p3 | p4 | p5 | p6 | p7 | p8 | p9 | p10 |
| │ CELLS │ | | | | | | | | | |
| │ FORMULAS ^F │ REVENUE | 130 | 240 | 680 | 715 | 310 | 110 | 420 | 328 |
| │ TRIGGERS ^T │ COST | 32 | 160 | 355 | 486 | 201 | 51 | 114 | 186 |
| │ >CRITICS ^I │ TAKEN | NO | NO | NO | NO | NO | NO | NO | NO |
| │ RULES ^U │ COUNTRY | FRG | BELG | AFGHA | CHINA | FRANC | IRAN | FRG | JAPAN |
| │ OBJECTIVES ^O │ WAR-RIS | 0.00 | 0.00 | 0.00 | 0.00 | 0.00 | 0.00 | 0.00 | 0.00 |
| └─────────────────┘ | | | | | | | | | |

─ENTER CRITIC──────────────────────────────────────────
IF  (P3, TAKEN IS "YES")
 &  (P4, TAKEN IS "YES")
THEN SAY THE REVENUE OF P4 IS REDUCED TO $220000 SINSE BOTH P1 AND P4 ARE
TAKEN

FIG.28

| FILE | EDIT | FORMAT | VIEW | SOLVE | DATA | GRAPH | OPTIONS | HELP | |
|------|------|--------|------|-------|------|-------|---------|------|---|
| | | | | | | | | —(CAPITAL BUDGETING)— | |
| PROJEC | | CELLS | | | | | | | |
| PROJEC | | | | p3 | p4 | p5 | p6 | p7 | p8 | p9 | p10 |
| REVENU | | FORMULAS ^F | | 130 | 240 | 680 | 715 | 310 | 110 | 420 | 328 |
| COST | | TRIGGERS ^T | | 32 | 160 | 355 | 486 | 201 | 51 | 114 | 186 |
| TAKEN | | CRITICS ^I | | NO | NO | NO | NO | NO | NO | NO | NO |
| COUNTR | | RULES ^U | | FRG | BELG | AFGHA | CHINA | FRANC | IRAN | FRG | JAPAN |
| WAR-RI | | OBJECTIVES ^O | | 0.00 | 0.00 | 0.00 | 0.00 | 0.00 | 0.00 | 0.00 | 0.00 |

— ENTER OBJECTIVE
CRITICAL MAXIMIZE RR-RATIO

FIG.29

| FILE | EDIT | FORMAT | VIEW | SOLVE | DATA | GRAPH | OPTIONS | HELP |

PROJEC────────────────────────────(CAPITAL BUDGETING)

| PROJEC | | | p3 | p4 | p5 | p6 | p7 | p8 | p9 | p10 |
|---|---|---|---|---|---|---|---|---|---|---|
| CELLS | | | | | | | | | | |
| REVENUE | FORMULA | ^F | 130 | 240 | 680 | 715 | 310 | 110 | 420 | 328 |
| COST | TRIGGERS | ^T | 32 | 160 | 355 | 486 | 201 | 51 | 114 | 186 |
| TAKEN | CRITICS | ^I | NO | NO | NO | NO | NO | NO | NO | NO |
| COUNTRY | RULES | ^U | FRG | BELG | AFGHA | CHINA | FRANC | IRAN | FRG | JAPAN |
| WAR-RIS | OBJECTIVES | ^O | 0.00 | 0.00 | 0.00 | 0.00 | 0.00 | 0.00 | 0.00 | 0.00 |

ENTER TARGET
T_COST >= 1000

FIG. 30

FILE   EDIT   FORMAT   VIEW   SOLVE   DATA   GRAPH   OPTIONS   HELP

PROJECT

|  | p1 | p2 | p3 | p4 | p5 | p6 | p7 | OBJECTIVES: +27% |  |
|---|---|---|---|---|---|---|---|---|---|
| PROJECTS> |  |  |  |  |  |  |  | TARGETS ; SATISFIED |  |
| REVENUE | 280 | 160 | 130 | 220 | 680 | 715 | 310 | 110 | 420 | 328 |
| COST | 200 | 80 | 32 | 160 | 355 | 389 | 201 | 51 | 114 | 186 |
| TAKEN | YES | YES | YES | YES | YES | NO | NO | YES | YES | YES |
| COUNTRY | JAPAN | CHINA | FRG | BELG | AFGHA | CHINA | FRANC | IRAN | FRG | JAPAN |
| WAR-RISK | 0.00 | 0.50 | 0.00 | 0.00 | 1.00 | 0.00 | 0.50 | 0.50 | 0.00 | 0.00 |

PROJ-SUM ─────────────────────────────────────────(SUMMARY DATA)

|  | T_REVENUE | T_COST | RETURN | RISK | RR-RATIO | FEE | NP |
|---|---|---|---|---|---|---|---|
| SUMMARY SUMM | 2328 | 1148 | 820 | 39 | 21 | 360 | 8 |

FIG.31

| FILE | EDIT | FORMAT | VIEW | SOLVE | DATA | GRAPH | OPTIONS | HELP |
|------|------|--------|------|-------|------|-------|---------|------|

─PROJEC─────────────────────────────────────────(CAPITAL BUDGETING)─

| PROJEC | | p3 | p4 | p5 | p6 | p7 | p8 | p9 | p10 |
|--------|--|----|----|----|----|----|----|----|----|
| CELLS | | | | | | | | | |
| REVENUE | FORMULA ^F | 130 | 240 | 680 | 715 | 310 | 110 | 420 | 328 |
| COST | TRIGGERS ^T | 32 | 160 | 355 | 389 | 201 | 51 | 114 | 186 |
| TAKEN | CRITICS ^I | YES | YES | YES | NO | NO | YES | YES | YES |
| COUNTRY | RULES ^U | FRG | BELG | AFGHA | CHINA | FRANC | IRAN | FRG | JAPAN |
| WAR-RIS | OBJECTIVES ^O | 0.00 | 0.00 | 1.00 | 0.00 | 0.00 | 0.50 | 0.00 | 0.00 |

── ADDING PROJECT DIMENSION 3

DIMENSION NAME: YEAR

OBJECTS: 1988 1989 1990

|        |      |   |    |    |     |     |
|--------|------|---|----|----|-----|-----|
|        |      |   |    |    | ACCEPT |  |
| SUMMARY | | | | | >OK | |
| SUMM | 2328 | 0 | 39 | 21 | 360 | CANCEL |

FIG.32

SYSTEM AND METHOD FOR REPRESENTING AND SOLVING NUMERIC AND SYMBOLIC PROBLEMS

The subject application is a continuation of U.S. patent application Ser. No. 07/546,447, filed Jul. 2, 1990, now U.S. Pat. No. 5,195,172 issued Mar. 16, 1993.

BACKGROUND TO THE INVENTION

1. Field of the Invention

This invention relates to a system and method for representing and solving complex problems. More specifically, the present invention relates to a system and method for representing said solving constraint satisfaction and optimization problems. Still more specifically, the invention relates to a system and method for representing and solving constraint satisfaction and optimization problems using an integrated combination of operations research and artificial intelligence techniques.

2. Related Art

Constraint satisfaction and optimization problems, in general terms, involve problems where an attempt is made to achieve certain goals, while maintaining the value of specified variables within designated boundaries. Although such problems have been studied for many years, many have long been considered very difficult if not impossible to represent and solve due to their complexity.

With the arrival of computer technology, it became possible to solve many of these previously unsolved problems. This was accomplished by customized computer programs that were developed to solve a specific problem or perhaps a particular class of constraint satisfaction and optimization problems. However, even with the advent of computers, many constraint satisfaction and optimization problems are still considered too difficult to easily and/or accurately represent and solve. One major reason for this relates to the present techniques used to represent and solve these problems.

There are two traditional approaches used to represent a constraint satisfaction and optimization problem. The first is a numerical approach used by mathematicians and those in the field of Operations Research (OR). This approach involves building mathematical models expressed in numerical terms using algebraic formulas or calculus.

The second traditional approach involves representing the problem symbolically. In other words, symbols, mnemonics, rules and predicates are used for expressing operations and operands, rather than mathematical equations. This approach is used by those working in the domain of artificial intelligence (AI), which is a discipline of the computer science field.

The approach that will work best for a particular problem will depend on the specific problem at issue. In general, each approach has advantages and disadvantages. An advantage of the numerical approach is that representation of a problem is concise, and has relatively little ambiguity. Also, there exist efficient procedures for solving some of the problems that can be expressed purely numerically.

A major disadvantage with the numerical approach is that many types of problems cannot be completely represented in the numerical form required by existing methods. When such a problem comes up, mathematicians in OR represent as much of the problem as possible numerically. That which they cannot represent numerically is temporarily ignored. After the represented portion of the problem is solved, the mathematicians ask themselves "what would the solution to the problem be if the previously ignored portions caused the problem to behave one way, or caused it to behave a different way, etc." Thus, the unrepresented portions of the problem cause the overall problem solving process to become one of trial-and-error. Such a process wastes much time and effort.

An advantage of the symbolic approach used in AI is that it is easier to represent certain types of problems which are more easily thought of symbolically (that is, in terms of rules and statements). An example of such a rule might look like "if Bob and Mary are married, schedule them to work on the same day." This type of problem, while easily represented symbolically, would be quite difficult to represent numerically.

The symbolic approach has some disadvantages versus the numerical approach. That is, it is difficult to apply numeric optimization procedures to a model which is stated in non-numeric terms. There are fewer general purpose procedures available for the solution of problems stated in terms of arbitrary predicates and rules.

In summary, the numerical approach more easily allows numerical components of a problem to be represented than the symbolic components, while with the symbolic approach, the symbolic components are more easily represented than the numerical components. Since real-world constraint satisfaction and optimization problems usually contain both symbolic and numerical components, what is needed is a single, "hybrid" approach which allows easy representation of problems having both of these components.

Although a single "hybrid" approach described above would be of great practical value, serious steps have not been taken toward developing a general purpose problem solver which can represent constraint satisfaction and optimization problems having both symbolic and numerical components. In most cases, such a hybrid approach has only been written about at the highest levels of conceptualization; see Simon, H. A., "Two Heads Are Better Than One: The Collaboration Between AI and OR", *Interfaces*, Pp. 8–15, July–August, (1987).

While the hybrid approach is still largely theoretical, there are a few examples where it has been implemented. However, these implementations relate only to the representation of specific problems. One example was used in a doctoral dissertation by Robert Donnelly at The University of Delaware (1988). Donnelly represented a problem called Aggregate Planning using a hybrid of numerical and symbolic approaches. This problem involved the scheduling of people, inventory, shifts, etc. As indicated above, the techniques Donnelly used to develop this representation only work for this particular problem. If the problem is changed slightly, the representation will no longer be effective, and a solution will not result.

Another example of implementation of the hybrid approach was reported in an article by Vasant Dhar; see Dhar, et al., "Integer Programming vs. Expert systems: An Experimental Comparison", *Communications of the ACM*, Pp. 323–336, March (1990). In this article, a hybrid approach was used to represent a specific employee scheduling problem. Again, this approach was not capable of being used to represent and ultimately solve other types of constraint satisfaction and optimization problems.

Thus, a tool which can easily represent many different types of problems having both numerical and symbolic components would be very useful. However, prior to the development of the present invention, no such general purpose tool has been available.

An example of an attempt to combine numerical and symbolic components is a product developed by mdbs, Inc., called Guru. Guru allows one to employ a spreadsheet environment (numerical component) as an interface to an expert system (symbolic component). However, because the expert system and spreadsheet portions are not homogeneously integrated, and because the product does not make use of OR techniques, it is still difficult, if not impossible, to represent and solve a multitude of constraint satisfaction and optimization problems. (There are commercial attempts to combine OR techniques and spreadsheet environment by providing add-on programs, which can solve linear programming, to commercial spreadsheets. An example of such an attempt is "What's Best" by General Optimization of Chicago, Ill. These attempts, which are targeted at making the representation of the problem easier, use only numerical (spreadsheet) components. They are also targeted at representing and solving a limited class of problems, such as linear programming problems).

In addition to the difficulties involved with representing a hybrid numerical/symbolic constraint satisfaction and optimization problem, the actual solving of such a problem is also very difficult. Traditionally, once such a problem is represented, an expert analyzes the problem and decides which of a multitude of algorithms is best suited to solve it.

At present, programs exist to assist in solving certain types of problems. These programs are generally neither readily available nor user-friendly. An example of such a program is "Lindo" by Linus Schrage at the University of Chicago (available from Scientific Press, Redwood City, Calif.). Lindo will solve a problem if it is real and linear, and some specific integer programming problems. Lindo cannot solve general integer programming problems. For these problems there are no efficient algorithms. That is, even for the best known algorithms, the solution time grows exponentially with the size of these problems.

If the problem to be solved is non-linear, it becomes even more difficult to find and use a single algorithm. Therefore, it may be desirable to use several different algorithms to completely solve a particular non-linear problem.

Automated analysis of a problem and selection of an appropriate algorithm to effect a solution has been set forth in a dissertation by Jae Sik Lee at the Wharton School of Business (1989). However, once an algorithm has been selected, it is not changed during the solving process. Thus, solving becomes inefficient, and in some cases impossible by this method, since different algorithms may need to be used at various stages of the solving process. This is especially true where the problem itself changes dynamically during the solution process as may occur when the model is refreshed by new sets of values from an on-line data source.

In addition to the difficulty with the selection of an algorithm to effect a solution to a problem, there is also a problem with managing constraint satisfaction and optimization problems which are infeasible. By infeasible, it is meant that the problem has no solution which satisfies every constraint. In the real world, many problems which people attempt to solve turn out to be infeasible. Nonetheless, even when a problem is infeasible, the designer of the problem would often want to have the "best" answer possible, even if there is no absolute solution.

An example of the type of problems which are often infeasible are problems to select stocks for purchase. The goal of this kind of problem might be to buy stocks with a high rate of return and a low risk. Depending upon how "high" and "low" are defined, this problem may have no solution, since there may be no stocks yielding a "high" enough return and having a "low" enough risk. Thus, when people model real problems, they often include constraints which make feasible solutions impossible.

In the field of OR, infeasibility is traditionally handled by having an expert remodel the problem and manually trying various mathematical techniques until a model of the problem can be created which admits a feasible solution. Thus, the approach is to modify the constraints of the problem until the problem becomes feasible. Using the above example, the rate of risk may be increased or the yield decreased until a stock is found to exist which provides a solution to the problem. However, in the business world, the "best" answer (best balanced solution) to the original infeasible problem may nonetheless be of great value. The difficulty is that the mathematical end of OR is very literal in nature, and is traditionally not concerned about partial or "best" answers. Either a feasible solution exists, or the result is deemed worthless. This philosophy and the general techniques used in OR are thus not conducive to solving infeasible problems.

The field of AI does not have the same kind of general techniques permeating through it the way that OR does, since the techniques used have been problem-specific. Thus, with AI, there are few pervading philosophies that would inhibit the search for "best" solutions where no feasible solutions exist. However, for the very reason that there are no traditional techniques or philosophies, it is still very difficult to solve infeasible problems.

In addition to being poorly equipped to handle infeasible problems, the traditional approaches of both AI and OR consider only one goal at a time. For example, consider the above-noted problem to find a stock having both a high rate of return and a low risk. This is an example of a problem having two goals. Traditionally, the way to solve such a problem is to concentrate on one goal at a time. Thus, one would either pick a level of risk and compute the stock having the highest rate of return, or pick a level of return and compute the stock having minimum risk. If both goals are not considered simultaneously, it becomes difficult to find an optimal solution of a complex problem (or a best balanced solution if the problem is infeasible). Business problems in particular often create a constant conflict between multiple goals.

Some specialized systems called "Multiple Goal Programming Systems" exist which are designed to solve problems with multiple goals. These systems require that weights be assigned to individual goals either from explicit information, or from direct user input. These systems are usually used as part of linear programming packages, and as such are not complete problem solving systems, nor would they be good for solving non-linear problems. In addition, a substantial amount of user interaction is required in interacting with the system. Consequently, these systems become very inefficient when dealing with large, complex problems.

Thus, what is needed is a robust problem solving tool which can efficiently represent and solve constraint satisfaction and optimization problems having both numerical and symbolic elements, involving both continuous and integer quantities, and involving any number of objectives and constraints, using a variety of problem solving techniques, and which can find an optimal solution to feasible problems or a best balanced solution to infeasible problems. The present invention provides such a tool.

SUMMARY OF THE INVENTION

In summary, the present invention is a system and method for (a) representing and (b) solving problems. A feature of the present invention is that the representation portion may be implemented and used separately and apart from the solving portion, and vice versa. With regard to representation of the problem, the present invention allows a user to enter objects and attributes, and to form a table of at least two dimensions having object-attribute pairs. An object hierarchy is then implemented using the entered objects. Arithmetic and logical relationships between object-attribute pairs can be defined by entering constructs (such as goals and formulas). Once entered, the constructs are parsed, translated, and then attached to an appropriate entity.

The present invention also allows the user to enter values into the object-attribute pairs. In addition, the constructs can cause specified object-attribute pairs to change in response to a change in value of some other object-attribute pair. Since a change in one object-attribute pair can have an effect on another, which can then affect another, etc., the present invention provides a mechanism for propagating these changes in a logical order.

The problem solving portion of this invention is designed to maintain a score which reflects both how closely constraints of a problem are to being satisfied and the degree of progress in the direction of the stated objectives of the problem. The invention then attempts to achieve the best possible result. To do this more quickly and efficiently, the present invention utilizes numerical methods called weak and strong methods. Further, the present invention uses heuristics to dynamically apply either or both of these methods, at times interleaving the two approaches.

The present invention is most effective and useful when both the representation and problem solving portions are used together in an integrated fashion.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which:

FIG. 8 is a diagram of the operation of the PRF.

FIG. 24 is an example of the tabular representation used in the present invention, and a Sample Problem.

FIG. 25 shows an example of a formula used in the Sample Problem.

FIG. 26 shows an example of a trigger used in the Sample Problem.

FIG. 27 shows an example of a rule used in the Sample Problem.

FIG. 28 shows an example of a critic used in the Sample Problem.

FIG. 29 shows an example of an objective used in the Sample Problem.

FIG. 30 shows an example of a target used in the Sample Problem.

FIG. 31 shows the Sample Problem being solved.

FIG. 32 shows a third dimension being added onto the Sample Problem.

DETAILED DESCRIPTION OF THE PREFERRED EMBODIMENTS

I. General Overview

Figure 1:
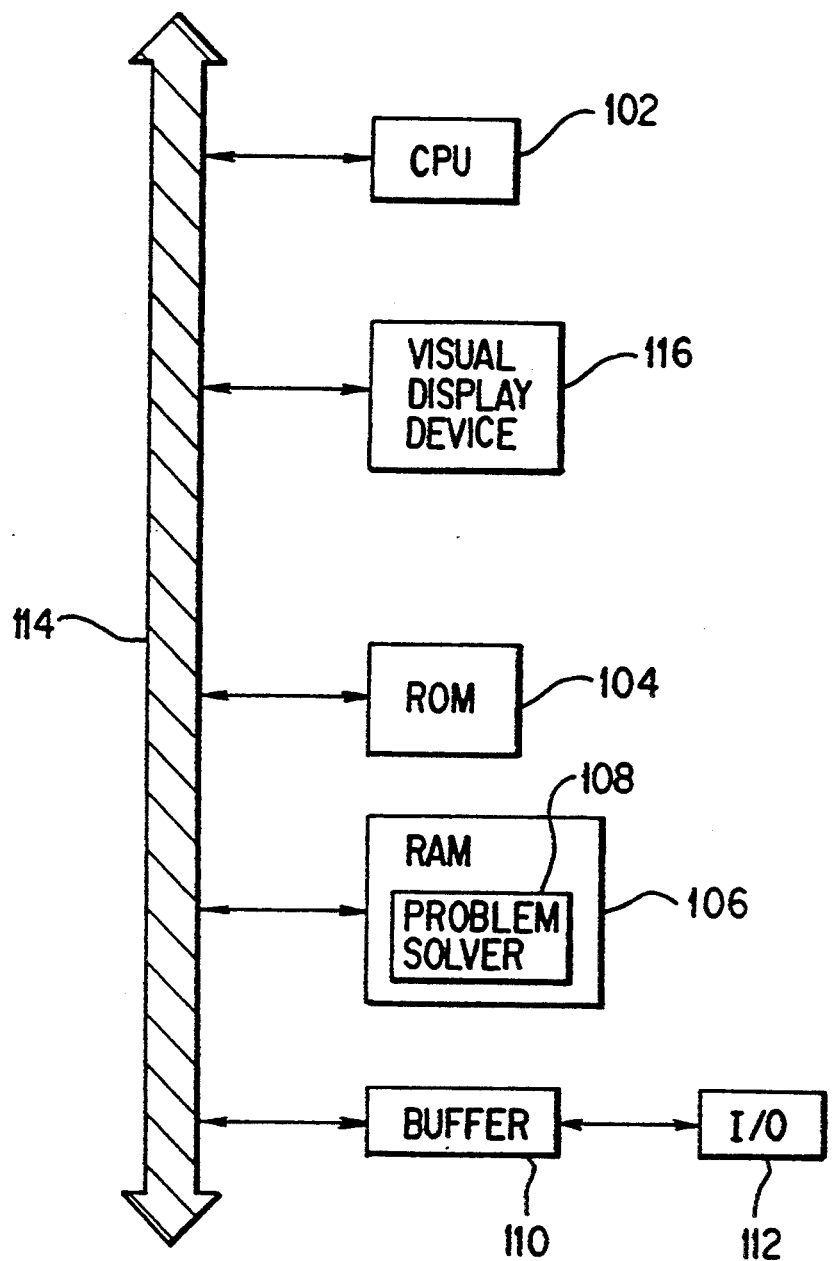
FIG. 1 is a high-level diagram of the environment of one embodiment of the present invention.

This invention relates to a system and method for (a) representing and (b) solving complex problems. More specifically, the present invention is capable of representing and solving constraint satisfaction and optimization problems having symbolic and numerical components.

It should be understood that the representation portion of this invention may be implemented separately from the problem solving portion, and vice versa. In general, the invention is most effective and advantageous when both the representation and the problem solving portions are used together in an integrated fashion.

One of the significant features of the present invention is that it is very robust, in that it will always provide a result to a problem. If the problem is infeasible, the present invention provides at least what it considers the "best balanced solution" (and can provide an optimum solution where possible, given enough time). As indicated above, the "best balanced solution" is the result that the present invention has calculated to be "closest" to solving the problem.

The present invention performs the above-noted function by viewing the constraints of a problem as something that can be violated. Thus, constraints are treated as goals rather than absolute guidelines. The present invention tries to get as close to the goals as it can, and will always come up with a result.

An advantage of treating constraints as goals is that it allows the present invention to violate these constraints. This allows the present invention to find solutions which may be somewhat outside the bounds of the constraints, but which a user would nevertheless find significant.

For example, assume that a problem to optimize production has as one constraint that a maximum of 200 man-hours per week can be used on a certain project. Also assume for purposes of this example that 205 man-hours would increase production by 25%, and that a user has indicated that the constraint of 200 man-hours is not a critical constraint. If constraints are never violated at all, then the fact that the extra 5 man-hours would increase production so dramatically would never be ascertained. The present invention allows these constraints to be violated when it detects that great improvement toward achieving goals would occur by doing so. The fact that the extra 5 man-hours produced such extreme results would probably be of great interest to a manager, even though the constraints set for the problem were somewhat violated.

Regarding infeasible problems, treating the constraints as goals also allows the present invention to obtain a best balanced solution. Where a problem is infeasible, the present invention will attempt to produce a result having a specified amount of variation from the goals (the goals for these problems being unattainable). Thus, to obtain the best balanced solution, constraints are permitted to be violated. In a preferred embodiment, the amount of "violation" (that is, the precision to which the constraints are to be regarded) can be scaled and weighted by the user.

It should be noted that "scaling" indicates the precision of values with which the user is concerned, while "weighting" indicates the relative importance of a given constraint (after taking into account the scale of the values). As an example of scaling, a problem can be entered into the present invention which tries to achieve a return rate between 9% and 12% with a precision of 0.1%, while also trying to receive revenues in the range of $1,000,000 to $1,500,000 with a precision of $1,000. As an example of weighting, a problem can also be entered into the present invention where there is a "normally" weighted constraint which, for example, mandates that of 12 employees only 3 work during a given shift. This constraint will have lower priority than a "critically" weighted constraint which, for example, could mandate that no employee will be scheduled for more than 8 hours on a given shift. Objectives can be scaled and weighted in a similar way. Constraints (entered as "targets" by a user) and objectives are the way goals are entered into the present invention, and will be discussed further below.

Another advantageous feature of the present invention is that it can consider multiple goals (objectives and constraints) simultaneously. This allows for the solving of problems in which goals are in conflict. The stock purchase problem is an example of a goals-in-conflict problem. Further, since the best balanced solution to an infeasible problem is at least partially a subjective one, the present invention gives the user the ability to attain a more satisfactory result by allowing the user to change the weighted importance of the goals of the problem. Thus, one goal can be relaxed in favor of another, until the user has achieved a desired result. The best balanced solution automatically produced is what the present invention calculates to be the best result (that is, the result which minimizes the total, weighted and scaled violations of the constraints of the problem, and achieves the best values for the objectives given these constraints).

In performing the above-noted functions, the present invention uses a combination of object-oriented and rule-based methods. In using object-oriented methods, the present invention allows specified entities to be entered as "objects", and then allows these objects to have certain properties or behaviors based upon "attributes" which are assigned to the objects. Traditionally, a typical example of an object which might be used in a problem in the automobile industry might be "automobile", and its attributes might consist of "price", "acceleration", "weight", etc. The specific way in which the present invention creates relationships among objects is discussed below.

In the present invention, the objects are set up hierarchically so that objects which are lower in the object hierarchy can inherit the behaviors (associated with "attributes") of objects higher in the hierarchy. In this way, behaviors which are universal to some or all of the objects need be defined only once, with the objects lower in the hierarchy inheriting the behaviors of those higher in the hierarchy.

Using the above example, objects below "automobile" in the hierarchy might be "Toyota", "Buick", and "Ford", which would represent the automobiles being examined in the problem. In this example, the object "automobile" is referred to as an "object class", with the objects "Toyota", "Buick", and "Ford" being referred to as instances of the class "automobile." The inverse way that these relationships are characterized are by "is a" or "isa" relations. Thus, in this example, "Ford" isa "automobile", "Buick" isa "automobile", and "Toyota" isa "automobile."

If "automobile" is given the behavior that "weight" must be under 6,000 pounds, then "Toyota", "Buick", and "Ford" will inherit this behavior by default. In a preferred embodiment of the invention, the inheritance of behaviors for each object can be overridden, and other behaviors inserted instead. For example, it might be required that "weight" must be under 5500 pounds for the "Toyota" instance of "automobile." In this case this behavior would be associated directly with the object "Toyota", and all other automobiles would continue to inherit the default behavior from the "automobile" object class.

A preferred embodiment of the present invention allows for a richer object hierarchy than that described above. Specifically, in addition to the isa/instance relation between objects (which may be thought of as a member/set relation), the present invention allows for an ako("a kind of")/subclass relation between objects. The ako/subclass relation may be thought of as a subset/set relation.

Continuing the automobile example, suppose it is desirable to differentiate between different model-year automobiles. At the top of the object hierarchy would still be "automobile", but under it would be, for example, the subclasses "1989-auto" and "1990-auto." The instances of "1989-auto" would be "1989-Toyota", "1989-Buick", and "1989-Ford." The instances of "1990-auto" would be "1990-Toyota", "1990-Buick", and "1990-Ford."

As noted above, it is possible to associate behaviors not only with "automobile" but at intermediate levels in the hierarchy as well as at the bottom of the hierarchy. For example, if weight must be less than 5750 for all 1990 automobiles, this behavior would be associated with the "weight" attribute of the object class "1990-auto", and only its instances would inherit this behavior. (It should be noted that in a preferred embodiment of the present invention "automobile" is actually represented as year-auto, as will be clear from the more detailed discussions "automobile", for example, is used only for purposes of simplicity and illustration).

To take the above example even further suppose it is desirable to now ascribe some behavior to all Toyotas and have the instances "1989-Toyota" and "1990-Toyota" inherit this behavior. In the hierarchy set forth above, there is no "Toyota" object with which to associate this behavior. In a preferred embodiment of the present invention this problem is solved by the use of "multiple inheritance." This feature allows objects to inherit behaviors from any one immediate superclass (by "immediate superclass" is meant a superclass on the same level of the hierarchy).

Continuing the present example, if "Toyota" is added as a subclass of "automobile" and established the relations that "1989-Toyota" isa "Toyota" and "1990-Toyota" isa "Toyota", it would be possible for "1989-Toyota", for instance, to inherit behaviors from either "1989-auto" or "Toyota" since it is in an isa/instance relation to both these objects.

In the preferred embodiment of the present invention, a user does not directly set up the object hierarchy described above. Instead, a user describes the problem being represented in terms of the dimensions of the problem and the objects (or attributes) within these dimensions.

In the above-noted example, the dimensions and associated objects (or attributes) entered by a user would be:

dimension 1. (attributes): "weight", "price", "acceleration";

dimension 2. "automobile" with objects "Toyota", "Buick" and "Ford";

dimension 3. "year" with objects "1989" and "1990."

Figure 6:
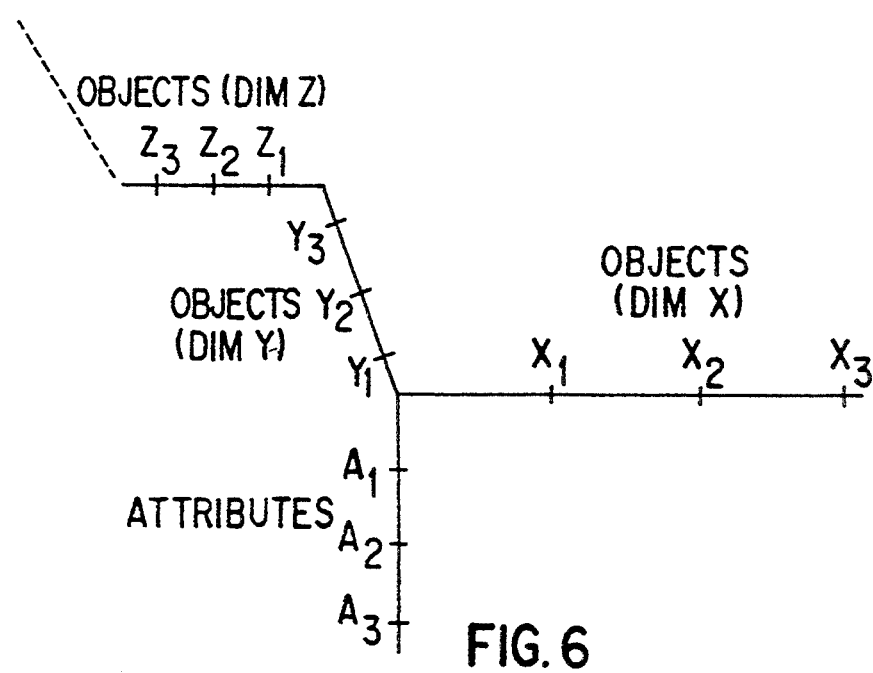
FIG. 6 is a diagram demonstrating an n-dimensional tabular representation.

An N dimensional tabular representation of objects and attributes is shown in FIG. 6. In the above example, DIM X would correspond to "automobile" with $X_1$, $X_2$, and $X_3$ corresponding to "Toyota", "Buick", and "Ford." DIM Y would correspond to "year" with $Y_1$ and $Y_2$ corresponding to 1989 and 1990, respectively. The attributes such as "weight" would be $A_1$, etc.

In the above-noted example, a three dimensional table is created. As indicated by the dimension DIM Z in FIG. 6, a fourth dimension to the problem can be added. In fact, in a preferred embodiment of the present invention, any number of dimensions can be added. Thus, N dimensional tables can be created.

When a user enters dimension and object names when describing a problem, the present invention synthesizes the dimension and object names to build an object hierarchy similar to the one referred to in the above example. The exact synthesis of dimension and object names used by the present invention is only a preferred embodiment. Thus, other object-oriented schemes are contemplated by the present invention as well. A detailed description of the process by which the present invention builds this object hierarchy and the precedence of inheritance maintained in it will be described in detail below.

It has been noted above that in the present invention "behaviors" may be associated with the attributes of objects at any level in the object hierarchy. These behaviors are in most cases defined (from an implementation point of view) by the use of "procedural attachments." For instance, the formula "acceleration=velocity/time" could be associated (that is, entered by the user) with the object "automobile." This formula is represented in the preferred embodiment of the present invention as a "to-compute" procedural attachment, and is said to be "attached" to the "acceleration" attribute of the object "automobile." The use of formulas and procedural attachment in the present invention will be described in greater detail below.

In addition, values (as well as procedural attachments) may be associated with the attributes of objects at the lowest level of the object hierarchy (these attributes of objects at the lowest level are referred to as object-attribute pairs). For example, assume that velocity, time and acceleration are all attributes of the problem. Further assume that the value of the object-attribute pair "1989-Ford" "velocity" is 100 ft./sec., and the value of the object-attribute pair "1989-Ford" "time" is 10 sec. If the "acceleration" of "1989-Ford" is desired, it may be computed by inheriting the to-compute procedural attachment from "automobile" (which is a representation of the formula noted above). Thus, a value of 10 ft./sec./sec. would be associated with the object-attribute pair "1989-Ford" "acceleration."

Throughout the rest of this document, object-attribute pairs will be indicated by the name of the object and attribute separated by a period. Thus, "1989-Ford.acceleration" would represent an object-attribute pair. However, it is noted that in a preferred embodiment of the present invention, the internal representation of the delimiter is a dash ("-") rather than a period.

A central concept of the present invention is the notion of dependencies. While the implementation of this concept in the present invention will be described in detail below, a brief example at this time will be beneficial. In the formula "acceleration=velocity/time", acceleration is the dependent variable and velocity and time the independent variables. The dependency implicit in this formula is maintained by the present invention. Thus, if the value of the object-attribute pair "1989-Ford.velocity" is changed to be 200 ft./sec., the formula for "acceleration" is automatically recalculated for "1989-Ford" and the new value 20 ft./sec./sec. is asserted to the object-attribute pair "1989-Ford.acceleration."

The present invention also contemplates that rules can be utilized by allowing one or more rules to be entered by the user. Rules can be made to fire (that is, the conditions of the rules are true, and the actions of the rule executed) depending upon the value of specified object-attribute pairs. Thus, the present invention allows for the intermingling of object-oriented and rule-based methods.

It should be noted that formulas, rules and values are what are known generally as "constructs", which are a basic building block entered by a user in representing a problem. The constructs noted above are examples of constructs which are contemplated by the present invention, and are not meant to be limiting. A larger non-limiting list of constructs contemplated for use with the present invention is set forth below.

In providing an environment in which a user can easily represent and solve a problem using the object-oriented facility described above, the present invention provides a tabular representation within which a problem can be represented. An example of a preferred embodiment of this tabular representation is shown in FIG. 24. In essence, an interface is provided by the present invention between a tabular representation environment, and the sophisticated object-oriented/rule-based environment described above. The tabular representation and the object-oriented/rule-based environment of the present invention are treated as a single entity, making interaction between the two very natural. It is this natural interaction between the tabular representation and object-oriented/rule-based environment that allows the present invention to represent and solve both numeric and symbolic components of a problem.

A preferred embodiment of the overall environment in which the present invention operates is shown in FIG. 1. Examples of this environment include (but are not limited to) an IBM PS/2 personal computer and an IBM RS/6000 workstation. It should be understood that the environment of the present invention is not limited to any type or brand of computer, and thus contemplates microcomputers to supercomputers. Additionally, dedicated hardware can also be implemented to operate the present invention.

Referring to FIG. 1, the present invention (shown as a problem solver 108) is loaded into a RAM 106 during operation. Input is received via an I/O device 112, after which the input passes through a buffer 110 and then to a RAM 106 via a Bus 114. It should be understood that the I/O device can be any standard input device, such as a disk, tape, keyboard, mouse, touch screen, or any compatible or equivalent means for manually or automatically entering information or commands.

In order for a user to observe the results as information is entered into the present invention and as progress is made in the course of solving a problem, a preferred embodiment also contemplates the use of a visual display device 116 as an example of an output means. Other output means could include printers, magnetic or optical disks, tape, etc.

Figure 2A:
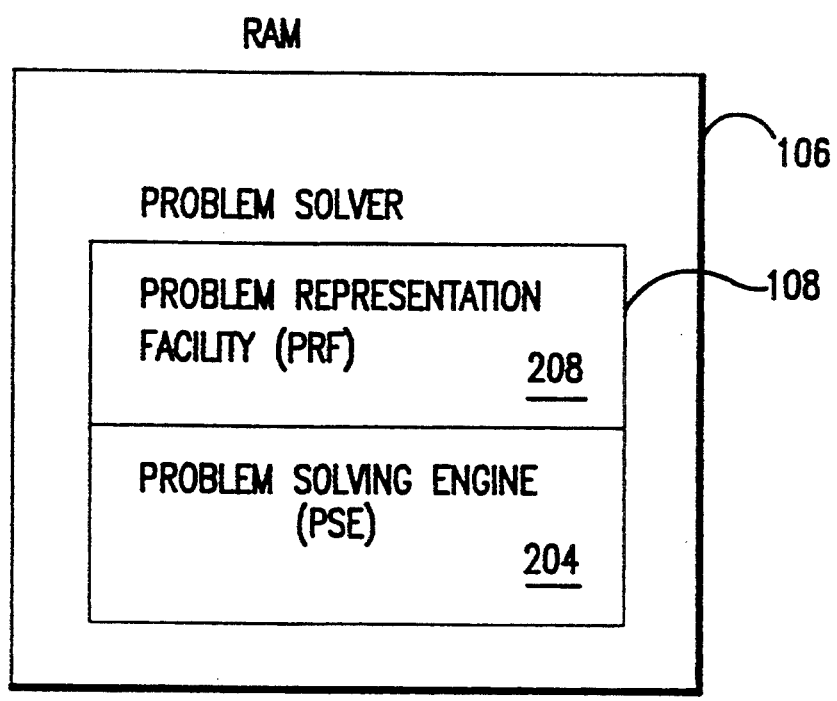
FIG. 2a is a high-level diagram of one embodiment of the present invention broken down logically into two portions.

In a preferred embodiment, the present invention can be divided into two main portions, as shown in FIG. 2a. The first portion is called a Problem Representation Facility (PRF) 208. The second portion is called the Problem Solving Engine (PSE) 204. The PRF 208 is the portion which allows a user to represent a problem in terms of objects, attributes and constructs, and then allows for manipulation of selected values of the problem in order to come up with a result based upon defined goals.

The PSE 204 automatically manipulates in an intelligent way certain values of the represented problem (called decision variables) sent to it by the PRF 208 in order to quickly solve the problem. The PRF 208 also sends to the PSE 204 a list of expressions representative of the goals, decision variables, and dependencies relating each expression to the set of decision variables which affects it, as defined in the problem. It should be noted that the PSE 204 could be constructed to determine the dependencies independently, either by symbolic examination of the expressions along with examination of the symbolic representation of the rest of the model, or by empirical analysis of the way the variables affect the values of the expressions.

In a preferred embodiment, the PSE 204 maintains a "score", which is a numeric quantity which reflects both how closely the constraints are to being satisfied and the degree of progress toward achieving the objectives. In the preferred embodiment, the components of this score, or the magnitude of change of those components, are displayed to the user by the PRF 208 whenever an improvement to the score has been made.

After the PSE 204 manipulates the values of the decision variables in some fashion, it evaluates the expressions, and checks the resultant score. Depending upon the result of this manipulation, the PSE 204 will continue to manipulate certain decision variables in an attempt to obtain the best score possible. While a user can manually manipulate variables to solve a problem using only the PRF 208, the PSE 204 is important for finding a solution more quickly.

In a preferred embodiment of the present invention, a user can interrupt the PSE 204 at any point in its operation, observe the best point the PSE 204 has found so far, manipulate variables manually using the PRF 208, and then restart the PSE 204. Thus, manual and automatic solution of a problem may be combined. In addition, the user may interrupt the PSE 204 and alter the problem itself using the PRF 208 by modifying any of the constructs such as formulas or rules. Again, the PSE 204 may be restarted to search for a solution for the modified problem.

Thus, the present invention seeks a best balanced solution, while also allowing for the solving of a problem at a greater speed than if a user manipulated the same decision variables in the PRF 208 manually. One of the features that allows the PSE 204 to assist in solving a problem is the ability of the PSE 204 to use heuristics to dynamically interleave various problem-solving techniques. Which problem solving method(s) gets used will depend upon the characteristics of the specific problem being solved. In this way, the present invention is better able to handle complex problems such as NP complete problems. For these problems, it finds a "good" solution (not necessarily the optimum solution) in significantly less than the time it takes using traditional problem-solving methods to find an optimum.

In the preferred embodiment, the user selects one of several stopping criteria to determine when the PSE 204 should stop trying to improve the score. Because the user may cause the PSE 204 to search for an arbitrarily long time, the PSE 204 will, given enough time, try every point in the search space of the decision variables. Naturally, the precision of the points found as solutions is limited by the granularity (non-continuity) of the representation of the values as numbers which is due to the limited precision of the implementation of the language. Thus, within the above mentioned limits, the PSE 204 will eventually find the optimum solution.

Figure 2B:
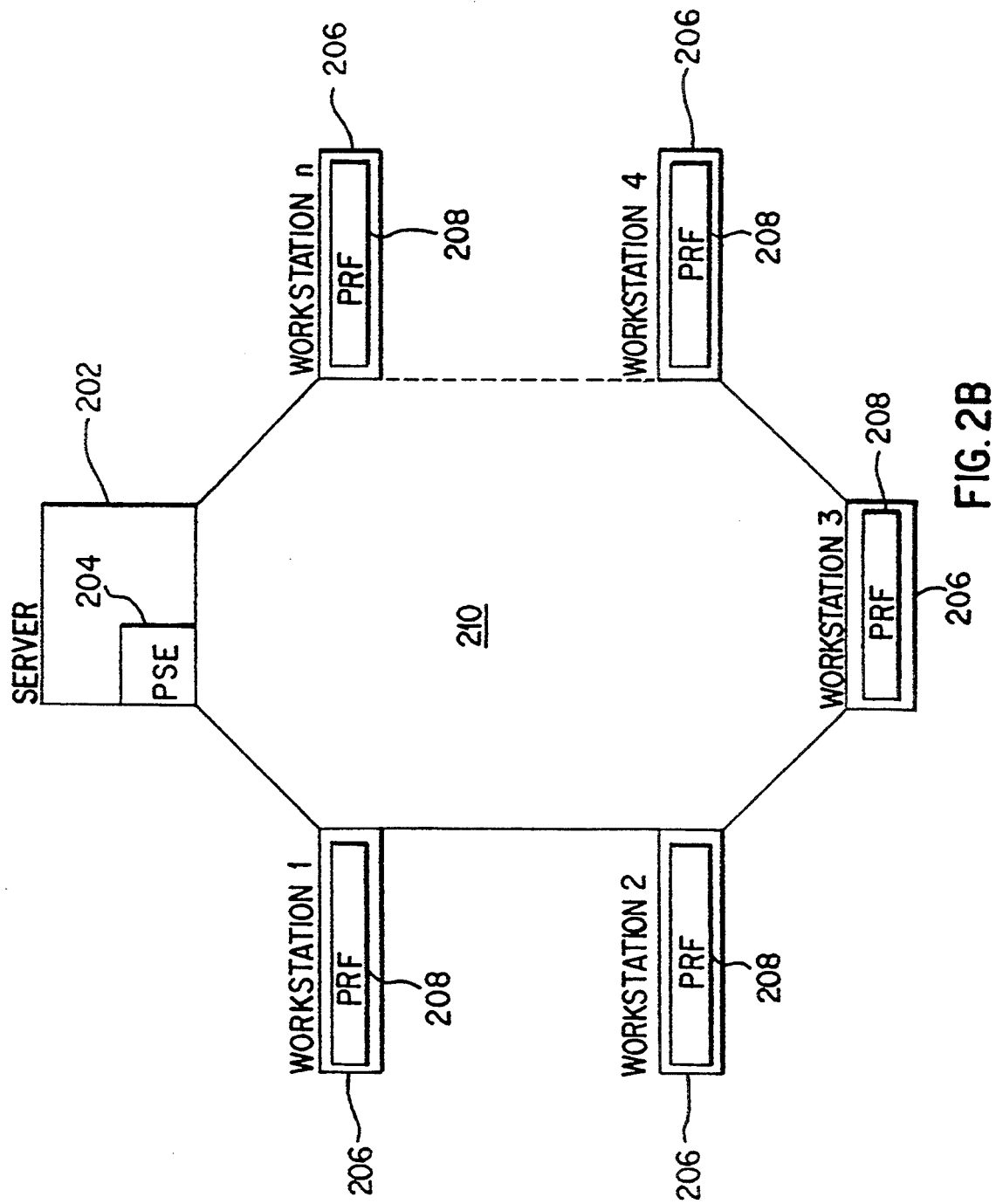
FIG. 2b is a high-level diagram of the environment of an embodiment of the present invention using a local area network.

An alternative configuration which is contemplated by the present invention utilizes a local area network (LAN) environment as shown in FIG. 2b. FIG. 2b shows a LAN 210 having workstations 1 to n (shown collectively as 206) and a Server 202. In this embodiment, the PSE 204 resides on Server 202, while a PRF 208 resides on each of the workstations 206. Thus, each of the workstations 206 has its own PRF 208, all of which share a single PSE 204 on the Server 202.

The present invention is particularly well suited for the LAN environment, since in a preferred embodiment there is relatively little communication between the PSE 204 and PRF 208 in the course of solving a problem. In the configuration shown by FIG. 2b, many versions of the PRF 208 could benefit from the superior performance available only on the server. Of course, it should be understood that many servers can also be used and tied together in conjunction with the present invention.

It should be noted that a preferred embodiment of the present invention contemplates that at any given time, one or more instances of the PSE 204 could be spawned and devoted to solving a problem. This notion particularly contemplates a multi-user environment such as a LAN or a mainframe where the PSE 204 is receiving more than one problem from one or more PRF 208. Also, in a preferred embodiment, the PSE 204 will be able to directly evaluate expressions representative of constraints and objectives. That is, it is contemplated that each instance of the PSE 204 receives from the PRF 208 a representation of the problem. In another embodiment, the PSE 204 does not directly evaluate expressions by virtue of having received a representation of the problem, but rather communicates with the PRF 208 to receive and send these expressions.

Figure 3:
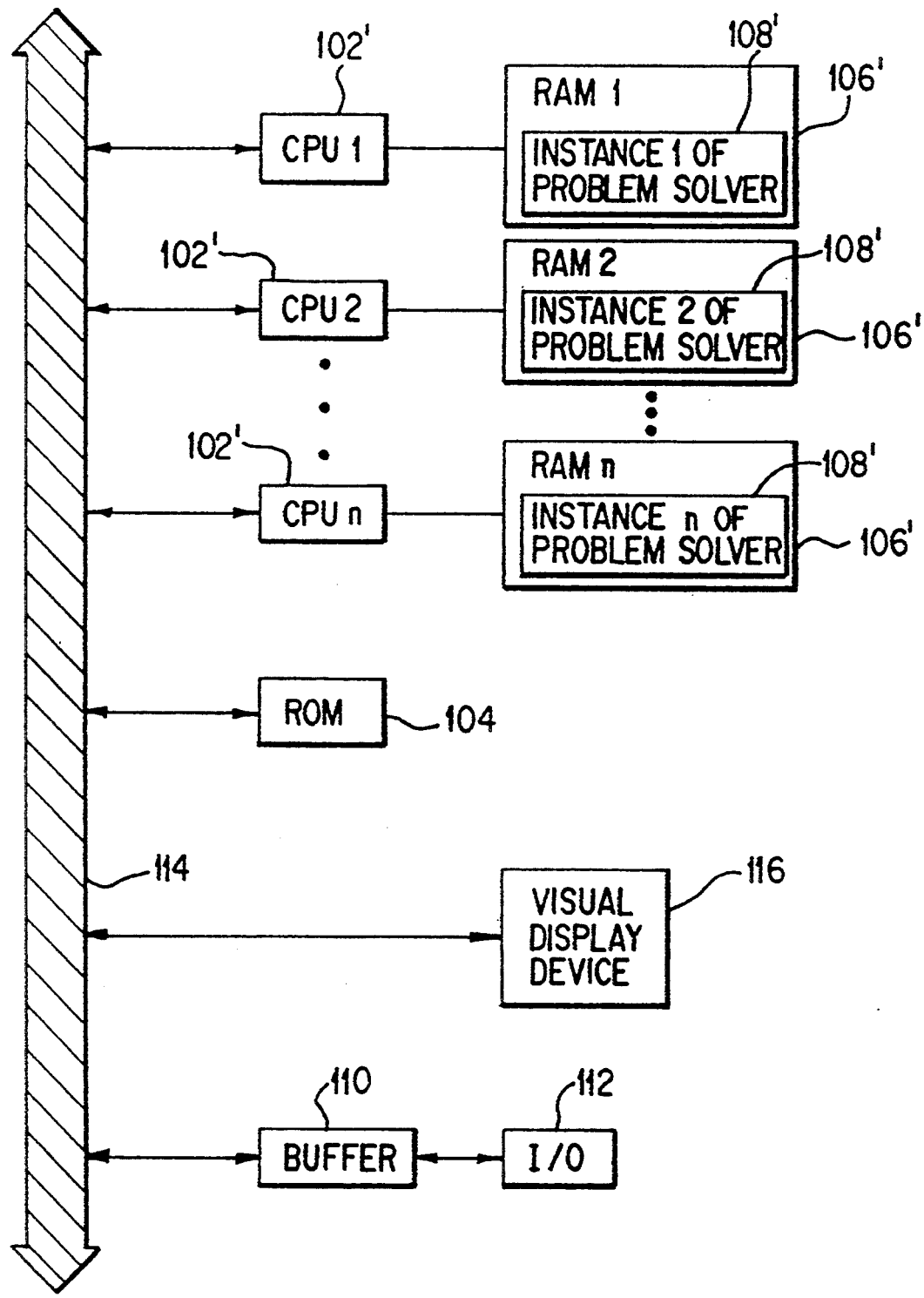
FIG. 3 is a high-level diagram of the environment of an embodiment of the present invention using multiple processors.

FIG. 3 shows another embodiment of the present invention, in which a multi-processing environment having n multi-processors is used. An example of a multi-processing environment contemplated by the present invention is an IBM PS/2 personal computer with multiple 80486 processors, or and IBM RS/6000 workstation with multiple RISC processors, or a heterogeneous network comprising these or any other environment having a processor. In this embodiment, the search for the solution of the problem is accomplished by pursuing n schedules of the search simultaneously, preferably using n instances of the PSE 204 within the present invention 108'. These schedules can be thought of as a "view" of the problem. For each view, different values and/or different problem solving techniques are executed concurrently with other views. The present invention begins with a single view (that is, as a single instance of the PSE 204), and creates additional views by spawning additional instances of the PSE 204 as required by the problem, and within the limits of the number of processors available.

When the improvement made by an instance of the PSE 204 is larger than some threshold (which may be adjusted to minimize inter-process communication) that improvement may be communicated to some or all of the other n−1 instances of the PSE 204, allowing them to all work on the "best" point in parallel. Once determined, these schedules are then sent to RAMs 1 to n (shown collectively as 106'), and then are acted upon by corresponding CPUs (shown collectively as 102'). The methods by which a preferred embodiment of the present invention solves a given problem allows the present invention to take advantage of multiple processors. Thus, a problem can be solved more quickly than if only a single CPU were acting upon the problem. Of course, it should be understood that the present invention can take advantage of multiple processors whether a single computer is used with multiple CPUs, or multiple CPUs are used by utilizing multiple computers in the same or different geographical locations.

II. Problem Representation Facility (PRF)

A. Overview Of Problem Representation Facility

Figure 4:
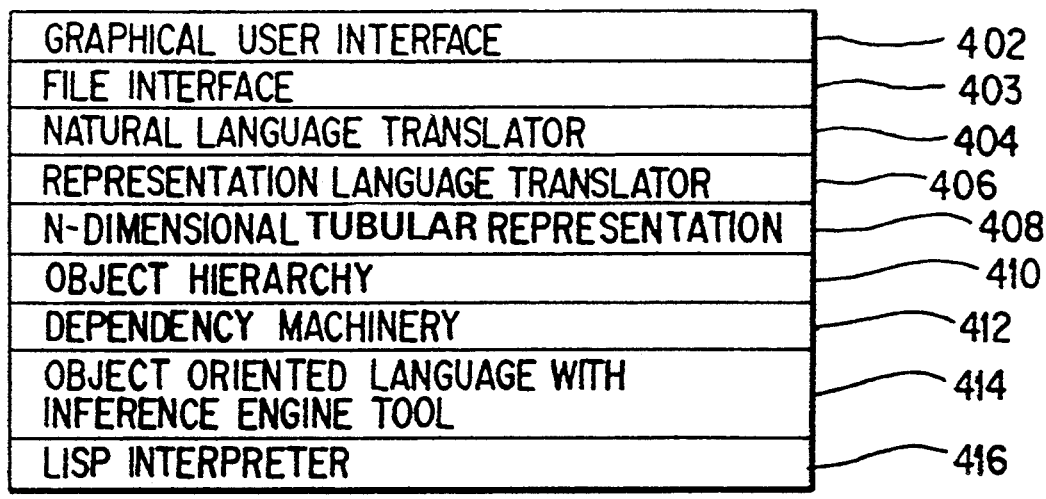
FIG. 4 is a high-level diagram of the structure of the Problem Representation Facility (PRF).

An overview of the PRF 208 will now be described with respect to FIG. 4. Referring to FIG. 4, the PRF 208 comprises several interrelated portions and concepts which will be described below.

1. Graphical User Interface

In a preferred embodiment of the present invention, a user interacts with the present invention via a graphical user interface (GUI) 402. In essence, the (GUI) 402 is a collection of software modules that allow a user to enter values and constructs into the present invention, as well as entering the various objects and attributes to create n dimensional tables as indicated above.

In a preferred embodiment of the present invention, graphical subroutines are used to create the (GUI) 402. This includes graphical subroutines which create, for example, dialogue boxes and menus. These graphical subroutines allow input to the present invention to be entered through any standard input device, such as a keyboard, mouse, or digitizer pad. In a preferred embodiment of the present invention, the graphical subroutines are standard, commercially available graphical subroutines. One such example is a commercial package called XVT, manufactured by Graphical Software Systems.

Using the (GUI) 402 as described above allows the present invention to be compatible across different software platforms. For example, in a preferred embodiment, the present invention will run under both OS/2 using Presentation Manager (both from IBM) and UNIX using OSF/Motif. This relates not only to the (GUI) 402 portion of the present invention, but to the entirety of the present invention as well.

The (GUI) 402 thus provides a visual aid to assist a user in entering values and constructs into the present invention in order to represent a problem. Of course, other interfaces such as a windowing character-based interface or command-line interface could also be used.

Regarding the actual entering of these values and constructs, a preferred embodiment of the present invention allows the user to enter this information using one of two protocols. The first protocol is referred to as a "natural language", and the second protocol is referred to as a "representation language." These two protocols, as well as their respective translators (shown as 404 and 406, respectively), will be discussed below.

2. File Interface

In addition to interacting with the invention through the (GUI) 402, a preferred embodiment of the present invention allows a user to interact with the present invention in whole or part through a file interface 403. The file interface 403 allows the user to enter into a standard text file all the objects, attributes, values and constructs that would have been entered interactively using the (GUI) 402. The user can create this text file using any text editor, such as Emacs or WordPerfect. This text file is then processed by the natural language translator 404 and representation language translator 406.

When saving a problem (or "model") created using some combination of (GUI) 402 and file interface 403, a preferred embodiment of the present invention allows a user to save the problem in either "image" format or in text file format. The image format is a non-readable "compiled" representation of the model. The text file format is an ascii-readable text file that reproduces all the values and constructs exactly as entered by a user. This text file may then be further edited by the user and reevaluated as described above. In addition, this text file serves the function of providing a user with what can be considered written documentation of the problem.

3. Natural Language Translator

The natural language translator 404 allows the user to input constructs in a format similar to English. For example, in a preferred embodiment, a formula such as "return:=profit−cost" could, by virtue of the natural language translator 404, be written as "return is equal to profit minus cost." Another way that this could be written as contemplated by the present invention is "let return be profit minus cost." Of course, it should be understood that the present invention contemplates a natural language translator 404 that can translate any number of natural language formats.

In essence, the purpose of the natural language translator 404 is to give a user flexibility in deciding how to enter constructs to create a problem. It is a particularly advantageous feature for users who are not accustomed to expressing information in more formal command languages. It should be noted that in the preferred embodiment of the present invention, the natural language translator subsumes the representation language translator mentioned below. That is, a user may freely mix natural language constructs with those of the formal representation language. There is no necessity to inform the system that a construct is intended as natural language or representation language.

4. Representation Language Translator

For users who are more accustomed to expressing terms in a more concise, formal language, a preferred embodiment of the present invention also provides a representation language translator 406 which allows a user to enter constructs using a representation language. For the above-noted example, if the same equation were written using the representation language, the equation would simply appear as "return:=profit−cost."

As indicated above, equations can also be written which consist of elements of both the representation language and the natural language. For example, a formula such as "return:=profit minus cost" can be used.

It should be noted that the specific examples of the protocol used for both the natural language and representation language were only examples of a preferred embodiment of the present invention. In general, the present invention contemplates the use of any number of different types of specific protocols.

It should also be noted that for the examples shown above, only the attributes have been set forth. References to the objects themselves have been dropped, since the examples were of a "general" formula. The effect of entering such a formula would be to associate it with the object class highest in the hierarchy for the current "table", thus making the formula applicable to all objects below it in the hierarchy. This concept will be discussed further below.

5. N Dimensional Tabular Representation and Object Hierarchy

The N dimensional tabular representation 408 refers to the general concept and implementation thereof of multiple dimensions of objects, with the first dimension always being fixed as the attributes. (Note that minimum value of N is always 2, as it makes no sense in the preferred embodiment of the present invention to define a problem lacking either objects or attributes.) The N dimensional tabular representation 408 gives the user an enhanced conceptual framework for envisioning a problem, as well as an interface for allowing a user to enter constructs at various levels within the object hierarchy 410 that the present invention creates. In addition, in a preferred embodiment of the present invention, values can be entered at the lowest level (that is, the object-attribute level) within the object hierarchy 410 (although it should be understood that the present invention also contemplates values being entered at other levels as well). This representation 408 is internally implemented by the object hierarchy 410 so that it can accomplish the features indicated above.

The automobile industry example used above will now be used to illustrate the manner in which the present invention creates both the N dimensional tables and an associated object hierarchy 410. Recall that in the aforementioned example the user entered the following information:

dimension 1. (attributes): "weight", "price", "acceleration";

dimension 2. "automobile" with objects "Toyota" and "Buick" (we will omit "Ford" in the interest of simplicity);

dimension 3. "year" with objects "1989" and "1990."

The user will also give the table a name, say "auto-table" for automobile industry table, and the present invention will create a three-dimensional table as described above. In the preferred embodiment of the present invention an object "auto-table" is said to be created as an instance of the object "table." This is not central to the invention, but mainly allows the various tables in memory at to be organized efficiently with data that pertains to them.

In the present invention, a "cell" is an intersection of all the rows and columns of a table, and thus corresponds to an object-attribute pair at the bottom of the object hierarchy 410 that is created for the table. In the above-noted example, one such cell (or object-attribute pair) would be referred to as "1989.Toyota.weight." The internal object that is being referenced in the cell of this table is "1989-Toyota" and the attribute is "weight." Note that while the user may think of the representation in terms of the objects "1989" and "Toyota", in the internal object hierarchy 410 that is created by the present invention these objects do not exist. It should be noted that throughout most of the application, the term "object-attribute pair" rather than "cell" will simply be used.

A preferred embodiment of the present invention creates its internal representation of objects by forming a concatenation of the cross product of the specific user-entered object "names" (such as "1989" and "Toyota"). In the above-noted example, the following objects would be created by the present invention: "1989-Toyota", "1990-Toyota", "1989-Buick", and "1990-Buick". For each of the preceding four objects, new objects are created by concatenating the dimension name with the specific user-entered object name, and working from the outermost dimension inward until the innermost dimension (dimension 2—attributes play no role in this process) has a general name (i.e., the name of a dimension). Thus, for "1989-Toyota" two new object classes would be created in turn, "year-Toyota" and "1989-automobile." These object classes are added to the object hierarchy 410 by adding isa links to them from the initial object (that is, "1989-Toyota" isa "year-Toyota" and "1989-Toyota" isa "1989-automobile"). For "1989-Buick" we add the object class "year-Buick", and the relations "1989-Buick" isa "year-Buick" and "1989-Buick" isa "1989-automobile." This process is repeated for "1990-Toyota" and "1990-Buick."

Figure 9A:
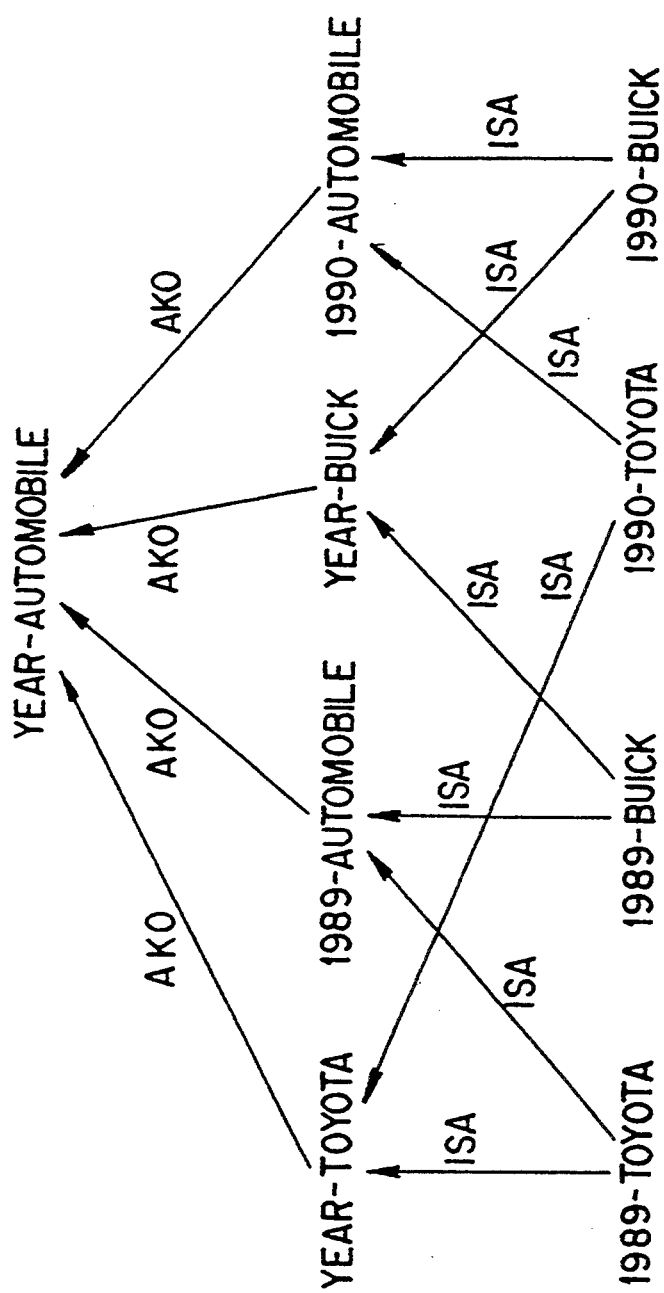
FIG. 9a is a diagram of the entire object hierarchy for a small three-dimensional example.

Next, for each object class that has just been created (for example, "year-Toyota"), new object classes are created by generalizing any specific names one at a time, working from the outermost dimension inward. For the example "year-Toyota", only one new object class is created, "year-automobile" (which in this case is the highest object class in the hierarchy). Lastly, ako links are added from the previous layer of object classes in the hierarchy to these newly created object classes. The following relations will then be created: "year-Toyota" ako "year-automobile", "1989-automobile" ako "year-automobile", "year-Buick" ako "year-automobile", and "1990-Buick" ako "year-automobile". The resulting object hierarchy 410 is depicted in FIG. 9a. It should be noted that techniques other than concatenating names as indicated above could also be used to achieve the same general result. For example, objects could inherit from objects of arbitrary name, but identical meaning. Also, multiple dimensions could be implemented by arrays of objects.

It should be noted that the description above regarding what constitutes a first, second, etc. dimensional problem is only for purposes of ease of understanding. Thus, this problem could also be considered as a problem of some other dimension. In addition, it should be pointed out that an individual object hierarchy 410 is created and utilized each time a problem is entered by a user. As mentioned above, all values entered into the present invention are associated with the attributes of objects at the bottom of the object hierarchy 410 (that is, object-attribute pairs). Constructs such as formulas that define the way these values are computed or cause computation of other values, however, may be associated with an object at any level in the object hierarchy 410. The exact means of this association will be described in further detail below.

It should be noted that the object hierarchy 410 that has been created from the user's input by the present invention, and the order in which it is searched for behaviors in the form of constructs (as per the concept of multiple inheritance) corresponds exactly to the intuitive notions about the objects themselves. That is, the order of the search up the object hierarchy 410 is exactly the order in which the hierarchy (as described above) was built. What this results in is a breadth-first search of the object hierarchy 410. More specifically, the isa links are first searched from left to right. Then, the ako links are searched from left to right. (See generally Knuth, Donald, "The Art Of Computer Programming" (Volume I), Addison-Wesley, 1973).

Again using the preceding example, suppose a formula is being accessed to compute the value of "1989-Toyota.acceleration." The search up the object hierarchy 410 for this formula commences at "1989-Toyota" and proceeds to "year-Toyota" and then to "1989-automobile", and so on. The object "year-Toyota" can be thought to represent Toyotas for all years, while "1989-automobile" represents all automobiles for the year 1989. One can see the logic with associating the behavior of a 1989 Toyota first with Toyotas of all years, and then with all 1989 automobiles. In this way, any behaviors associated with "year-Toyota" will take first priority, followed by behaviors associated with "1989-Automobile", etc.

Figure 9B:
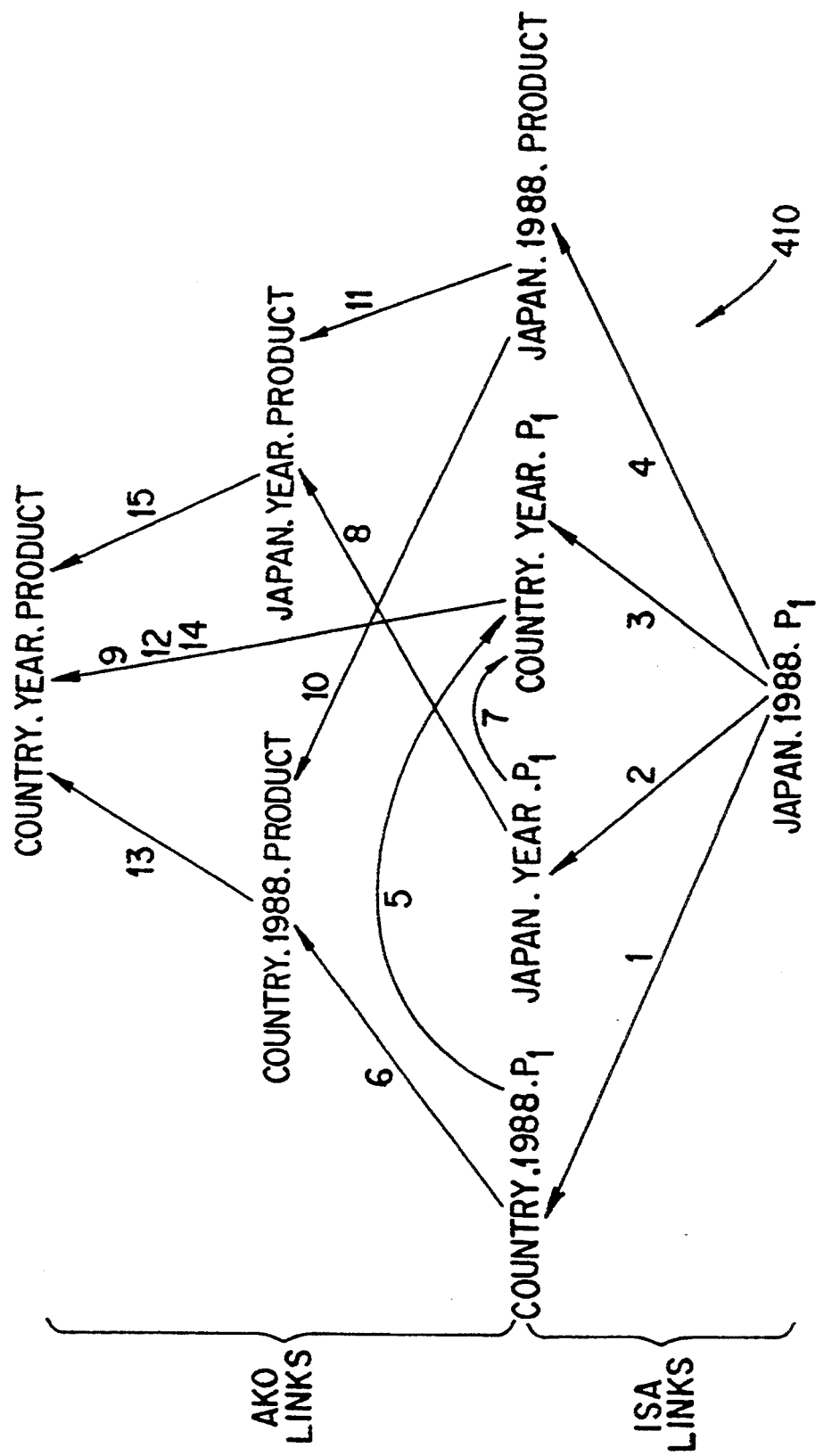
FIG. 9b is a diagram of the order that the object hierarchy is searched using a four-dimensional example.

The preceding example of the creation and search process of the object hierarchy 410 for a three-dimensional problem is the means by which the present invention creates a hierarchy for a problem of any dimensionality. FIG. 9b, for instance, represents a vertical "slice" of the object hierarchy 410 for a four dimensional problem in which the dimensions are country, year, and product. The numbering of the links in it indicates the order in which the isa and ako links are searched upward from the object "Japan-1988-p1."

It should be noted that the breadth-first search as described above entails some redundancy, in that there are links to objects which have already been searched. More specifically, in the example shown in FIG. 9, the link numbers 5,7,10,11,12, 13 and 14 are redundant. Where the construct being searched for is at the highest point in the hierarchy, links 10 through 14 are not searched. In the case that an inheritable construct is not found at the highest point, all redundant links are searched. In the preferred embodiment of the present invention, however, this redundant search takes place only once, as the results of the search (and failure thereof to find any inheritable behaviors) is associated with the object at the bottom of the hierarchy. Note that this "caching of failure" does take up some extra memory, and that many different searching and caching schemes would be sufficient to implement the object hierarchy search. The notion of "caching" generally as used in the present invention will be discussed further below.

As indicated above, if the present invention searches up the object hierarchy 410 and detects an inheritable construct in any of the object classes, the behavior of that construct will be inherited, and the search will terminate. Since the search up the hierarchy is from most to least specific, this scheme allows a general construct to be overridden for specific cases. Thus, if the general formula "return:=profit−cost" were entered and consequently affiliated with the most general object class, then entering a more specific construct would override the general formula for certain object-attribute pairs.

Returning to our three-dimensional automobile example, and assuming that the attributes, "profit", "cost", and "return" have been added to the problem, assume that a user enters the formula "return:=profit−cost." Since no objects are specified with this formula, it is considered a general or non-specific formula, where the objects are considered to be general (that is, at the highest level of the object hierarchy 410). Thus, in a preferred embodiment of the present invention, this formula is an equivalent short-hand version of the formula "year.automobile.return:=year.automobile.profit−year.automobile.cost." The effect of entering this formula is that it will be applied to all objects at the bottom of the object hierarchy 410. In terms of the resulting 3 dimensional table, it will apply to all object-attribute pairs that correspond to the "return" attribute along both the X and Y axes.

Using a specific illustration, if the object-attribute pair "1988-Toyota.profit" was given a value of 100, and the object-attribute pair "1988-Toyota.cost" was given a value of 80, then for the object-attribute pair "1988-Toyota.return" the present invention would generate the value of 20. Thus, the object-attribute pair "1988-Toyota.return" would be said to "inherit" the formula.

As indicated above, the N dimensional tabular representation 408 also allows a user to use constructs in a somewhat more limiting way. For example, a user could use the above-noted formula only for automobiles in year 1988. Such a formula could be written as "1988.return:=1988.profit−1988.cost". If the user wanted the formula only to relate to Toyotas for all years, the formula could appear as "Toyota.return:=Toyota.profit−Toyota.cost." Again, it should be understood that the representation of the formula noted above, as with the representation of constructs shown generally, is only a preferred embodiment of the present invention, and that these constructs can be written in many different ways.

In addition to allowing the creation of a table of N dimensions, the present invention also allows multiple tables of any dimension to be created. Once created, these tables can then be interlinked to each other. An example of the use of two tables can be seen from FIG. 24. In this example, two separate but interrelated tables (one designated "project", and the other designated "proj-sum") are shown. It should be noted that for the table designated proj-sum, the object and attributes have been transposed (that is, the attributes lie along the X-axis rather than the Y-axis). The present invention also allows a user to define a "model" to represent a problem in terms of multiple tables. In the example from FIG. 24, the two tables represent a "Capital Budgeting" problem. These features are pointed out only to show that they are features of a preferred embodiment of the present invention.

5. Dependency Machinery

The dependency machinery 412 is the mechanism which enforces the relationships (that is, dependencies) set up within the object hierarchy 410 by the constructs. This dependency machinery 412 can be better understood by an explanation of what it does. Using the above-noted example to illustrate, if the formula "return:=profit−cost" were entered into the present invention, then this formula will be at the top level of the hierarchy (that is, at year-automobile). In other words, this construct could be said to be attached to the "return" attribute of "year-automobile." In addition, the following two dependencies would be added: "year-automobile.profit affects return" and "year-automobile.cost affects return." This means that a change in value of any object-attribute pair where the attribute is "profit" or "cost" will affect the value of the corresponding object-attribute pair having the attribute "return." It will be further explained below how these dependencies are represented internally.

The dependency machinery also serves to propagate dependencies. For example, if a change in value to a first object-attribute pair causes a change in value to a second object-attribute pair, then it is quite possible that this latter change will cause further changes to other object-attribute pairs. If this occurs, the dependency machinery of the present invention determines what object-attribute pairs will be affected, and determines the most logical order to effect the propagation.

From the above, it will be seen that the dependencies created and manipulated by the dependency machinery 412 of the present invention can be thought of as object-oriented dependencies. In other words, the dependencies are formed which can be thought of as belonging to a specific object, but which may in fact be inherited by many objects lower in the object hierarchy 410. In terms of the tabular representation, what this means is that the dependencies between any number of cells in a typical table can many times be represented by just a few procedural attachments to an object class in the multiple inheritance object hierarchy 702, which will be discussed further below.

6. Object-Oriented Language With Inference Engine Tool

In the present invention, the object-oriented language with inference engine tool 414 is a basic building block of the present invention.

The object-oriented language portion of this tool 414 allows for access from a higher level language. In a preferred embodiment of the present invention, this access is made in the form of function or subroutine calls.

In a preferred embodiment of the present invention, the hierarchies and dependencies are actually set up and kept track of by the object-oriented language portion of this tool 414. When the constructs of an object class are entered by a user, the dependency machinery 412 ultimately manipulates the dependencies created, but the object-oriented language is used to create and keep track of these dependencies relative to their hierarchical situation (for example, it keeps track of inheritance of behaviors and retrieval of values of object-attribute pairs).

When a construct such as a formula is entered by a user in either "natural language" or the "representation language" of the present invention, that construct will be translated and represented internally by components known as procedural attachments (as mentioned above). The object-oriented language portion with inference engine tool 414 is then able to manipulate the constructs in this format.

With regard to the inference engine of the object oriented language with inference engine tool 414, a preferred embodiment of the present invention allows for both forward and backward chaining rules to be implemented as constructs. Using rules allows complex relationships to be stated between object-attribute pairs and other object-attribute pairs. In essence, rules allow for implementing the logic that if certain conditions hold true for one or more object-attribute pairs, then some particular action will be taken regarding at least one other object-attribute pair.

The object-oriented language and inference engine tool 414 used in the present invention is a standard type of object-oriented environment. Consequently, there are commercially available products which are equivalent to the object-oriented language and inference engine used by the present invention. Such products are ART by Inference Corp., and KEE by Intellicorp.

7. Lisp Interpreter

A preferred embodiment of the object-oriented language and inference engine tool 414 of the present invention is written using a version of the LISP programming language. As was the case for the object-oriented language and inference engine tool 414 itself, any standard LISP interpreter 416 would serve the purpose. Examples of such LISP interpreters include "Lucid Common Lisp" by Lucid, inc., and "Franz Lisp" by Franz, inc.

Of course, the object-oriented language and inference engine tool 414 could be written using any general purpose programming language. Examples of such programming languages include Prolog, Pascal, C, and C++.

B. Sample Problem

A detailed description of the PRF 208 will be explained using the Sample Problem set forth below, with reference to FIGS. 24–32. This Sample Problem is a capital budgeting problem, and portions of it are similar to the automotive industry example referred to above.

The general idea of this capital budgeting problem is that there are 10 possible projects to choose from. The goal is to choose those projects which will maximize return-to-risk ratio (specified by "rr-ratio").

A constraint used in this problem is that only a certain amount of money can be used to invest in the projects. A country is associated with each of these projects. The problem includes a "war-risk" factor associated with each project. In this problem, the calculation of war risk is accomplished using rules.

In this problem, the second dimension is "project", and the objects in that dimension (that is, the projects which can be chosen) are "$p1, p2, \ldots p10$." FIG. 32 shows a third dimension being added, where the dimension is "year", and the objects are "1988, 1989, 1990."

C. Constructs

Figure 5:
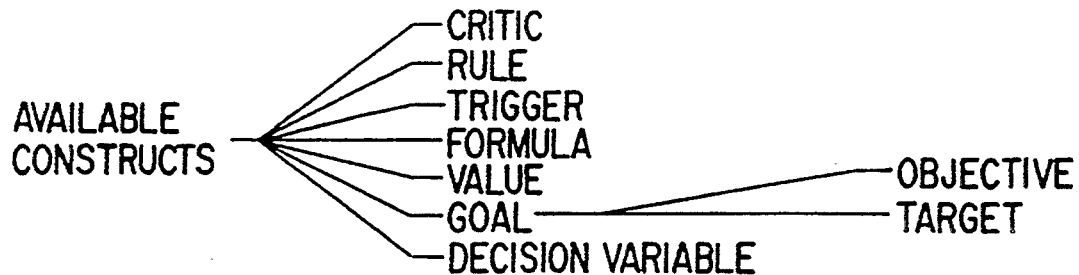
FIG. 5 is a diagram of available constructs.

FIG. 5 shows a list of constructs used in a preferred embodiment of the present invention. As indicated above, a construct basically refers to certain building blocks (such as formulas) which allow a user to build the representation of a problem. These constructs can be thought of as belonging to a specific object-attribute pair, a more general object class-attribute pair (that is, an attribute of an object class), or an entire table. A brief description of constructs available in a preferred embodiment of the present invention is set forth below.

1. Rules

A rule allows a user to express relationships between different object-attribute pairs. More specifically, a rule can be thought of as an IF-THEN statement having the property whereby IF certain arithmetic and/or logical statements about the values of object-attribute pairs all hold true, THEN certain arithmetic and/or logical operations will be applied to other object-attribute pairs. As indicated above, the evaluation of these rules uses the inference engine functionality of the object oriented language with inference engine tool 414.

The information to which a rule refers is generally known as a knowledge base. In a preferred embodiment of the present invention, this knowledge base can be derived from information within the object-attribute pairs themselves, and/or information from an external source, such as a database. In effect, the value of any object-attribute pair referenced by the present invention may be retrieved from or written to an external database. This external referencing of values can be applied to constructs other than rules. A preferred embodiment of the present invention also allows such external sources to be easily accessed.

FIG. 27 shows a rule being entered into the Sample Problem. This rule uses general variables (which are used to stand for an object, attribute, or value) which, in a preferred embodiment of the present invention, allow the rule to be used flexibly. Referring to FIG. 27, this rule checks to see IF the value of "taken" equals "yes" for some instance of "projects", and IF the instance has a country, and IF that country has no war, THEN "war-risk" for that instance of "projects" will be set to zero.

Again, it should be understood that the specific protocol used in presenting this and other constructs of the present invention is only a preferred embodiment of the present invention.

2. Critics

A critic is basically a passive rule. In other words, it allows the same IF-THEN structure of regular rules in that the user can define a series of events and actions to be taken. However, with a critic, the actions to be taken are limited to the display of a user-defined message. This allows a user to receive commentary about certain actions taken by the problem.

FIG. 28 shows an example of a critic being entered into the present invention. Here, if the object-attribute pairs "p3.Taken" and "p4.Taken" both equal "yes", then a message is sent to a user. Thus, critics are a way to express expertise or commentary about the state of a problem without actually taking any action which would otherwise affect the state of the problem.

3. Formulas, Triggers and Values

A formula is an expression that defines the way that a single value of an object-attribute pair is to be computed. For example, "return:=profit−cost−fee" is an example of a formula. Thus, any number of operands can be used in defining a formula, but there will only be one result. FIG. 25 shows an example of a formula being entered into the sample problem.

In contrast to a formula, a trigger allows one or more effects to occur upon the occurrence of a single event. More specifically, when the value of an object-attribute pair is altered in some way, a trigger will cause different actions to take place on other object-attribute pairs. Using the Sample Problem, a trigger can be written such that if p3 is taken, (that is, if p3.taken="yes") then take p5 and p8 (that is, make p5.taken="yes" and p8.taken="yes"). FIG. 26 shows an example of a trigger being entered, indicating that if an instance of "projects" is not taken, then for that instance, "war-risk" will be set to zero.

A "value" is just a setting or assignment which is associated with a particular object-attribute pair. These values can be numerical, or they can be symbolic, such as "yes" or "no." As indicated above, in a preferred embodiment of the present invention, an object-attribute pair can contain a value, in addition to having associated with it (that is, having attached to it) some other construct such as a formula or trigger.

As indicated above, the constructs used in some examples to represent non-specific object classes are short-hand for the full construct name which could otherwise be used.

4. Goals

Goals are constructs which enable a user to express what the user wants in the way of a solution to a problem. In a preferred embodiment of the present invention, goals can be divided up into two different types of constructs called targets and objectives. An objective allows the user to choose one or more object-attribute pairs to be maximized or minimized. Using the Sample Problem and referring to FIG. 29, it is a goal of the problem that rr-ratio be maximized.

In contrast to objectives, targets allow a user to express what values or range of values the user wishes an object-attribute pair to attain (or maintain). For example, a user might want to maintain that, for a particular problem, "cost" should be less than 500. If the user enters "cost<500", then for each object-attribute pair where the attribute is "cost", the present invention will try to maintain cost below 500. If a user only wanted more specific costs to be less than 500, then more specificity would be required. For example, "p2.cost<500" would limit only the value of the object-attribute pair corresponding to p2.cost to less than 500, as opposed to all object-attribute pairs having "cost" as the attribute.

In other systems, those things which the current inventions calls "targets" might be described, instead, as constraints. Indeed, that which is referred to above as a "constraint" was initially derived from the entering of a target. However, the term "target" will be used in this portion of the application, as it reflects the intention of approaching desired conditions as closely as possible, even when they cannot all be met.

FIG. 30 shows a target being entered into the Sample Problem where it is desired that the total cost (t_cost) be greater than or equal to 1000.

In a preferred embodiment of the present invention, goals can be entered by a user as being weighted or scaled. Weight represents the relative importance of a particular goals (objectives and targets). Scale represents the relative precision to which a target is to be approached, or in the case of objectives, the coarseness with which to regard incremental changes in the objective.

In an alternative embodiment, scale or precision can also be used as part of the termination criteria for the PSE 204.

5. Decision Variable

A decision variable is a construct which allows a user to select object-attribute pairs which the PSE 204 is allowed to vary in order to achieve the best score. These decision variables need to be values that are independent of other object-attribute pair values. The PRF 208 detects which object-attribute pairs are candidates for becoming decision variables (by noting those object-attribute pairs that are not affected by some object-attribute pair, but which do affect at least one other object-attribute pair), and then allows a user to decide from these candidates which will actually be used as decision variables.

When an object-attribute pair is selected, the user enters a legal range over which the decision variable is allowed to vary. In the Sample Problem, examples of decision variables would be those object-attribute pairs where the attribute is "taken", (that is, p1.taken, p2.taken, . . . ). Here, the range of variance would be either the value "yes", or the value "no." If numbers were at issue, then a range would be set between two numeric values.

6. Object Variable

An object variable is not a construct in the sense that it affects object-attribute pairs or causes action to be taken depending upon their values, but in a preferred embodiment of the present invention it does provide a user a convenient way to express other constructs. More specifically, they can be used to represent "wildcard macros" for a construct such that the construct will be effectively replicated for each instance of an object. In this way, a user will not have to physically type out each construct. For example, referring to the automobile problem above, the formula "?auto.total-profit:=total year.?auto.profit" (where "?auto" is the object variable and total is a function which totals the values of all object-attribute pairs associated with a designated object class) is equivalent to writing the formulas "Toyota.total-profit:=total year.Toyota.-profit", "Buick.total-profit:=total year.Buick.profit", and "Ford.total-profit:=total year. Ford.profit."

D. Object Oriented Language With Inference Engine Tool

The object oriented language with inference engine tool 414 provides an object-oriented environment for other portions of the present invention, and will now be further described below with regard to FIG. 7. This tool 414 can be divided into three sections having separate, but related functions. The implementation of the object oriented language module 701 itself of the tool 414 can further be divided between a Multiple Inheritance Object Hierarchy Module 702, and a Procedural Attachment Module 704. These modules, as well as the Inference Engine Module 706, are described below.

1. Object Oriented Language Module a. Multiple Inheritance Object Hierarchy Module The Multiple Inheritance Object Hierarchy Module 702 is the portion of the Object Oriented Language Module 701 that performs the task of implementing the object hierarchy 410, and then of maintaining it. Essentially, this module 702 receives information relating to the objects and attributes that are entered by a user, and builds an object hierarchy 410 from that information.

Once the object hierarchy 410 is built, information relating to the constructs entered by the user can be accepted by the Multiple Inheritance Object Hierarchy Module 702. This module 702 will attach the constructs to their appropriate location within the hierarchy.

The above concept can better be explained with regard to the Sample Problem. As indicated above, the formula "return:=profit−cost" is non-specific, and will affect all of the object-attribute pairs where "return" is an attribute. This formula thus belongs with the highest (most general) object class, which in this case is year-project. When a user enters this formula, the Multiple Inheritance Object Hierarchy Module 702 will tell the present invention where in the object hierarchy 410 this formula is to be attached. In this case, this formula would be attached to the "return" attribute of the object class year-project. The actual way that constructs such as formulas are attached will be described below with regard to the Procedural Attachment Module 704.

Once an object hierarchy 410 is constructed and constructs are attached to the object hierarchy 410, the Multiple Inheritance Object Hierarchy Module 702 also performs the hierarchical searching for constructs up the object hierarchy 410. Thus, if the value of an object-attribute pair is desired, the Multiple Inheritance Object Hierarchy Module 702 first checks if that object-attribute pair has a "to-compute" procedural-attachment (procedural attachments are also commonly referred to as demons) attached to it directly (that is, it checks the most specific point in the hierarchy, namely, the fully specified object-attribute pair itself).

If no "to-compute" demon is directly attached to the object-attribute pair, then the Multiple Inheritance Object Hierarchy Module 702 will check the object hierarchy 410 it built to see if that particular object-attribute pair has a "to-compute" demon that it is to inherit. Using the Sample Problem, if the value of a specific object-attribute pair such as "1988-p1.return" is desired, the Multiple Inheritance Object Hierarchy Module 702 would first check for any constructs directly attached, and then would search up the hierarchy. When the formula "return:=profit−cost" is eventually found at the object class "year-project", then the "behavior" (computation) associated with the formula will be inherited by 1988-p1.return. The end result will be the assertion of a value to 1988-p1.return. The specific way in which the search of the object hierarchy 410 is performed in a preferred embodiment of the present invention was discussed above with regard to FIGS. 9a and 9b.

In a preferred embodiment of the present invention, the Multiple Inheritance Object Hierarchy Module 702 is used in a similar fashion to maintain and search other procedural attachments, such as "if-set" and "affects" procedural attachments, as will be explained below.

b. Procedural Attachment Module

Procedural Attachment in general refers to techniques for associating with an object-attribute pair a way to determine what the value of that object-attribute pair (or some related object-attribute pair(s)) should be. As indicated above, constructs such as formulas which are entered into the present invention by a user are translated into various procedural attachments. It is these procedural attachments that actually define relationships between various object-attribute pairs as defined by a problem. In the present invention, the Procedural Attachment Module 704 implements and maintains these procedural attachments.

In a preferred embodiment of the present invention, it is the procedural attachments which actually become attached to the object-attribute pairs. Thus, when a construct is said to be attached to an object-attribute pair, it is more specifically a procedural attachment which becomes attached. Also in a preferred embodiment of the present invention, only the formula and trigger constructs, as well as the dependencies implicit in formulas, triggers, and rules, are translated into procedural attachments which become attached to object-attribute pairs. The actual way in which the constructs are translated into procedural attachments in a preferred embodiment of the present invention will be discussed below with regard to FIG. 10, and the attachment of constructs generally will also be discussed further below with regard to FIG. 11.

In a preferred embodiment of the present invention, there are several procedural attachments which are used. One is called a "to-compute" procedural attachment, which indicates the arithmetic/logical expression to be computed to arrive at a value for the object-attribute pair to which the "to-compute" is attached. Another is an "affects" procedural attachment, which indicates what object-attribute pair(s) are affected by a change in value of the object-attribute pair to which the "affects" procedural attachment is attached. Another is called an "if-set" procedural attachment, which, when the value of the object-attribute pair to which the "if-set" is attached is changed, actually initiates a recomputation of one or more other object-attribute pairs.

It is noted that conventionally, a "to-compute" procedural attachment is often referred to as an "if-needed" procedural attachment, and an "if-set" procedural attachment is often referred to as an "if-added" procedural attachment. In a preferred embodiment of the present invention, the "if-set" procedural attachment calls a function which propagates the various dependencies which may be affected by a change in a particular object-attribute pair.

An example of how the procedural attachment module 704 utilizes procedural attachments in a preferred embodiment of the present invention will be discussed using the Sample Problem in 2 dimensions, and the formula "p1.return:=p1.profit−p1.cost." When this formula is entered by a user, a "to-compute" procedural attachment is attached to p1.return, indicating the specific formula above (that is, indicating exactly how to compute a value for p1.return). Thus, this procedural attachment indicates the formula that is needed to arrive at the value that is to go into the object-attribute pair p1.return.

With regard to the other object-attribute pairs which are a part of the formula (that is, p1.profit and p1.cost), each of these object-attribute pairs would have an "affects" procedural attachment attached to them, indicating that a change in their value would affect the object-attribute pair p1.return. In addition, they would also each have an "if-set" procedural attachment attached to them, indicating that if the value of either is changed, a re-computation of the object-attribute pair they affect is to be initiated. It is emphasized, though, that it is the "to-compute" procedural attachment attached to p1.return that actually determines how the re-computation will take place. Because of this, it can be said that the formula itself is "attached" to p1.return. Another example is set forth below which relates to the trigger construct. Assume that a user enters a trigger which indicates that if p1.taken="yes", then p5.taken="yes." The present invention would attach "if-set" and "affects" procedural attachments to the object-attribute pair p1.taken, indicating that a change in its value will affect the object-attribute pair p5.taken. In addition, a "has-demons" procedural attachment is associated with p1.taken that corresponds to the computation indicated by the trigger itself. Thus, if and only if the value of p1.taken is changed, the trigger will be evaluated and the value of p5.taken may be changed accordingly. In general, the trigger is said to be "attached" to p1.taken.

It should be noted that the concept of procedural attachment is closely intertwined with that of multiple inheritance and the object hierarchy. For example, when the value of an object-attribute pair such as p1.cost is changed, there may not be a procedural attachment such as an "if-set" attached directly to that object-attribute pair. However, it may be attached to project.cost (that is, the more general object class). Thus, the present invention must search up the object hierarchy 410 to find this procedural attachment.

2. Inference Engine Module

A preferred embodiment of the present invention contemplates the use of both forward chaining rules (that is, data-driven rules) as well as backward chaining rules (that is, goal-driven rules). Forward chaining rules can be thought of as a kind of generalized trigger. With a trigger, if the value of an object-attribute pair is changed, then the values of other object-attribute pairs may be changed. Rules are similar in that when one or more object-attribute pairs are changed, conditions are evaluated to see if some action should be taken with regard to the same or other object-attribute pairs. A difference, though, between rules and triggers, is that rules can be "triggered" by taking into account the state of many object-attribute pairs, whereas triggers can only be "triggered" by the change in value of a single object-attribute pair.

The rules that are contemplated for use with the present invention can refer either directly to the object-attribute pairs, or as part of an external source such as a database which can then be easily accessed by the present invention. An example of a simple rule is given above with regard to FIG. 27.

E. Overview of General Operation of Problem Representation Facility

An overview of the operation of the PRF 208 will now be explained below with reference to FIG. 8.

The first four blocks shown (802, 804, 806 and 808) indicate the way in which a problem is represented in a preferred embodiment of the present invention. Block 802 indicates that the user first sets up the object-attribute pairs in an N dimensional table. In order to do this, the user enters the dimensions, objects and the attributes that are to be used in the problem. As indicated above, each new dimension entered adds an additional dimension to the N dimensional tabular representation, and to the problem itself.

Once the dimensions, objects and attributes have been entered, the present invention then creates from this information the object hierarchy 410, as indicated by block 804. As indicated above, the hierarchy goes from most specific to least specific (that is, the more specific objects inherit behaviors from the more general object classes). The creation of the object hierarchy 410 is implemented procedurally as described above by the Object Oriented Language With Inference Engine Tool 414 as the user enters the dimensions, objects and attributes of the problem.

Once at least a minimal object hierarchy 410 has been implemented, the present invention then allows a user to enter constructs, as indicated by block 806. Thus, once the object-attribute pairs are established, the user is free to enter (or attach) values, formulas, etc. to these object-attribute pairs. Furthermore, additional dimensions, objects and attributes can be added after constructs are entered.

In the preferred embodiment of the present invention, after a construct is entered, the present invention parses the construct, translates it to a form evaluable by the Lisp Interpreter 416, adds any dependencies, and then attaches the construct to its appropriate location, as indicated by block 808. As indicated above, the use of a Lisp Interpreter 416 is used in a preferred embodiment of the present invention, and it should be noted that any technique for interpreting the procedures of the translated construct would suffice. Such a technique is not limited to the use of interpreters and could include, for example, the use of a compiler.

As used here, "parsing" means that the present invention translates the constructs into canonical form which can be further "translated" to evaluable expressions (as mentioned above, the present invention contemplates an embodiment which uses a compiler, wherein the expressions would be further compiled to executable code). "Add dependencies" means that the present invention interprets from the constructs (if the constructs are formulas, triggers, or rules) what dependencies are implicit in those constructs, and associates them with the appropriate object-attribute pair.

Once the dependencies have been so added, then the constructs are "attached" to their proper places. If the constructs are formulas or triggers, procedural attachments are attached to the proper object-attribute pair. The events indicated by block 808 will be explained in more detail below with regard to FIG. 10.

The portion of the present invention discussed above and indicated by blocks 802, 804, 806 and 808 broadly represent that portion of the present invention which is used in the representation of a problem. In order to then obtain a result for a problem, a user needs to be able to assign values to object-attribute pairs, and then evaluate the effect that the propagation of values has on the goals (or more specifically, on the score) of the problem. In a preferred embodiment of the present invention, the user is given the ability to manually make assignments of values, and then to note the effect that each of these assignments has. This is indicated by block 810, and allows a user to easily perform a "what-if" analysis on the problem. However, it can take an unreasonable amount of time to manually try different values for different object-attribute pairs in order to obtain an optimum result, especially for a complex problem.

The PSE 204 described in detail further below automates and expedites the value assignment (and goal optimization) procedure. In general, the PSE 204 tries to achieve the best score by intelligently manipulating only certain values of object-attribute pairs and only by certain amounts, so that every conceivable combination of possible values need not be tried. As indicated above, in a preferred embodiment, the PRF 208 computes which of the object-attribute pairs could be decision variables based upon which object-attribute pairs are independent, and then allows a user to choose which ones are actually to be used as decision variables in solving the problem. The information regarding which object-attribute pairs were chosen by a user to be decision variables is then sent to the PSE 204.

While it is possible to find a solution to a problem using only the PRF 208, the PSE 204 makes problem solving far more practical. However, by allowing a user to manually manipulate the values in the problem, the user can become convinced that their representation of the problem appears to be operating correctly, and can easily conduct a "what-if" analysis.

F. Parse, Translate, Add Dependencies and Attach Constructs

Figure 10:
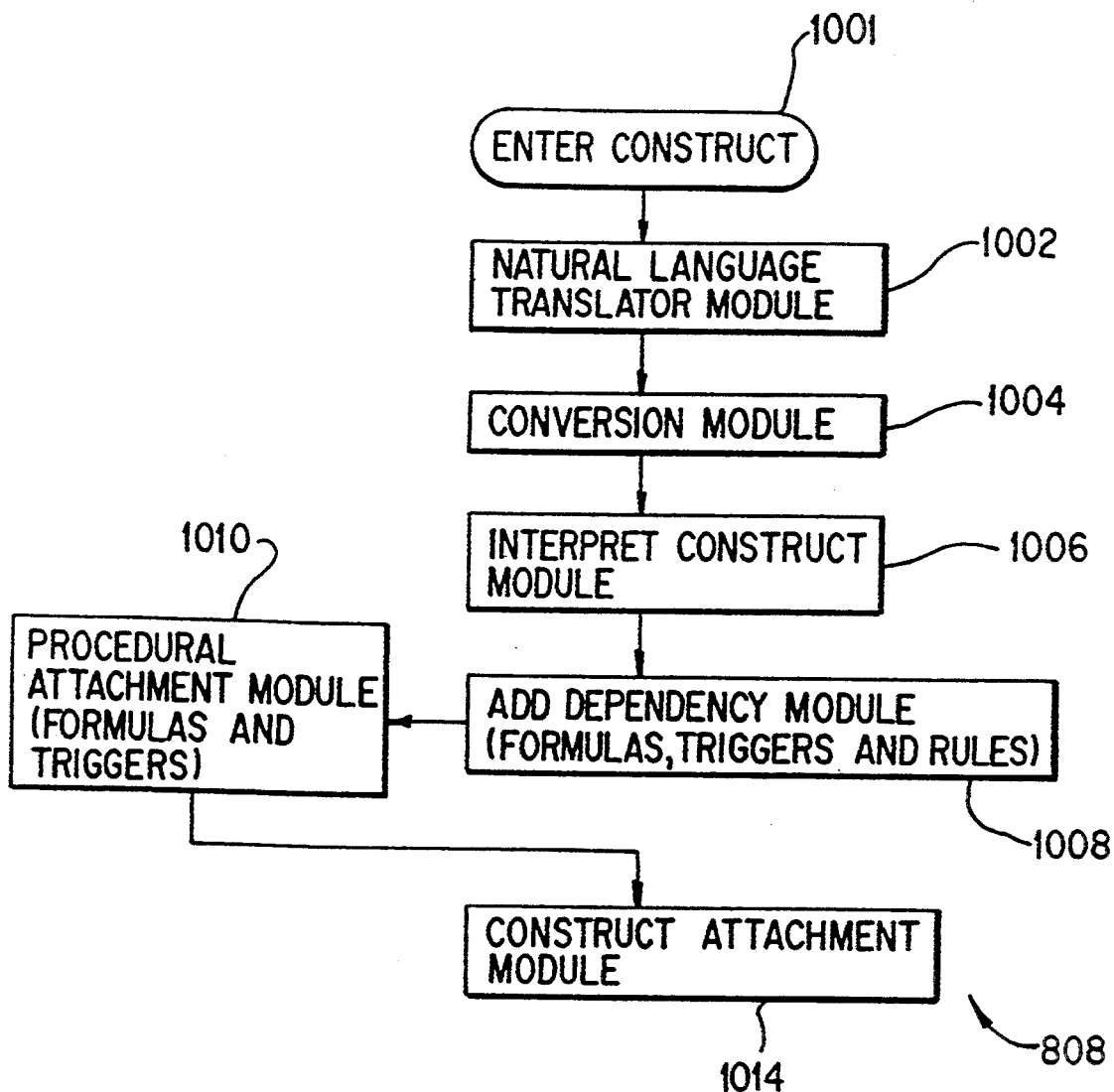
FIG. 10 is a diagram of the operation of how a construct is parsed, translated, and attached.

A more detailed description of the treatment of constructs as they are entered into and processed by the present invention is described below with regard to FIG. 10.

The constructs can be entered into the present invention (as indicated by block 1001) using any number of input devices. Once entered, the constructs are processed by a Natural Language Translator Module 1002 (which contains the natural language translator 404 described above with regard to FIG. 4). This module will convert constructs entered in natural language format into representation language format. Where a construct is entered using a combination of the natural language and representation language, the Natural Language Translator Module 1002 will convert those portions of the construct written in the natural language into the representation language. Since a user is always given the option of entering constructs using natural language in whole or in part, in a preferred embodiment of the present invention, the entered constructs are always processed by (that is, passed through) the Natural Language Translator Module 1002.

After the constructs have passed through the Natural Language Translator Module 1002, they are then directed to a Conversion Module 1004 which converts the constructs from a user token (that is, a user-entered construct which may be in a short-hand form) to an internal object name (that is, a form which will be recognized and fully understood by subsequent portions of the present invention). Thus, if a user enters a construct in a short-hand manner, then the conversion module 1004 will add onto the construct the omitted objects in general form. Again, using the Sample Problem above, when the formula "return:=profit−cost" is entered by the user, the Conversion Module 1004 will convert it into "year.project.return:=year.project.profit−year.project.cost." Similarly, if the formula "1988.return:=1988.profit−1988.cost" is entered by the user, the Conversion Module 1004 will convert it into "1988.project.return:=1988.project.profit−1988.project.cost."

In a preferred embodiment of the present invention, the objects in the above example would not actually internally be given the name of the objects as the user entered them, but would be given a modified name indicating which table they belong to. The reason for this is that there might be two different tables in which the user entered objects having identical names. In order to avoid possible confusion, the Conversion Module 1004 adds a suffix on the end of each object identifying that object with a particular table. Thus, the Conversion Module 1004 supplies objects to the constructs if they were left off by the user, and also gives the objects an internal name to identify them with a particular table.

Once the constructs are converted by the Conversion Module 1004 as noted above, they are then acted upon by the Translate Construct Module 1006. This actually converts the constructs into an even lower-level language which can be evaluated by the present invention. For formulas and triggers, the constructs will be converted into a language which can be understood by the Object-Oriented Language With Inference Engine Tool 414. In a preferred embodiment, this language is LISP. In the case of rules and critics, these constructs are converted into a form which is executable by the inference engine portion of the Object-Oriented Language With Inference Engine Tool 414. In this way, this module 1006 can convert the constructs into a form that can be acted upon by the Object-Oriented Language With Inference Engine Tool 414.

While the Translate Construct Module 1006 is translating formulas, triggers and rules, the Add Dependency Module 1008 records any dependencies implicit in these constructs in the following fashion: For formulas, assert (as will be described below) that each object-attribute pair referred to in the right hand side (rhs) of a formula affects the object-attribute pair referred to on the left hand side (lhs). For triggers, assert the opposite—that the object-attribute pair on the lhs of the trigger affects each object-attribute pair on the rhs. For rules, assert that each object-attribute pair on the lhs of the rule affects every object-attribute pair on the rhs of that rule.

In a preferred embodiment of the present invention, dependencies for rules are not maintained for the purpose of propagating values. The propagation of values in rules is handled automatically by the Inference Engine Module 706. Dependencies for rules are maintained solely for the purpose of correctly maintaining "variables of interest", which will be described later in detail.

Dependencies are stored (that is, asserted) as "affects" (for rules as "r-affects") procedural attachments from the object-attribute pair from which they originate. This is shown in the following two examples. First, for the formula "project.return:=profit−cost", the "affects" procedural attachment to the object-attribute pair, "project.profit" is "return." The same "affects" procedural attachment is added to "project.cost."

Second, consider the trigger which indicates that if p1.taken="yes" then p5.taken:="yes", else p7.taken:="yes." To the object-attribute pair "p1.taken" will be added (by module 1008) the "affects" procedural attachment which is "p5.taken p7.taken."

In a preferred embodiment of the present invention, the goals are also converted into rules. This is done for ease of implementation, in that if there is at least one object variable in a goal, it is easier to convert the goal into a rule. The reason for this is that goals are not "attached" to a particular object or class, but may refer to many different objects, and thus it would be otherwise difficult to instantiate the object variable(s).

Once the constructs have been broken down to a lower level form by the Translate Construct Module 1006, and dependencies have been added by the Add Dependency Module 1008, the present invention then utilizes the Object Oriented Language With Inference Engine Tool 414. In the following description, it should be noted that modules 1008, 1010 and 1014 incorporate portions of the Tool 414. While the modules described above and below could be broken up in any number of ways, the modules are depicted and described in their current form for purposes of conceptual simplicity.

The Procedural Attachment Module 1010 creates procedural attachments out of the formula and trigger constructs. Thus, these constructs are converted into procedural attachments ("to-compute" and "has-demons", respectively), by this module 1010.

From here, block 1014 attaches the constructs (or, more specifically in the case of formulas and triggers, the procedural attachments) to their proper places. In addition to formulas and triggers, the rules, critics and goals also are attached. A more specific description of the way that these constructs are attached is described with reference to FIG. 11 below.

It is noted that the organization of the modules described above is just one embodiment of the present invention. It should be understood that the present invention contemplates other organizational schemes as well.

Figure 11:
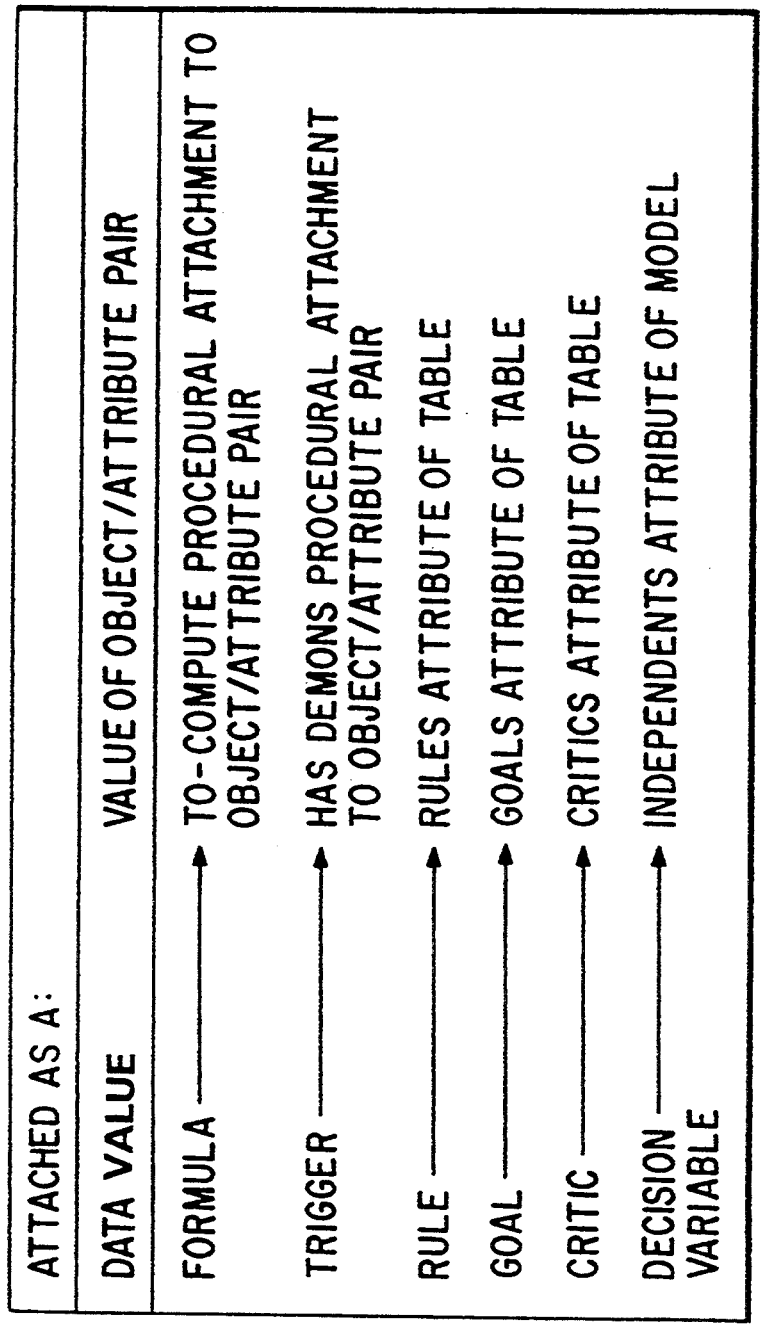
FIG. 11 is a diagram showing how a construct is represented internally.

FIG. 11 shows how the attachment of a construct is viewed by the present invention. A data value is merely attached as a value of some object-attribute pair.

Figure 7:
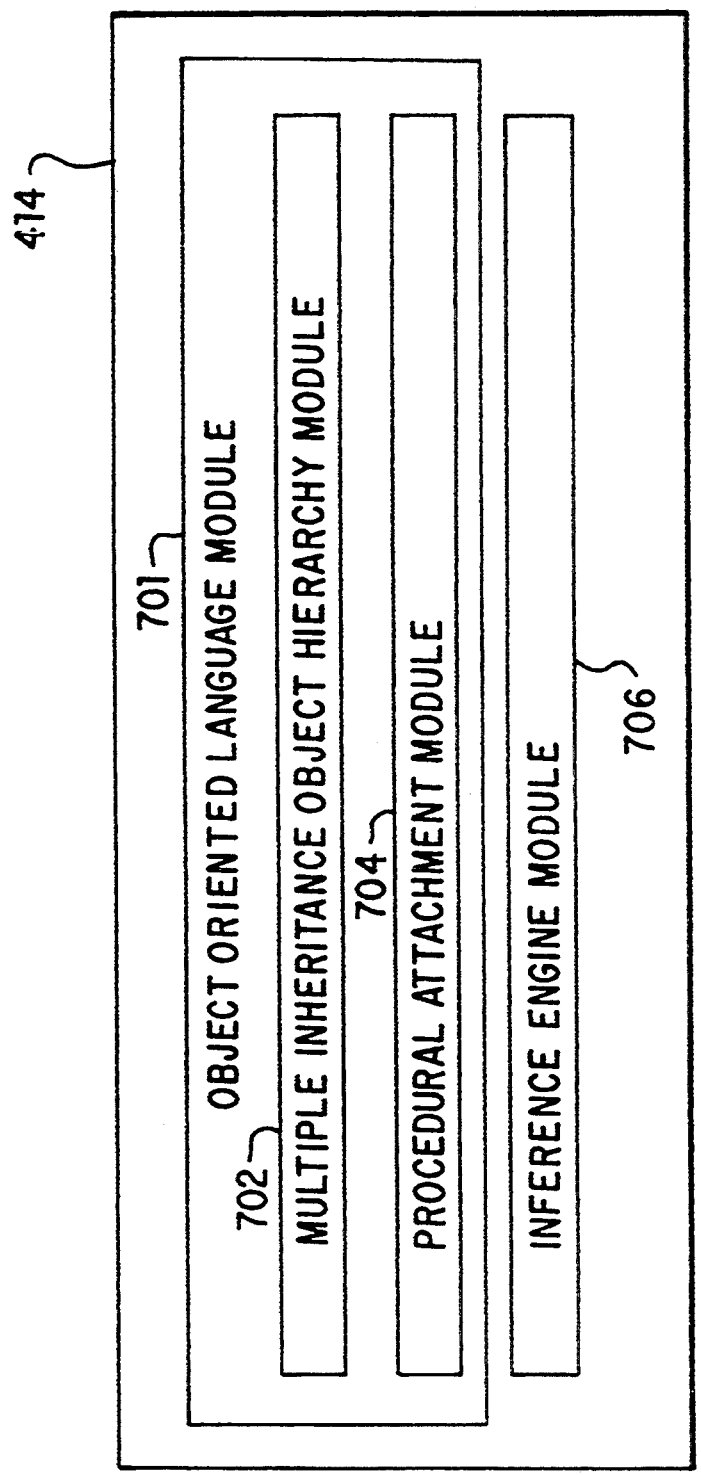
FIG. 7 is a diagram of the structure of the object-oriented language with inference engine.

As indicated with regard to FIG. 7 above, a formula is said to be "attached" to the object-attribute pair containing the value operated upon by the operands of the formula (although it is actually the "to-compute" procedural attachment that is attached). Also as indicated above, the operands of the formula will each have an "if-set" and "affects" procedural attachment attached to them as well.

Also with regard to FIG. 7 above, a trigger is attached as a "has-demons" procedural attachment to the object-attribute pair containing the value which is to affect other object-attribute pairs. As indicated above, also attached to this object-attribute pair is at least one "affects" procedural attachment.

Regarding rules, goals, and critics, even though these constructs can be made to affect individual object-attribute pairs, they are said to actually be attached to the "table" from which they were implemented. The reason for this is that each rule, goal and critic can refer to any number of object-attribute pairs, and thus they do not really belong to one particular object-attribute pair or object class. Consequently, what is done is to attach these constructs in such a way that they are indexed so that they attach to a particular table. For example, in a preferred embodiment of the present invention, a rules attribute is established within a table that has the internal names of the different rules that belong to that table. Thus, each time a new rule is added, the name of that rule is added to the rules attribute of the table. For this particular purpose, the table itself is considered an object.

A decision variable is said to be attached to the "independents" attribute of the model. In this way, it is said to be attached to (and thus belongs to) the entire model (that is, the entire problem).

In essence, with regard to formulas and triggers, the present invention provides the user with a high-level way of writing procedural attachments. The present invention serves to break down the high-level construct into a lower-level object-oriented language that the Object-Oriented Language With Inference Engine Tool 414 can manipulate, and attach to the various entities within the object hierarchy 410. In another embodiment of the present invention, if the user were familiar with Lisp, rather than writing the construct, (s)he could write a function call that attaches a "to-compute" to an object-attribute pair and write the Lisp code directly. So in essence, part of the function of the present invention is to provide an interface to an object-oriented programming environment. Again, it must be noted that this invention can be implemented using any formal procedural language used to program general purpose computers. The presence of a Lisp interpreter only facilitates the interpretation of formula constructs, but these constructs could be interpreted directly by other interpreters, or, as an alternative, the constructs could be translated to a form, such as machine language, which can be evaluated directly by the CPU 102.

G. Operation of Dependency Machinery

Figure 12:
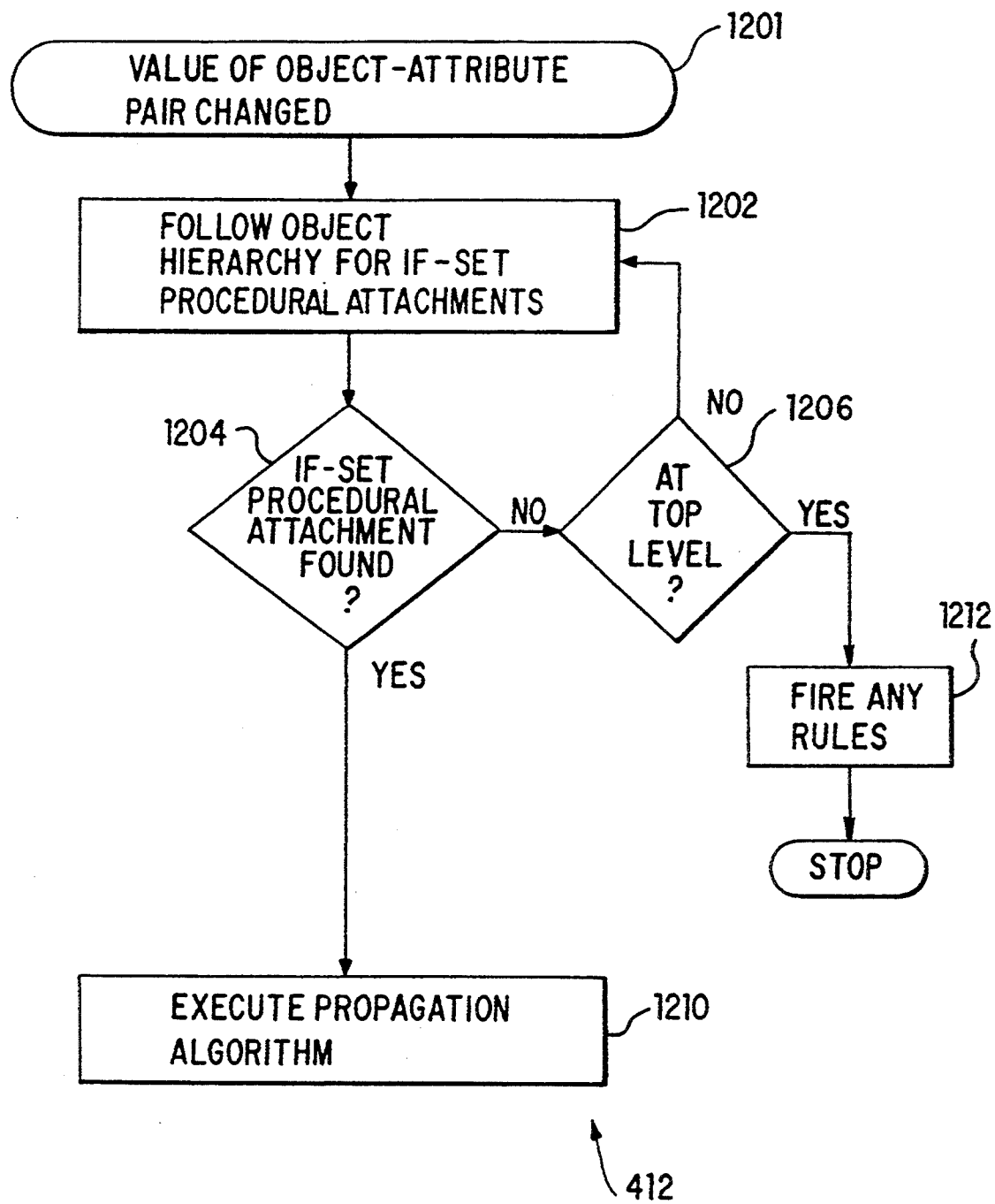
FIG. 12 is a diagram showing the operation of the dependency machinery.

The operation of the dependency machinery 412 is now described in detail below with reference to FIG. 12.

Once a problem has been represented, and the object hierarchy 410 and constructs are in place, a user will want to solve the problem (or at least determine a "good" solution). This may be done by manipulating the values of object-attribute pairs manually, by permitting the PSE 204 to do it automatically, or by some combination thereof. In any event, the dependency machinery 412 of the present invention (working in conjunction with the Object Oriented Language With Inference Engine Tool 414) will propagate the dependencies, and thus cause changes made to values of the object-attribute pairs to affect other object-attribute pairs in accordance with the problem entered by a user. As indicated above, the dependency machinery 412 of the present invention is set in motion when the value of an object-attribute pair is changed, as is shown by block 1201. When this occurs, the dependency machinery 412 causes the object hierarchy 410 to be searched for inheritable "behaviors" (see FIG. 9 and related discussion above). More specifically, the object hierarchy 410 is checked at block 1202 to see if there are any "if-set" procedural attachments attached at some level of object class. Also as indicated with regard to FIG. 9, the first object checked is the lowest member of the object hierarchy 410 (which is the actual object-attribute pair that was modified).

If no "if-set" procedural attachment is found attached directly to the object-attribute pair, then the dependency machinery 412 proceeds to search up the object hierarchy 410 (see FIG. 7 and related discussion above). At each object class, the present invention will check for any "if-set" procedural attachments that the object-attribute pair of the changed value can inherit, as indicated by decision block 1204. If none are found, then the present invention determines if the hierarchical search has reached the top level (that is, the highest object class), as indicated by block 1206. If the search has reached the top level without finding any "if-set" procedural attachments, then there were no dependencies for the object-attribute pair to inherit. Thus, the change in the value of the object-attribute pair did not have any effect on any formulas or triggers in the problem.

If the result of decision block 1206 is "no", then any rules affected by the change in value that are "ready to fire" (that is, all conditions of the rule have become true) are "fired" (that is, their actions are executed), as indicated by block 1212. The reasoning for this is explained below with regard to block 1404 in FIG. 14. If, however, an "if-set" procedural attachment is found (either directly attached to the changed object-attribute pair or else inherited), then the propagation algorithm is executed, as indicated by block 1210.

The explanation of the operation of the dependency machinery 412 up to this point accounts for the object-attribute pairs affected directly by the attached construct alone. However, it is likely that if a change in a first value causes a change in a second value by virtue of a first construct, the change in this second value will cause a change in other values by virtue of other constructs. Thus, a change in one value could cause a whole propagation of values via a multitude of constructs. The propagation algorithm mentioned above with regard to block 1210 handles these propagations in a logical fashion. This propagation algorithm is executed each time that an "if-set" procedural attachment is found. A more detailed discussion regarding this propagation algorithm is presented below with reference to FIG. 13.

The basic premise behind the propagation algorithm 1210 is that when a value is changed in an object-attribute pair, all the object-attribute pairs that would be affected by virtue of their dependencies are put into a logical order, and any redundant recomputation is eliminated. After the order has been computed, the procedural attachments are then executed. In general, the object-attribute pairs are ordered so that their corresponding procedural attachments will be put into the order only after all values which they require have themselves been computed by other procedural attachments. For example, for the formula "return:=profit—cost", any formulas or triggers which would affect the object-attribute pair corresponding to "return" would not be evaluated until all formulas or triggers which affect the object-attribute pair corresponding to "cost" are evaluated first.

The order of propagation (that is, the order in which the object-attribute pairs are to be evaluated) is cached and pushed onto a stack so that the object-attribute pairs can be "popped off" (that is, removed) one by one during the actual execution of the propagation. In addition, caching allows the order of the propagation to be computed only once, so long as only values are manipulated. However, if any constructs themselves are added, deleted, or otherwise modified, then the order of the propagation would have to be re-computed.

Figure 13:
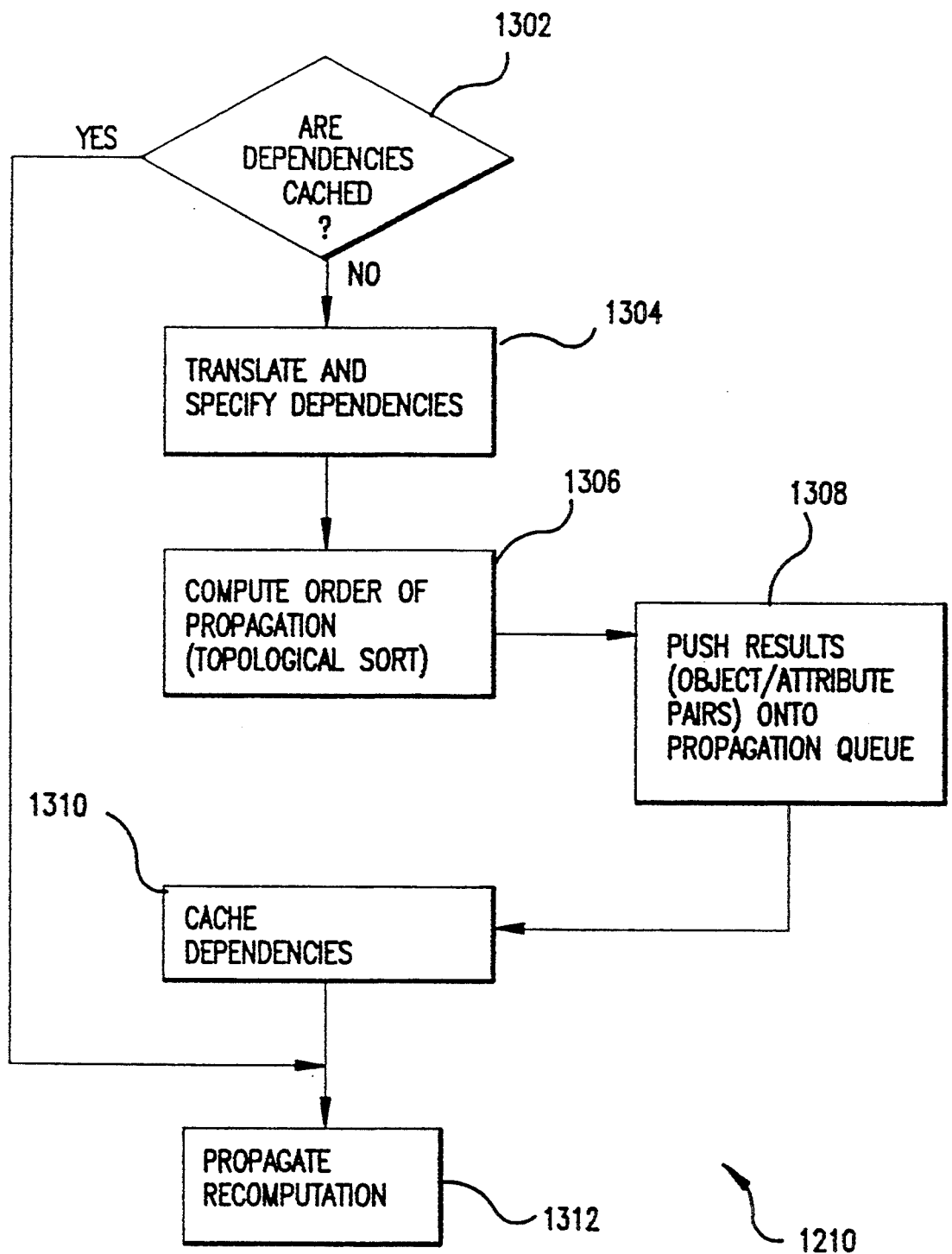
FIG. 13 is an expanded diagram showing the operation of the propagation algorithm of FIG. 12.

The propagation algorithm described above will now be further explained with reference to FIGS. 13 and 14. The present invention first tests whether the dependencies of the changed object-attribute pair have already been cached, and therefore ordered. This is indicated by decision block 1302. Thus, what is tested is whether the problem itself has been changed (rather than just a value). If the answer to decision block 1302 is "yes", then the present invention will not re-compute the order of propagation.

If the dependencies have not been cached, then the dependencies are first translated and specified (if the corresponding objects are in non-specific form) at block 1304. This means first of all that the object-attribute pairs that will be affected by the change in the initially changed value are determined. This is accomplished by following the "affects" dependencies from the object-attribute pair having the initially changed value to all other object-attribute pairs that are directly or indirectly (that is, by virtue of other "affects" dependencies) affected.

"Translate and specify" also means that the dependencies are translated from a non-specific form into a form where the objects are specific, and thus a specific object-attribute pair is referred to. For example, assume that the formula "return:=profit—cost" has been entered by a user in the Sample Problem. Then, if the object-attribute pair "1989-p2.cost" is changed, the present invention will search up the object hierarchy 410 until it finds the dependency "year-project cost affects return." This dependency is translated and specified in this case into the dependency "1989-p2.cost affects 1989-p2.return." Any direct dependencies or inherited dependencies from "1989-p2.return" will then be translated and specified, and so on, until the entire resulting chain of dependencies has been translated and specified.

At block 1306, the order of propagation of the translated and specified dependencies is computed using a Topological Sort. The Topological Sort of the type used in this invention is standard, and can be found in most textbooks on sorting or advanced data structures. See, for example, Knuth, Donald, "The Art Of Computer Programming" (Volume I), Addison-Wesley, 1973.

In addition to sorting as indicated above, the Topological Sort also serves to detect whether the propagation is cyclic. An example of a construct that would give rise to cyclic propagation be the formula "profit:=profit+4." Such a construct would cause certain object-attribute pairs to affect themselves.

In a preferred embodiment of the present invention, the user will be alerted to the existence of a cyclic construct. However, since it is possible that the user intended to implement a cyclic construct (and in keeping with the general robust character of the present invention), the present invention will not terminate if a cyclic construct is entered. It merely will alert a user of this fact.

Once the results of the Topological Sort have been obtained, then the sorted object-attribute pairs are pushed onto a propagation queue, and cached for later use, as indicated by blocks 1308 and 1310. When cached, the dependencies are attached to the particular object-attribute pair that started the whole propagation sequence. This keeps track of what sequence of sorted object-attribute pairs are to be used when the value of a particular object-attribute pair is changed.

From the sequence of events shown above, it should be noted that in a preferred embodiment of the present invention, the dependencies are only cached at the lowest level in the object hierarchy 410, and not at the general objects level. This is why they are first translated and specified, as indicated by block 1304 above.

After the Topological Sort and caching of dependencies, the actual propagation of values based on the sorted object-attribute pairs (and associated dependencies) is executed. That is, the present invention will propagate recomputation, as indicated by block 1312. This will be explained in more detail with regard to FIG. 14. It should be noted that if the result of decision block 1302 is "yes", then the present invention will go right to block 1312, and will not re-sort the object-attribute pairs.

Figure 14:
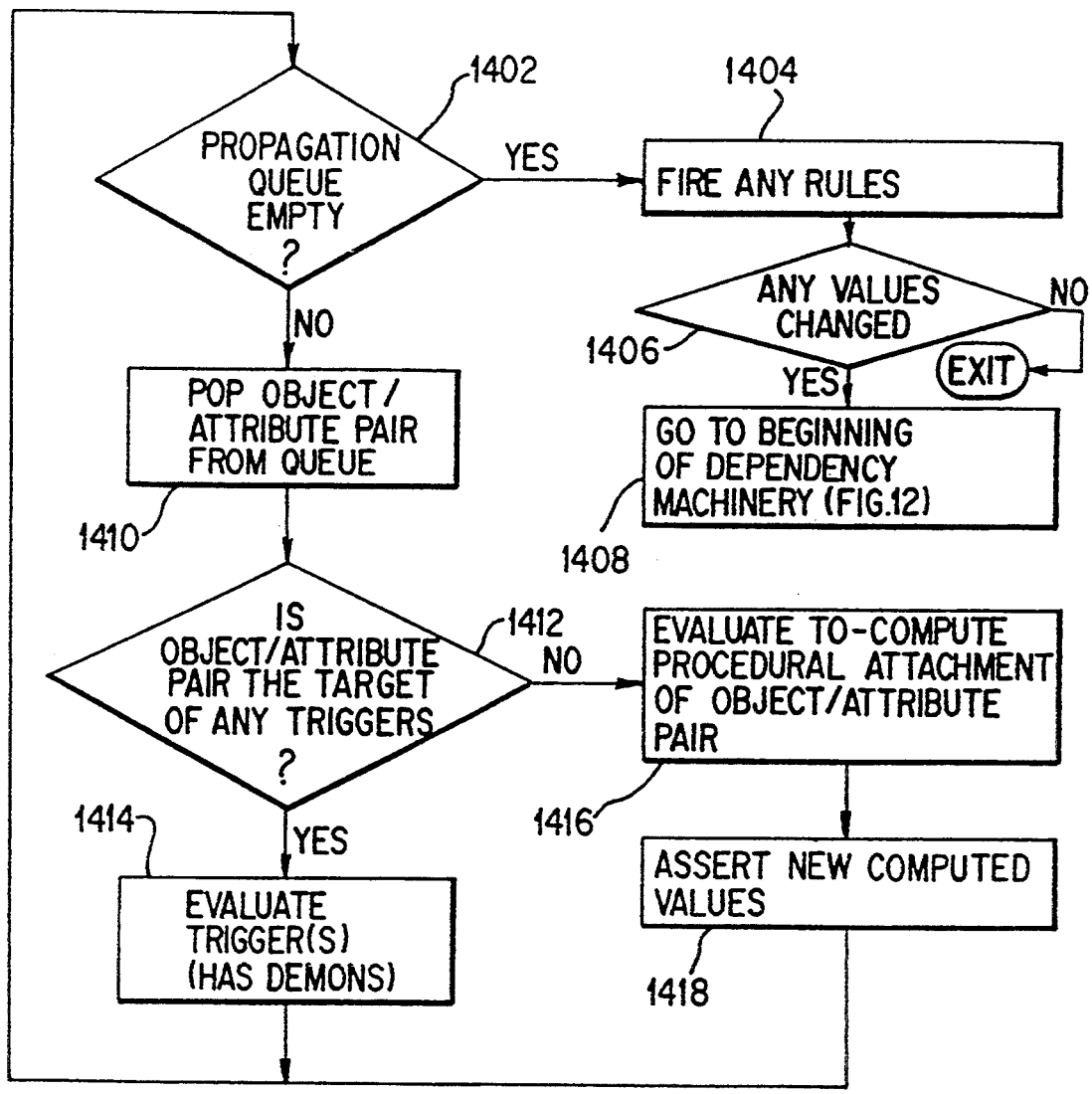
FIG. 14 is an expanded diagram showing the operation of the propagation of the recomputation of FIG. 13.

Referring to FIG. 14, the present invention checks if the propagation queue containing the object-attribute pairs is empty. This is indicated by decision block 1402. If the propagation queue is not empty, then this means that there are more procedural attachments (triggers or formulas) to the object-attribute pairs in the sorted sequence to evaluate. If this is the case, then the object-attribute pair at the top of the queue is popped off, as indicated by Block 1410. These will either be object-attribute pairs that were just sorted (as indicated by block 1306), or had been previously sorted and were already cached (that is, the previous result of decision block 1302 was "no").

Still referring to FIG. 14, if the object-attribute pair that is popped off the queue is the target (that is, on the rhs) of any triggers, then the "has-demons" procedural attachments representing those triggers are evaluated, as indicated by decision block 1412 and block 1414. If it is not the target of any triggers, then the "to-compute" procedural attachment (formula) for the object-attribute pair is evaluated, as indicated by block 1416. The reason that decision block 1412 is constructed in this fashion is so that if an object-attribute pair is on the right hand side of a trigger and the left hand side of a formula, only the trigger will be evaluated. In this way, in a preferred embodiment of the present invention, triggers are given priority over formulas should the two come into conflict regarding an object-attribute pair.

When the propagation queue is empty, then any rules which have advanced (due to changes in object attribute pairs that they reference) and are ready to fire, are fired. These rules are only fired after the whole propagation queue is empty (that is, after all triggers and formulas have been evaluated) so that the rules will take precedence over any other otherwise conflicting formulas or triggers.

Note that if the firing of the rules causes changes in values of object-attribute pairs, further propagation of dependencies may be necessary at this point. Thus, the present invention tests if any values have been changed as a result of firing the rules. This is indicated by decision block 1406. If values have been changed, then the flow of computation is directed back to the beginning of the Dependency Machinery (at FIG. 12, block 1201), as indicated by block 1408.

Again, it should be noted that the PRF 208 could function without the PSE 204. In a preferred embodiment of the present invention, the only items communicated to the PSE 204 by the PRF 208 are the representative functions of the objectives and the targets, a list of decision variables as chosen by a user, the types and ranges of those decision variables, and explicit dependency information indicating which targets and objectives are affected by which decision variables. However, the PSE 204 also indirectly uses the information entered via constructs such as formulas and triggers, by having the values of object-attribute pairs represented within the functions be computed according to these constructs. In a preferred embodiment, this is accomplished by allowing the PSE 204 access to the Object-Oriented Language With Inference Engine Tool 414.

It should be noted that the structure of the PRF 208 described above refers to a preferred embodiment of the present invention, and that other types of structural arrangements are also contemplated. For example, since the PSE 204 in a preferred embodiment also utilizes the Object Oriented Language With Interface Engine Tool 414, this tool 414 can also be thought of as being separate from the rest of the PRF 208. The difference between these two embodiments, however, is merely a matter of conceptualization.

With the LAN environment as described above, it is contemplated that each PRF 208 on each workstation and the PSE 204 on a server would have a version of the Object Oriented Language With Interface Engine Tool 414, and that the PRF 208 would send the PSE 204 all of the object definitions and constructs required for a local version of the problem. In this way, each piece could work independently of the other, with only specific problem information (that is, constructs, variable assignments, time limit parameters) being passed between the workstation and server.

III. Problem Solving Engine

A. Overview Of Problem Solving Engine

An overview of the Problem Solving Engine (PSE) 204 is set forth below with reference to FIG. 15.

In a preferred embodiment of the present invention, when the PSE 204 is requested by the PRF 208 to act on a problem, the PSE 204 receives from the PRF 208 a description of the problem as a set of functions representative of the goals (referred to generally as "goal functions"). The PSE 204 also receives from the PRF 208 a set of the decision variables as selected by a user, the legal ranges over which those decision variables can vary, the data types of the decision variables, and dependency information which indicates which decision variables affect the value of each goal function.

It should be noted that the present invention also contemplates deducing the dependency information empirically during execution of the PSE 204. However, it is more efficient to allow the PRF 208 to supply this information initially.

As indicated above, the decision variables are accompanied by range information for each variable. This may consist of two extreme values (for numeric quantities) or an enumerated set of values (for decision variables taking discrete, symbolic values). The PSE 204 can evaluate the goal functions directly, either because it shares direct access to the Object Oriented Language With Inference Engine Tool 414 (and thus has access to a representation of the problem) along with the PRF 204, or because the PRF 208 has communicated the problem to the PSE 204 (as would occur when the processes are operating on distinct processors, connected by a LAN as in FIG. 2b). In this latter case, the PSE 204 would have its own version of the Object Oriented Language With Inference Engine Tool 414.

The present invention also contemplates the case where the PSE 204 causes the PRF 208 to evaluate each goal function after a change in values in the decision variables. The PRF 208 (which has its own version of the Object Oriented Language With Inference Engine Tool 414) would then communicate the values of each goal function back to the PSE 204, giving the PSE 204 the information it normally achieves directly through evaluation of the goal functions. In addition, the present invention further contemplates that the PSE 204 could be used with any type of entity which is capable of evaluating goal functions sent by the PSE 204.

The PSE 204 processes the description of the problem received from the PRF 208 using initialization routines designated Init Numeric 1502. This set of functions received from the PRF 208 can be broken down by the type of goals they represent into objective and constraint functions. The objective functions are a result of the "objective" constructs used in representing the problem, and the constraint functions (also called "constraints") are a result of the "target" constructs. More specifically, these objective functions are functions whose value (that is, the value of the function itself) is sought to be minimized or maximized. Constraint functions are functions whose values are to be held (or attempted to be held) to a certain realm of values (as indicated by the targets entered by a user). Examples of such targets have been set forth above.

As indicated above, although the PSE 204 does not directly receive any constructs such as formulas, triggers, etc., from the PRF 208, it nonetheless uses the information represented by these constructs indirectly. More specifically, when a value for a decision variable (represented within the PRF 208 by an object-attribute pair) is changed, the PSE 204 will obtain the value for the objective and constraint functions by accessing (directly or indirectly) the Object Hierarchy 410 within the PRF 208. In essence, when the PSE 204 changes the value of a decision variable, it uses the Object Hierarchy 410 within the PRF 208 to propagate that change to any other values that need to be changed due to constructs such as formulas and triggers. The effect that these changes had on the constraint and objective functions is then received by the PSE 204. In this way, the PSE 204 can test various values of the decision variables and analyze their effects.

The PSE 204 takes those objective and constraint functions which are representative of the problem represented by the PRF 208, and builds a purely numerical model which it uses to interact with the PRF 208 in solving the problem. In a preferred embodiment of the present invention, the amount that each objective and target is weighted and scaled is obtained from the PRF 208 as part of the received functions. The way in which weights are used in the functions noted above is that the weights are placed on the goals exponentially. For example, if a goal of normal importance is given a weight of $N^1$, then a goal which is given the next higher level of importance would be give a weight of $N^2$, and the next higher level is given a weight of $N^3$. In contrast, the scaling factor is simply used as a divisor for the value of the function.

In a preferred embodiment of the present invention, the objective functions (the summation of which is known as the "pure" objective function) are combined with the constraint functions to form a single combined objective function. In creating this combined objective function, the PSE 204 sums the weighted, scaled objective functions and a penalty function applied to the weighted, scaled violations of the constraint functions violations (that is, the contributions of constraint functions where the constraints are not satisfied). Of course, it should be understood that the functions need not be combined, nor need they be combined in the manner set forth above. Also, in a preferred embodiment of the present invention, the constraint functions alone, and the pure objective function is also analyzed and used in various portions of the PSE 204.

In a preferred embodiment of the present invention, the objective functions, constraint functions, and combinations thereof as set forth above may contain one or more functions of decision variables directly, and/or may contain one or more functions (functions of a variable which is not a decision variable) which are affected by the decision variables. When a function of a decision variable is in one of the functions mentioned above, the function is said to "contain" the decision variable, and its value.

Also in a preferred embodiment of the present invention, constraint functions which incur numeric errors during their evaluations, such as division by zero, are assigned a specific unit of violation.

In transferring information from the PRF 208 to the PSE 204, a mapping (consisting of a vector of values) is allocated and built by Init Numeric 1502 between the internal representation of the decision variables within the PSE 204, and the object-attribute pairs of the Object Hierarchy 410. A vector of mappings is also maintained that maps values from the Object Hierarchy 410 into the PSE 204. In this way, non-numeric values which may have been entered into the PRF 208 can be mapped into numeric values for evaluation by the PSE 204. Conversely, this mapping also allows numeric values generated by the PSE 204 to be mapped back to the Object Hierarchy 410 and the PRF 208 in their appropriate form (which may be non-numeric).

In a Preferred embodiment of the present invention, there are two possible mappings of symbolic information to numeric information used depending upon whether the symbolic values are "ordered" or not ordered. When the symbolic values form an ordered, enumerated range, they are mapped into integers. In this case, "distances" between these integer values are considered relevant. For example, the set {Bad, Fair, Good, Great} (which is an example of an "ordered" set) may be mapped on to integers {0, 1, 2, 3}. Thus, it can be seen that the distance between "Bad" and "Great" is larger than the distance between "Bad" and "Fair". When the symbolic values are not ordered, distance information is not considered relevant by the algorithm, and the symbolic value will either simply be deemed equal or not equal to a symbol in the range.

Once the initialization routines have been executed, the present invention determines if any of the decision variables have discrete values, as indicated by decision block 1504. (It should be noted that if a decision variable passed by the PRF 208 is an enumerated type, the present invention maps these variables to discrete variables). Thus, as per decision block 1504, if any decision variable is discrete (be it enumerated or otherwise), then in a preferred embodiment of the present invention, the "weak" methods alone are used. This is indicated by block 1506. In addition, a preferred embodiment of the present invention contemplates the automatic use the weak methods 1506 on every even pass through the PSE 204, as further indicated by block 1504.

As indicated above, a preferred embodiment of the present invention contemplates exclusive use of the weak methods where discrete decision variables are used. However, the present invention also contemplates other embodiments where this does not hold true.

A preferred embodiment of the present invention uses "weak" methods and "strong" methods to find a solution which satisfies every constraint or, if the problem is infeasible, to find a best balanced solution. With regard to the PSE 204, the best balanced solution is the "point" for which the present invention assigns the best score based upon the objective and constraint functions. This score will be discussed further below.

As indicated above, a "point" results when specific values are assigned to the decision variables. Every unique assignment of values to the decision variables constitutes a point in the search space of the PSE 204. Again, the basic premise of the weak methods 1506 and strong methods 1512 is to find a point for which the combined objective function obtains the best score.

In general, the weak methods 1506 attempt to optimize the score by generating a point, calculating the score for that point, testing it for improvement with respect to previous scores, and then generating another point according to the results of the test. The strong methods 1512 are used to optimize the score only if the combined objective function is continuous, or "largely" continuous. Essentially, the term "strong methods" refers to any method where any "direction" can be chosen (that is, any of the decision variables can be varied which will result in moving the current point in some direction) without encountering any discontinuity of the function, though in a preferred embodiment of the present invention, some discontinuities can be tolerated. For example, the present invention tolerates (that is, will not break down) upon the occurrence of a division by zero.

In a preferred embodiment of the present invention, the strong methods 1512 used work only with functions having no discrete variables. In this embodiment, the directions in which the point is to be moved are computed from numerical approximations to the derivatives of the functions. Thus, even when the functions are not strictly continuous, the strong methods 1512 can be applied. Of course, it should be understood that the present invention contemplates strong methods 1512 which can be modified to work with non-continuous functions and functions having discrete variables.

Still referring to FIG. 15, if none of the decision variables are discrete as per decision block 1504, and there have been an even number of passes (a "pass" is discussed below), then the present invention determines if the number of decision variables is greater than a set threshold value, as indicated by decision block 1506. If the number is greater than the threshold value, the weak methods will again be used, but for a shorter duration (that is, the weak methods will "stop early"), as indicated by block 1510.

In a preferred embodiment of the present invention, the actual threshold value used in the weak methods 1510 depends on the speed of the CPU(s) being used in conjunction with the present invention. In general, the greater the number of decision variables, the more time will be needed to obtain a result. Since the execution time of the weak methods 1510 is not as sensitive to the number of decision variables as are the strong methods

1512, an improved result can be obtained more quickly using a combination of "weak" and "strong" methods than from using the "strong" methods 1512 alone. Thus, the weak methods 1510 are used first (but will "stop early") where there are many decision variables relative to the speed of the CPU(s). It should be noted that aside from the "stop early feature", a preferred embodiment of the present invention contemplates that the weak methods indicated by blocks 1506 and 1510 are identical.

If the weak methods are to be used, but are to "stop early" as indicated by block 1510, then an internal flag is set indicating that the weak methods are to be run in a "stop early" mode. This means that when certain criteria are met, the weak methods 1510 will terminate. This criteria will cause the weak methods 1510 to terminate only when run in a "stop early mode." This stopping criteria will be explained with reference to FIG. 17a below.

After the weak methods 1510 terminate when in "stop early" mode or when the number of decision variables is below a threshold value indicated by decision block 1508, then the strong methods 1512 are used. In a preferred embodiment, the strong methods 1512 involve gradient information to determine a direction to search for the point resulting in the best score. In essence, a directed search in the direction of the gradient of the combined objective function occurs, and the constraint functions keep the search within the boundaries of the constraints (that is, within the boundaries of the set target values).

As indicated above, for problems where strong methods 1512 cannot be used (that is, where at least one of the decision variables takes discrete values as indicated in decision block 1504), then weak methods 1506 alone are used. Again, the basic premise behind the weak methods 1506 is that a point is generated, and then tested for improvement to the score. If the score is improved, a search is conducted in a direction from the previous best point through the current point. The search is an attempt to extrapolate linearly in the direction mentioned.

When some point of the search would carry the value of some decision variable to the limit of its legal range, the present invention prevents the value of that decision variable from moving beyond that legal range. It should be noted here that only certain "types" of decision variables for which distance is relevant are varied. More specifically, these types of decision variables include continuous variables, discrete variables, and symbolic variables from an ordered set of values.

From the above, it can be seen that heuristics are used for dynamically interleaving the weak methods 1506 and strong methods 1512. In addition, heuristics are also used for dynamically interleaving between various problem solving techniques within both the weak methods 1506 and strong methods 1512 themselves. These techniques will be discussed further below.

Figure 15:
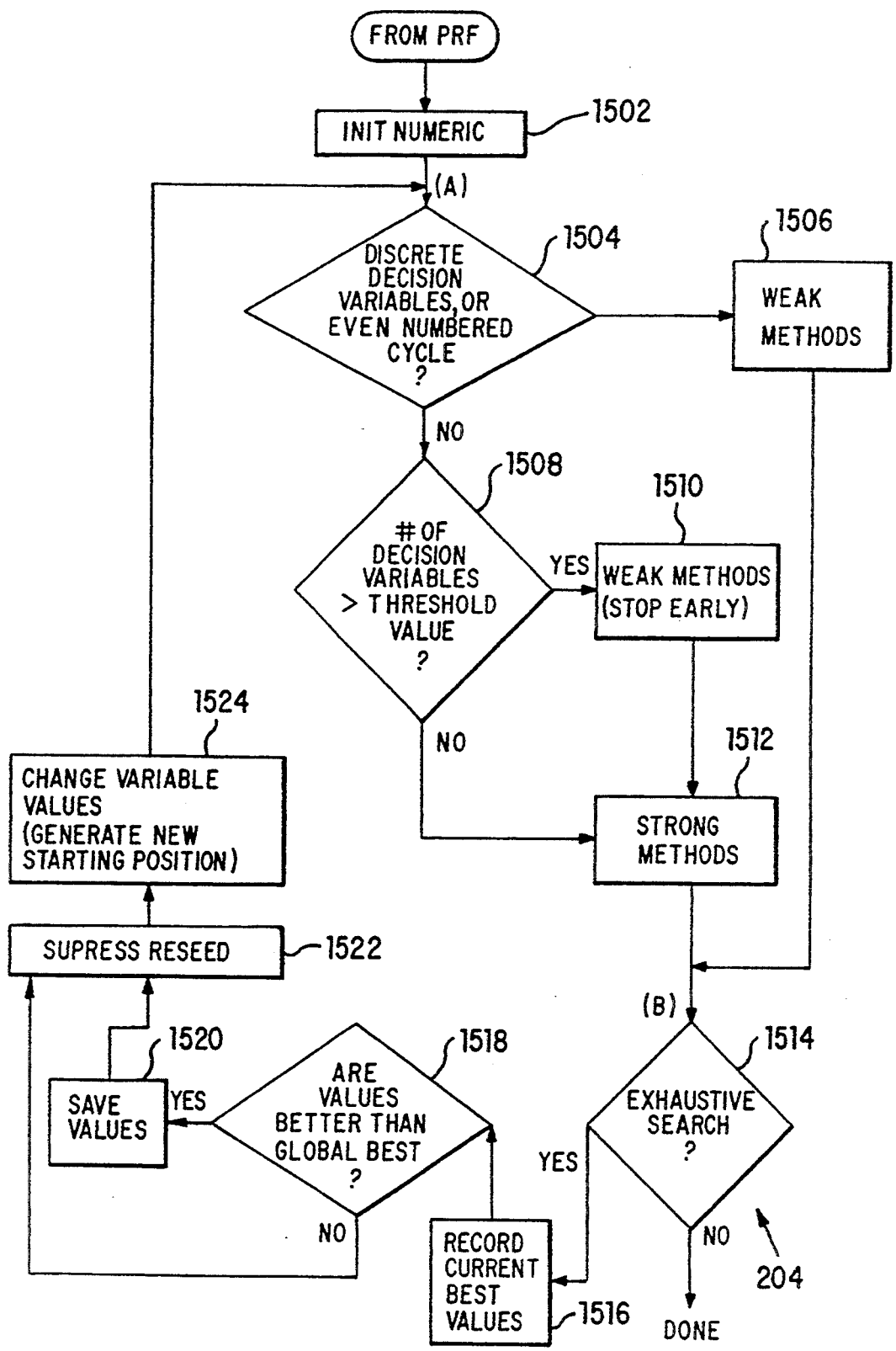
FIG. 15 is a high-level diagram of the Problem Solving Engine (PSE).

A single pass through the weak methods 1506 and/or strong methods 1512 of the present invention (as shown by the path(s) from (A) to (B) in FIG. 15) will result in values for decision variables yielding a relatively good point, but may not necessarily be the best point that can be obtained for a problem with respect to the goals. The reason for this is that the present invention will begin the weak methods 1506 and/or strong methods 1512 using some set of values for the decision variables. From this, the weak methods 1506 and/or strong methods 1512 may find what appears to be the best set of values in that the values appear to result in the best score (that is, either satisfy all the goals, or come closer than any previous values, while achieving the best values for objective functions within the limitations mentioned). However, what may have really been found is merely a local optimum rather than the best overall result.

A way to increase the likelihood that the best possible result (that is, the result yielding the best attainable score for a given problem) is found is by changing the starting values of the decision variables after each pass through the weak methods 1506 and/or strong methods 1512, and then to execute additional passes through the weak methods 1506 and/or strong methods 1512. The more this is repeated, the more likely it is that this best possible result will be found. Accordingly, in a preferred embodiment of the present invention, a user is given the option of running the PSE 204 using an "exhaustive search", as indicated by decision block 1514. In a preferred embodiment of the present invention, this allows the user to control the amount of time that the present invention will continue to pass through the weak methods 1506 and/or strong methods 1512.

Still referring to FIG. 15, if an exhaustive search is chosen, then the "current best" values for the decision variables (that is, the values resulting in a local optimum or "current best" score) which were newly generated by the last pass through the weak methods 1506 and/or strong methods 1512 are recorded, as shown by block 1516. This is done since in a preferred embodiment of the present invention, a report can be generated which shows all of the local optimum values that were considered the "current best" values for each individual pass through the weak methods 1506 and/or strong methods 1512. This can be useful information to a user, since these values could still be of great value as alternatives to the values which will finally be found to yield the best result. Additionally, for some problems, there may be several points, all with equivalent scores, from which the user may subjectively prefer certain points over others.

In a preferred embodiment, the present invention will display via some visual display device 116 (preferably in conjunction with the PRF 208), at any given time, the best point (that is, the point with the best score) it has found thus far. If more than one point yields the best score found thus far, the present invention will display the first of these equivalent best points. As indicated previously, in some cases, the "best" result is at least partially subjective, and a user may find results other than the one yielding the best score to be of great interest.

Once the current best values for the previous pass through the weak methods 1506 and/or strong methods 1512 have been recorded as indicated by block 1516, they are then compared with the values representing the best point found so far (the "global best" values), as indicated by block 1518. In a preferred embodiment of the present invention, the global best is produced on the basis of two sets of criteria. The first uses the constraint functions to determine whether the current best values are closer to the set targets than are the global best values. Whichever is closer becomes (or remains) the "global best."

If the above comparison indicates that there is no significant difference between the two, then the second basis for comparison is used. Here, the results of the current and best global values are compared with regard to the objective functions. Thus, a comparison is made as to whether the results of the current best values or the best global values are closer to the set objectives. Based upon the above determinations, if the current best values are found to produce better results than those of the "global best", then the current best values are saved, as indicated in block 1520. In effect, the current best values then become the global best values.

The results of these two criteria are the basis upon which a score that is observed by a user is generated. It should be noted that this is done by using the components of the combined objective function separately (that is, the constraint functions alone, and then the objective functions alone). However, this is somewhat different from that score which is used internally by the weak methods 1506 and strong methods 1512. It is this latter score which will be referred to primarily throughout the discussion of the PSE 204. Of course, it should be understood that either technique for generating a score could be used internally, or displayed to a user.

Once the above-noted comparison has been completed, a flag is set that suppresses the reseeding of a random number generator used by the present invention. This takes place in block 1522. In a preferred embodiment, the same seed number is used each time the PSE 204 is executed. The only time the random number generator is reseeded is at the beginning of execution of the PSE 204, and even then the same seed number is used each time. In this way, the same result will always be obtained for the same problem when it is run for a given period of time. The significance of this feature is that it promotes consistency, in that the same result for the same problem will always be found when the PSE 204 is run exhaustively for precisely the same period of time. However, it should be noted that for each "instance" of the PSE 204 generated, a different seed number will be used. This will be explained further below.

Once a new number has been generated as indicated above, the values of the decision variables are changed, as indicated by block 1524. This change is done the same way as when a new point is generated in the weak methods 1506, as will be explained below with reference to FIG. 18.

B. Weak Methods

A more detailed discussion of the weak methods 1506 used in a preferred embodiment of the present invention will now be described. As mentioned above, the basic premise behind the weak methods 1506 is that a point is generated and tested for improvement, and then another point is generated according to the results of the test. The improvement that is being tested is whether the score has improved as per the objectives and constraints (that is, targets) of the problem.

Some basic concepts regarding the present invention will first be described in conjunction with the weak methods 1506. As noted above, in a preferred embodiment of the present invention, the constraint functions are generated as a result of the input of targets by a user, and modified so all violated constraint functions return negative values. It should be noted that in a preferred embodiment of the present invention, the original form of the constraint functions can be $f1(x) <= C$, $f2(x) >= C$, or $f3(x) = C$, where fn is some constrain function, and C is a constant representative of an entered target. However, all of these forms are converted into a format relating a translated function to 0. For instance, $f1(x) <= C$ becomes $f1a(x) >= 0$, where $f1a(x)$ is defined as $f1a(x) = C - f1(x)$. Using these constraint functions with respect to the current point, the amount of violation of the targets is computed. The amount by which the current values of the constraint functions is less than zero indicates the amount of violation.

In computing the internal score noted above, a preferred embodiment of the present invention will subtract the sum of a penalty function applied to each of these violations from the sum of the values of the objective functions. Thus, the lower the sum of these penalized violations, the higher the score. Note that in combining the objective functions, for those functions corresponding to objectives which seek to minimize some quantity, the sign of the result of the function is negated. The result is that function's "contribution" to the combined objective function is in the same direction as that of a maximization function. Of course, it should be understood that the internal score could be computed in any number of different ways.

Often, expressions within the constraint and objective functions involve symbolic entities rather than numeric quantities. For example, a particular target might be that the day a certain employee has off is "Tuesday." The present invention has the ability to convert the results of such symbolic targets into numerical entities. Given the above example, if "Monday" is assigned as the day off for that employee, then the target would be unsatisfied, and the constraint function would return one "unit" of violation. on the other hand, if the day off is "Tuesday", the constraint function would return a value of zero. Note that without some other indication, there can be no degrees of violation for a symbolic value in a targets, since it is either equal to the target value, or not equal to it. However, In a preferred embodiment of the present invention, the user can enter the list of symbols and designate them as being ordered. Using the above example, a list of all the days of the week can be entered as an "ordered list." When this is done, and if the target is "Tuesday", then "Monday" would be less of a violation than "Friday."

In a preferred embodiment of the present invention, a penalty is applied to the violation of each constraint. The penalty is equal to $CX+(CX)^2$, where X is the absolute value of the difference between the value of the constraint function and zero. C is what is known as the penalty factor, and it is an amount that is varied depending in part upon the progress made in satisfying achieving the constraints. The equation itself is called the penalty function. An important property of the function is that for a small value of X and C, the square term is inconsequential, but for a large value of X and C, the square term dominates. There are many other functions with properties similar to that of the penalty function noted above, and the present invention contemplates use of these other functions in other schemes for applying penalties to constraint violations.

Also in a preferred embodiment of the present invention, this penalty factor is applied to the weighting and scaling information entered by a user. The effect of this is that the more a particular target is weighted or scaled, the larger the penalty (that is, the worse the score) for a given distance between a target and current value of the corresponding decision variable.

Before discussing the weak methods 1506 in more detail, an analogy to the way in which the weak methods 1506 work can be made with respect to how a surveyor might search in a mountainous terrain for a valley having vegetation. Assume that the surveyor's goals are the constraint that the valley must be below a certain point, and the objective that the amount of vegetation must be maximized. The surveyor would begin by going right to those areas within sight that were at or near the correct elevation, but would still also tend to go toward areas having the most vegetation. In effect, the surveyor would have a self-imposed high mental "penalty" for moving toward higher ground. In order to get over "ridges" however, the surveyor must decrease her penalty factor somewhat to allow her to traverse these regions so that she may continue to move toward areas which improve her goals. Even though the surveyor is finding more vegetation, if she climbs too high and does not find a significant increase in vegetation, then the low-elevation target (that is, constraint) will be so violated that it will begin to dominate, and will cause the surveyor to return to lower ground.

At first, the surveyor may lower her "penalty factor" searching for an area that satisfies her targets to within some set amount. Once a point is reached that comes "close" to her goals, the surveyor may decide that the best choices will come from that immediate area. Thereafter, the surveyor may decide that she will not head in any direction that will give a worse result than that point. Thus, she would not want to decrease here "penalty factor" any more than it is at when she is "close" to her goals, since that could lead to less satisfactory points, and away from that immediate area.

The above analogy is conceptually similar to how the weak methods 1506 of the present invention work. In the present invention, the penalty factor is lowered until a point is found such that the values of the decision variables come within some set predetermined range of satisfying the targets (that is, they come "close" to the set goals). Once that point is reached, the penalty factor is set such that it will not be lowered by any more than the penalty factor at that specific point for the duration of that pass through the weak methods 1506 (note, however, that if in exhaustive mode, the penalty factor will be re-set each time the weak methods 1506 are entered). When this point is reached, the point is said to be "nearly feasible." The penalty factor at this point is referred to as the "maximum-minimum" penalty factor, in that it represents a floor below which the penalty factor will not drop.

Thus, in view of the preceding paragraph, the first thing that the present invention seeks is a point which is nearly feasible. When this point is found, then the current penalty factor will be the maximum-minimum penalty factor. For the duration of that pass through the weak methods 1506 thereafter, the penalty factor will only be raised. Of course, it is possible for points to exist that completely satisfy the targets, in which case the points would be completely feasible. This would mean that a complete solution (as opposed to a best balanced solution) exists for the problem.

The immediate "area" described by the combined objective function where the "nearly feasible" point exists may contain only a local optimum. Thus, when the present invention is running an exhaustive search, it will select different decision variable values (and thus a different point) for the combined objective function to start at. In this way, other local optima can be found, and, eventually, the global optimum. Using the surveyor analogy, there may be a valley far away and over several mountain ranges. When a subsequent pass through the weak methods 1506 occurs, it would be analogous to starting the surveyor at a completely different location, for example, near this other valley.

Figure 16:
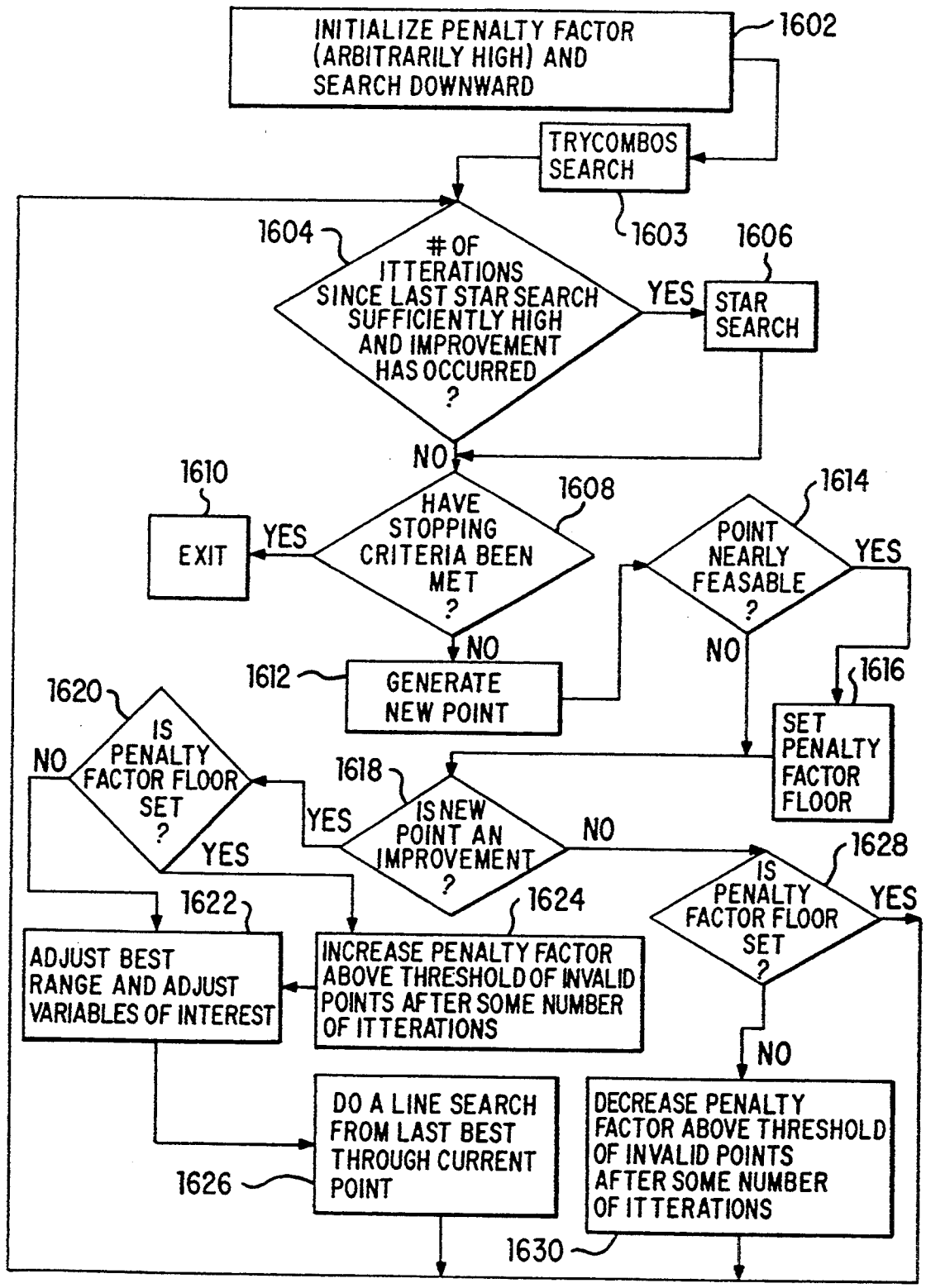
FIG. 16 is a diagram of the operation of the weak methods.

Referring now to FIG. 16, when the weak methods 1506 are first executed, the penalty factor C is initialized to be arbitrarily high. This is indicated by block 1602. This is done so the combined objective function will quickly head in the direction of a feasible or best balanced solution (and thus, the decision variables will more quickly attain values "relatively" close to their target values). In this way, a nearly feasible point and a maximum-minimum penalty factor will be found more quickly than if the penalty factor started at an arbitrarily low value (assuming, of course, that there is a point that is nearly feasible).

In addition to initializing the penalty factor, the search for the maximum minimum penalty factor is also initialized downward. This means that the penalty factor will be decreased until a feasible or nearly feasible point is found. To use the above analogy, the movement is encouraged toward the most highly vegetated part of the valley, and away from any regions outside the allowed elevation.

Once the penalty factor is initialized arbitrarily high and the search is initialized downward as indicated by Block 1602, then the present invention will first try to determine which of the constraints appears to be hardest to satisfy, and will try to satisfy those constraints. This is performed using a "trycombos" search, as indicated by block 1603. In a preferred embodiment of the present invention, this search will only be performed with regard to constraints having discrete decision variables, and only then when the number of possible values for each decision variable is below some threshold value.

In performing the trycombos search indicated by block 1603, the present invention will try every possible value for each discrete decision variable of the constraints noted above. Note that this is done without having to trying every possible combination of values. The difficulty of satisfaction is based upon the number of "satisfiers" (that is, the number of combinations of values of the decision variables which would satisfy a constraint). The fewer the number of satisfiers, the "harder" the constraint is to satisfy.

Once the hardest constraints to satisfy have been determined, then the sets of decision variables with value assignments for those constraints are sorted based upon how often each decision variable is used, with different assignments, to satisfy other constraint functions. Those sets of decision variables which are used with different value assignments in the least number of other constraint functions are preferred for satisfying the constraint at issue. The values of these decision variables are then not permitted to change throughout the remainder of this particular subroutine of the weak methods 1506.

After the trycombos search 1603 is completed, then a decision is made regarding whether the number of iterations since the last Star Search (which is explained further below) is "sufficiently" high, and whether "improvement" has also occurred since the last Star Search. This is indicated by decision block 1604. By "improvement" is meant any move in the current point that results in a better score than any found thus far in that pass of the weak methods 1506.

It is noted here that within both the weak methods 1506 and the strong methods 1512 there is a main loop. An iteration of either of these loops will be referred to as an "iteration." Thus, a "pass" through either of these methods means a complete entrance and exit to and from the weak methods 1506 or strong methods 1512, whereas an "iteration" refers to a loop within the individual methods. This will become clearer as the present invention is further explained.

Referring again to block 1604, "sufficiently high" refers to some arbitrary number. In a preferred embodiment of the present invention, that number is set to 2n, where n is the number of variables. Thus, the more decision variables there are in a problem, the greater the number of iterations until the Star Search is invoked.

Star search is performed only occasionally, as it is "expensive" in terms of function calls to evaluation functions (that is, to functions which evaluate a point in terms of its score) and is able to advance the point only when the score can be bettered by varying a single decision variable. In cases where a single variable must be varied, however, the star search guarantees that every variable is examined. For example, if 100 decision variables were being used in a problem, the Star Search would call the evaluation functions between 100 and 200 times. In some cases one of these calls would determine the very best move for some variable, thus the search was worthwhile. In other cases, it is possible that no change in a single variable will improve the current point. It should be noted that if the variable assignments have not changed since the last star search was started, no star search is performed, as it would be redundant. In addition, the present invention also contemplates performing a star search concurrently with the rest of the weak method whenever an improved point is found.

In summary, if the resulting answer from decision block 1604 is "yes", then the Star Search for each decision variable will be executed. In essence, the present invention advantageously balances the fact that a Star Search is an expensive search in terms of time, with the fact that if used sparingly, it can still achieve significant progress. A preferred embodiment of the Star Search will be described in greater detail in .conjunction with FIG. 17a below.

Whether or not a Star Search is executed in a given iteration of the weak methods 1506, the present invention then determines whether certain stopping criteria have been met which would cause the weak methods 1506 to terminate (that is, cause the present invention to exit the weak methods 1506). This is indicated by decision block 1608 and exit block 1610. A preferred embodiment of the stopping criteria will be described in greater detail in conjunction with FIG. 17b below.

If the stopping criteria have not been met in accordance with decision block 1608, then the present invention will generate a new point, as indicated by block 1612. The new point will be generated based upon a scheme where decision variables are changed in either a semi-random or deterministic way. A preferred embodiment for generating this new point will be described in greater detail in conjunction with FIG. 18 below.

After a new point has been generated as indicated by block 1612, the new point is tested to see if it is nearly feasible, as indicated by block 1614. As described above, a point is considered nearly feasible if the current values of the decision variables are within some specified distance from the targets. More specifically, in a preferred embodiment, a point is nearly feasible if the sum of penalty functions applied to the weighted, scaled target violations is less than some arbitrary threshold. Again, the penalty factor at this point is called the maximum-minimum penalty factor.

If a point is "nearly feasible," then a floor is set on the penalty factor such that it will never be reduced again during this "pass" of the weak method. This is indicated by block 1616. In this way, no direction will be followed along the combined objective function which will result in a worse violation of constraints than that achieved when the "nearly feasible" point was attained. The penalty factor can be (and usually is) increased above the maximum-minimum penalty factor, but it is not decreased below it. This prevents the combined objective function from wandering too far out of the vicinity of the nearly feasible region.

Once the newly generated point is checked for feasibility and any action taken accordingly, the new point is then evaluated to see if it is an improvement (with regard to its resultant score) over the last best point found thus far in the current pass through the weak methods 1506. This is indicated by decision block 1618. Again, it should be noted that this "last best point" is only the best point found thus far in the current pass through the weak methods 1506, and is not necessarily the global optimum. However, whatever the last best point is found to be at the termination of the current pass through the weak methods 1506 will at least be a local optimum.

If the new point is not an improvement, then the present invention tests whether the penalty factor floor has been set (that is, whether a point has been found that is nearly feasible), as indicated by decision block 1628. If the answer is "yes", this means that the penalty factor is no longer permitted to decrease, and the present invention will loop back to decision block 1604, and begin another iteration of the weak methods 1506.

If the result of decision block 1628 is "no", then the penalty factor is decreased after a set number of iterations through block 1630. That is, the penalty factor is decreased after a certain number of points have been encountered where no improvement has been made. In a preferred embodiment, the number of iterations for this is five, but many other iteration thresholds could be used, depending on other parameters. Thus, block 1630 is the mechanism that decreases the penalty factor when an "obstacle" blocking movement in the direction of an improved combined objective function is encountered which prevents the present invention from finding a nearly feasible point. Once the penalty factor has been decreased, decision block 1604 will be the next stage, and another iteration of the weak methods 1506 will begin.

Returning now to decision block 1618, if the new point is an improvement, then the status of the present invention is evaluated to assess if the penalty factor floor has been set, as indicated by decision block 1620. If it has been set, then the penalty factor is increased, but only after a ceratin number of iterations where improvements over the last best point have occurred. This is the mechanism which increases the penalty factor once a nearly feasible point has been encountered.

After the criteria of block 1624 have been evaluated, or if the result of decision block 1620 was "no", then the best range and the variables of interest are adjusted, as indicated by block 1622. "Variables of interest" are decision variables which affect those constraint functions which, after being weighted and scaled, are farthest from being satisfied (that is, farthest from their targets in view of the weight and scale given to those functions). Thus, decision variables affecting highly violated constraints, or affecting heavily weighted constraints that are unsatisfied, will become variables of interest. Thus, every time a move has been made (that is, a new best point has been determined) the variables of interest need to be re-calculated, as the degree of violation of any given constraint may have changed. It should be noted that variables of interest may be used even when no constraints are unsatisfied, as the variables involved in the sum of objective functions may be a subset of all the decision variables. This subset of variables would constitute the variables of interest in the case that the constraints have been satisfied. Variables of interest are used in conjunction with generating a new point, and will be discussed further with regard to FIG. 18.

Adjusting the best range (block 1622) means adjusting the limits of the range between which a decision variable is allowed to vary. This range is dynamically changed as the problem is executed. This concept will be explained further with regard to FIGS. 17b and 18 below.

After the best range and variables of interest have been adjusted, a line search is performed from the last best point through the current point (that is, through the newly generated point), as indicated by block 1626. This search is a simple linear search from the last best position through the current position (which has been found to be an "improvement" as per decision block 1618).

In a preferred embodiment of the present invention, the line search 1626 used in the weak methods 1506 is performed as follows. Current decision variable values are subtracted from their previous values, resulting in some difference (or delta). That delta is then added to the last best values of the decision variables, in an effort to move in the direction of the newly generated point. Thus, a line can be thought of as being drawn between the last best point through the current point, and moving an amount equal to the delta along that line. If moving toward the next point does not improve the score, then the delta is halved, and the same direction is tried again. If that move also does not improve the score, the distance is halved again. If the point succeeds, the new point becomes the current point, and the delta is doubled. Thus, it is an accelerated type of search.

In a preferred embodiment of the present invention, the net number of times that the delta will be tolerated to be halved itself (that is, no improvement occurred) is proportional to the log of the penalty factor. After this number is reached, the line search is terminated. The idea here is that exact searches are only worthwhile when the penalty factor is very high. Also, in a preferred embodiment of the present invention, if a decision variable contains a value within its legal range (as discussed above regarding the PRF 204) and the next delta would take it out of its legal range, then rather than move the value out of this range, it is set to the extreme of the legal range and its delta value set to zero. Thus, the value remains fixed at the extreme of its range for the duration of the line search.

Some of the features mentioned above with regard to the use of weak methods 1506 are explained in greater detail below with reference to FIGS. 17a, 17b and 18.

A more detailed explanation of the Star Search described with regard to FIG. 16 is explained in greater detail with reference to FIG. 17a below.

Figure 17A:
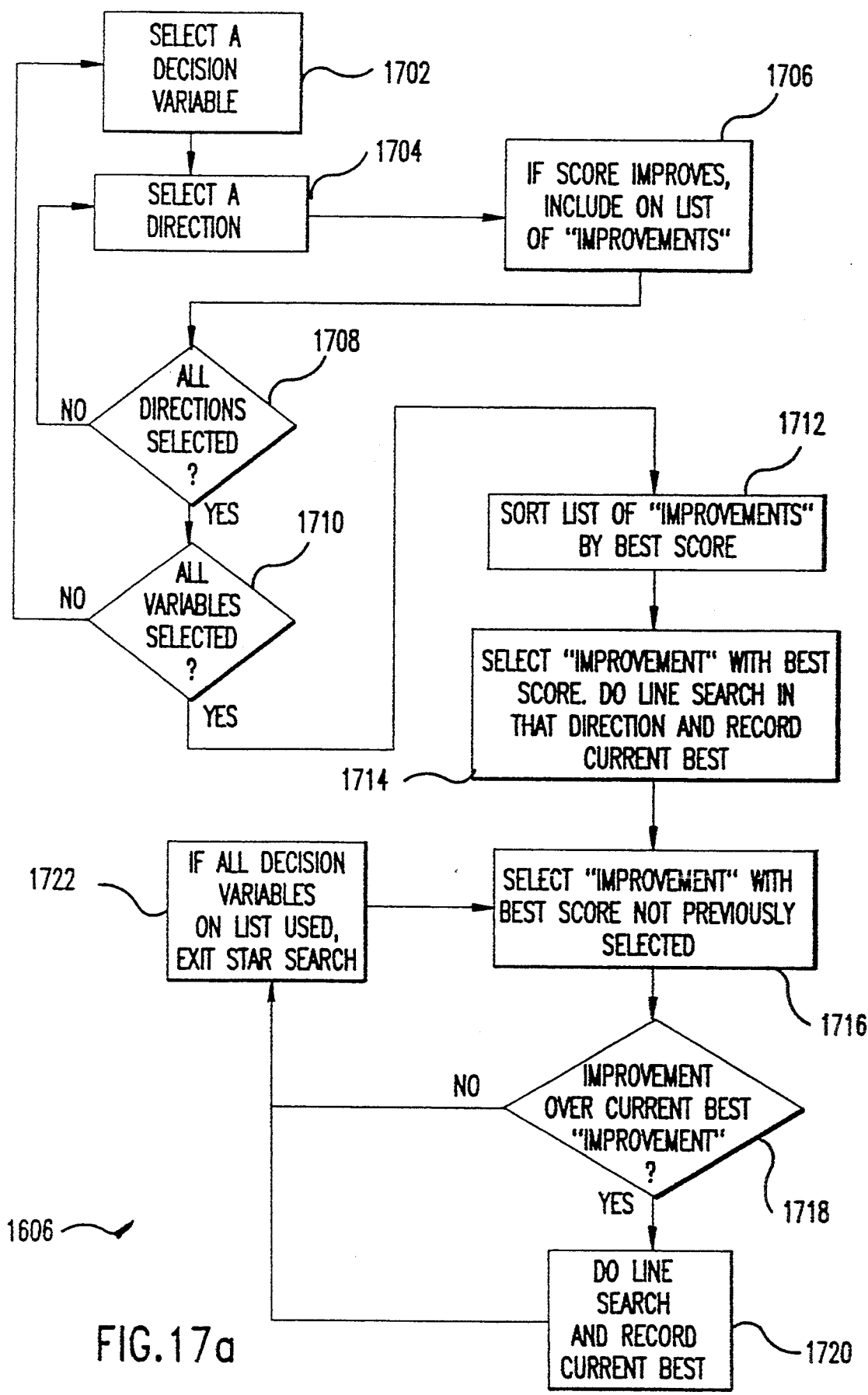
FIG. 17a is an expanded diagram showing the operation of the star search of FIG. 16.
Figure 17B:
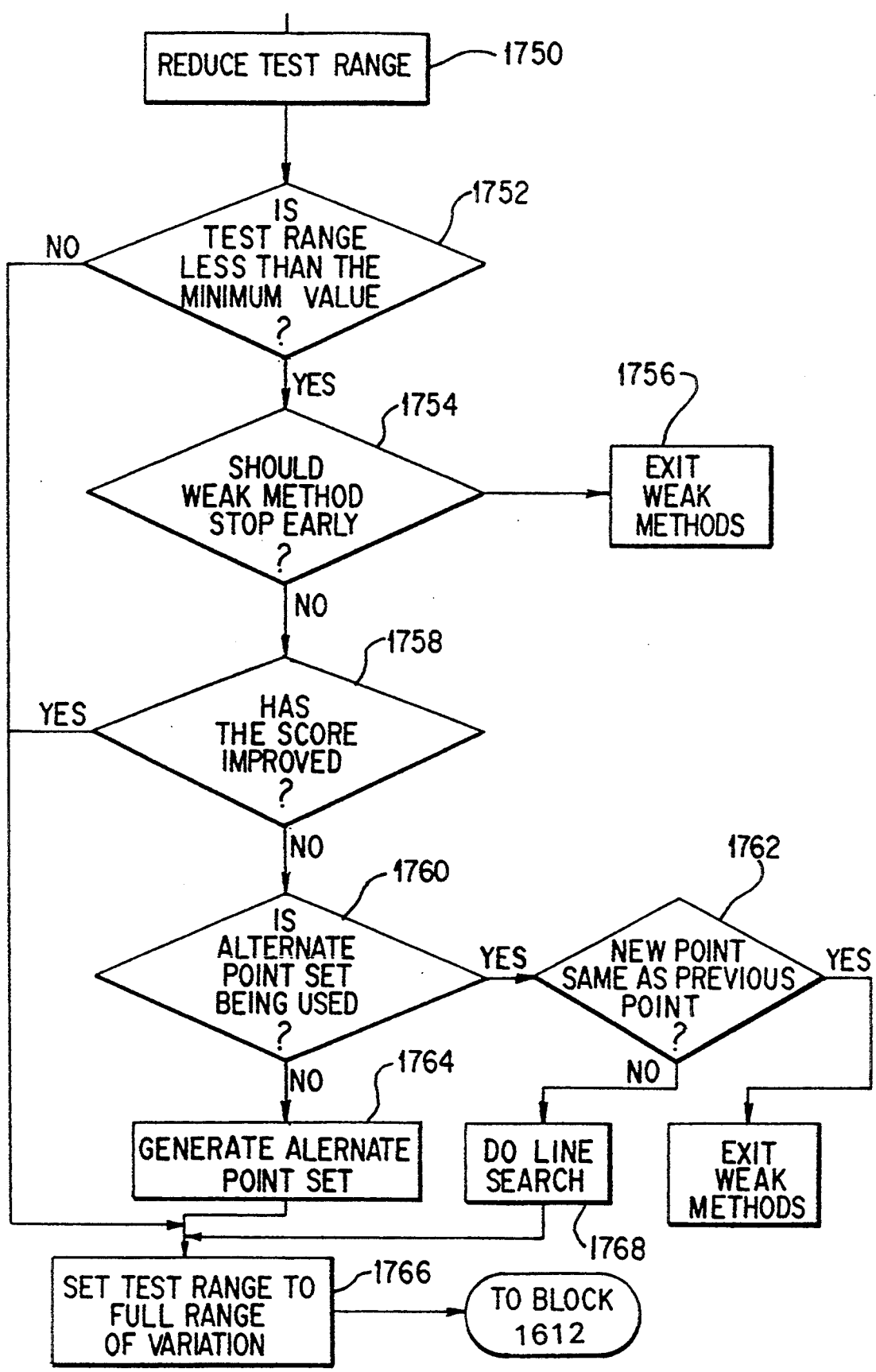
FIG. 17b is an expanded diagram showing the operation of the stopping criteria of FIG. 16.

Referring now to FIG. 17a, a decision variable is first selected, as indicated by block 1702. Then, a direction for manipulating the value of that decision variable is selected, as indicated by block 1704. By "direction" is meant that the value of the decision variable is either increased, or decreased. For a decision variable having only two positions, a new position is selected. For example, suppose the value of a decision variable can be either "yes" or "no." Then, if the current value is "yes", the new value to be selected is "no."

Once a decision variable and a direction are selected, the decision variable is moved in that direction by some small percentage of its total range if it is a continuous variable, or by one unit if the variable is a discrete variable. The resultant score is then evaluated. If the score is an improvement over the score generated by the previous point, then the score, along with the variable and value responsible for that score, is put on a list of improvements, as indicated by block 1706. If a decision variable is already at the extreme of its legal range as indicated above, then any direction that would take it beyond its range is not even tried. After each variable is tried, the decision variable values are reset to their original values (that is, the values they had prior to executing the Star Search).

It should be noted that this manipulation of the value of decision variables in this part of the Star Search does not affect the "current point." The values that are put on the list of improvements are values that would improve the score if they were implemented. Thus, no action is taken at this time regarding the movement of the current point.

In this portion of the Star Search the selected decision variable is moved and tested in all possible directions, as indicated by the combination of decision block 1708 and block 1704. Once all directions for a selected decision variable have been selected and evaluated, then a new decision variable is selected, and again tested in all possible directions. This continues until all decision variables have been selected, as indicated by the combination of decision block 1710 and block 1702.

Once all the decision variables have been selected and tested in all possible directions for improvements, then the list of improvements is sorted according to the resultant score, with the decision variable and decision variable's value that produced the best score going to the top of the list. This is indicated by block 1712. Once sorted, the decision variable which yielded the best score is taken, and a line search (as described above) is performed in the direction of greatest improvement, as indicated by block 1714. The values of the decision variables yielding the best point (that is, the point with the best score) as a result of varying the value of this single variable in the line search are then recorded.

The present invention then selects the next decision variable on the list of improvements that has not previously been selected. This decision variable is then moved to the position in which it was found to yield its best score, as indicated by block 1716. The resultant score created by this move is analyzed, as indicated by decision block 1718. If it is an improvement over the "current best" previously recorded, then a line search is performed in the direction of the improvement, and the best result from the line search is recorded as the new "current best", as indicated by block 1720.

If the answer to decision block 1718 is "no", or a line search as per block 1720 is completed, then the present invention loops back up to block 1716, and the next improvement not previously used is selected. This occurs until all the decision variables on the list of improvements are used, as indicated by block 1722.

It should be noted that each line search above begins with the "current best" values recorded. Thus, when a decision variable "not previously used" is moved, the linear movement of the combined objective function as a whole is from the "current best" as recorded at block 1714, rather than from the point used when the Star Search was first entered.

It should be further noted that portions of the present invention such as the Star Search could easily be carried on in parallel.

The stopping criteria referred to in decision block 1608 of FIG. 16 will now be explained in more detail with respect to FIG. 17b. As noted briefly above, the present invention sets a dynamically varying "best range" for each decision variable, indicative of the amount by which the decision variable is allowed to vary. The best range is maintained as follows. Every time there is an improvement to the current point (as per decision block 1618 in FIG. 16) during an iteration of the weak methods, if the system had used the "test range" to generate the current point, then it will adjust the "best range" for each variable that had been varied as per Generate New Point 1612. The actual adjustment takes place as per block 1622.

The new "best range" for any given variable is a weighted average of the current "best range" and the range of variation used to generate the last point generated (that is, the point that was found to be an improvement). This scheme causes recent improvements to influence the best range more strongly than non-recent improvements. Placing more weight on more recent values also causes an increased range to have a greater influence on the best range than a decreased range. This prevents the range from simply collapsing, as improvements are generally more probable after small variations than after large ones. In this way, when the best range is used, the decision variable is varied by an amount that has been found, empirically, to yield the most recent improvements. It should be noted that the present invention also contemplates other schemes for calculating the best range of variation, including those which include the degree of improvement as a parameter in the calculation of the new best range.

As indicated above, the best range of variation for any variable is maintained by a weighted average of the test range values at the time that variable was changed to improve the score. Thus, at certain intervals, the range within which a decision variable will be changed is varied for test purposes. At these intervals, an alternate range is used, which is referred to as a test range. At first, the best range and test range are initialized to the full legal range of variation for the given variables. Then, the test range is reduced when the stopping criteria is analyzed, as indicated by block 1750. Thus, the test range is reduced at each iteration of the weak methods 1506. The test range is then compared to some minimum value, which is an arbitrarily low number, as indicated by block 1752. When this test range becomes very small, it is an indication that there are probably not many points near the current one that can significantly improve the score. If the test range is larger than the set minimum, the iteration through the weak methods 1506 will continue.

If the test range is smaller than the set minimum, the present invention analyzes whether it should 'stop early" (see block 1510 of FIG. 15), as indicated by decision block 1754. If no improvement to the score has been made in some set amount of time, and the answer to decision block 1754 is "yes", then the weak methods 1510 are terminated.

If the weak methods 1506 are not to "stop early", the present invention determines whether the score has improved since the last time the stopping criteria were passed through, as indicated by block 1758. If such improvements have occurred, then the iteration through the weak methods 1506 will continue.

If no improvements have occurred, then a test is conducted to see if an alternate point set is being used, as indicated by block 1760. If one is not being used, then an alternate point set is generated, as indicated by block 1764. This means that an entirely new point is generated, varying all of the continuous decision variables by a small factor of the total range, and varying some subset of the discrete decision variables by one unit.

The purpose of generating a new point in this fashion is to make sure that before the weak methods 1506 are exited, a local optimum has, in fact, been found. It is possible that it may appear as though a local optimum has been found, but in reality, the current point has found a kind of narrow crease in the "landscape" of the combined objective function, and thus the current point is "stuck." If in fact the point is merely stuck (and is not a local optimum), then the newly generated point (generated as per block 1764) will, upon further optimization, move back into the crease. However, when the new point moves back into the crease, it will probably end up at a different point in the crease than the previous point. A line search can then be made between these two points, which will move the point along the crease valley. If a point is in fact a local optimum, then the new point which is generated as noted above will, upon further optimization, collapse to the same point as the previous one. In that case, the weak methods 1506 will then terminate.

If it has been determined (as per block 1760) that an alternate point set is being used, that means that a point has already been generated to try to get out of what might be a crease. A test is then conducted to see if the new point is the same as the previous point, as indicated by decision block 1762. If it is the same point, then the point is a local optimum, and the weak methods 1506 are exited, as shown by block 1756. If the new point is different from the previous point, then a line search is performed through the two points, as indicated by block 1768. This allows for movement along the combined objective function within the crease.

Figure 18:
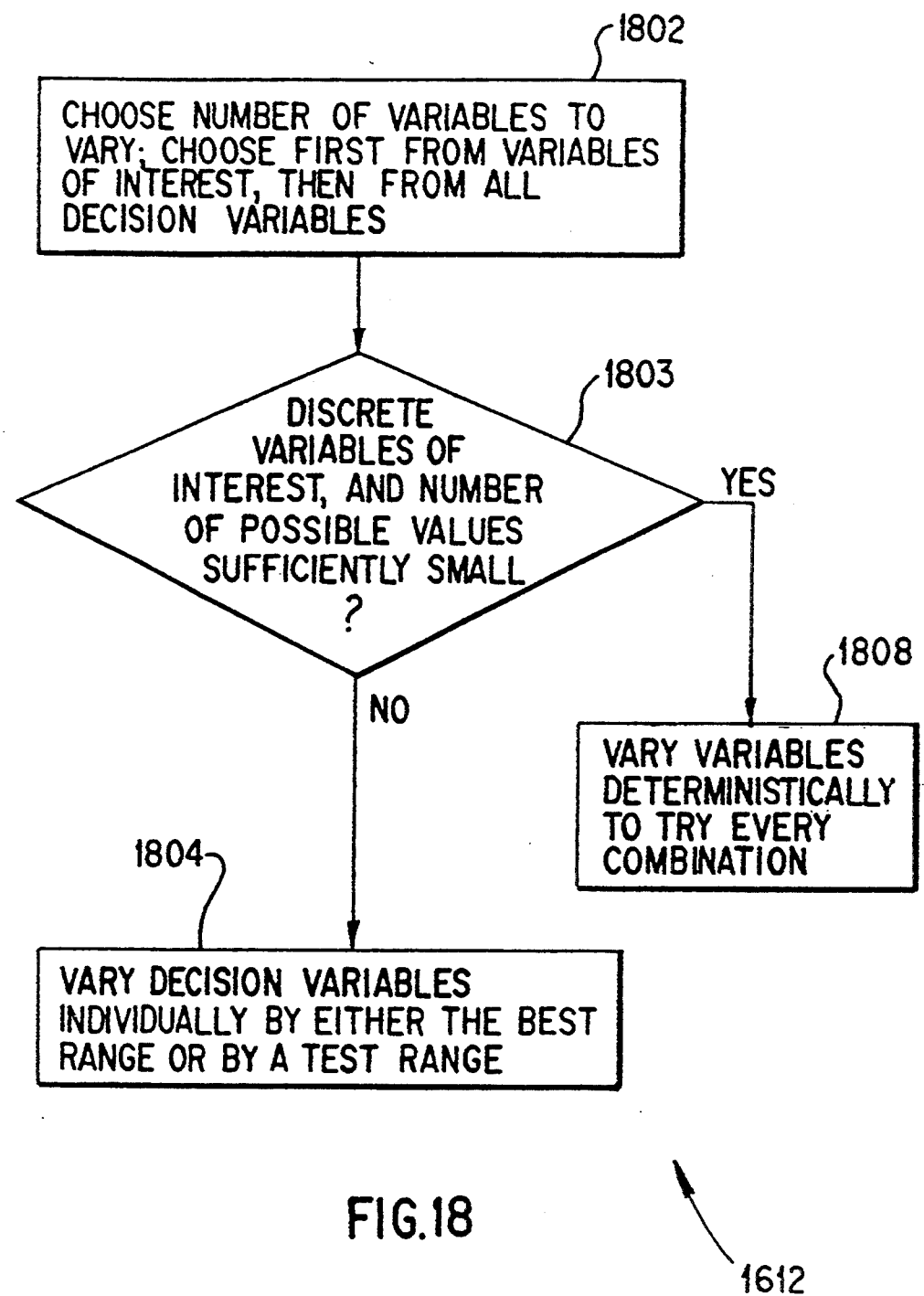
FIG. 18 is an expanded diagram showing the operation of the generation of a new point of FIG. 16.

The generation of a new point referred to in decision block 1608 of FIG. 16 is now explained in more detail with respect to FIG. 18. In a preferred embodiment of the present invention, as indicated above, variables of interest are decision variables affecting those constraint functions which (after being weighted and scaled) are the farthest from being feasible. When generating a new point to move to in an effort to find a feasible point (and ultimately the global optimum), some subset of all of the decision variables is chosen as the variables whose values are to be varied. In a preferred embodiment of the present invention, the variables of interest are first chosen from, and then the remaining decision variables are chosen from. This is indicated by block 1802. In this way, decision variables within the set of "variables of interest" are given preference over other decision variables.

Once the decision variables to be varied are chosen, then the present invention determines if decision variables of the "worst" constraint functions are discrete and have a sufficiently small number of possible values. (By "worst constraint" is meant the constraint that is farthest from being satisfied). This is indicated by decision block 1803. In a preferred embodiment of the present invention, "sufficiently small" means that the number of combinations of decision variables times possible (discrete) values for decision variables affecting a given (highly violated) constraint is less than some threshold value.

If the result of decision block 1803 is "yes", then the present invention deterministically tries each combination of possible values to that set of decision variables, until either a point is generated with an improved score and the given constraint is no longer the most highly violated one, or all combinations have been tried. This is indicated by block 1808. If all combinations have been tried, and the amount of violation of the given constraint has never been reduced, it is marked "dead" and not regarded for the purposes of variables of interest during that pass of the weak methods 1506.

It should be noted that in a preferred embodiment, the present invention tries each combination of possible values as described above when the user has allocated sufficient time for the entire space of the combined objective function to be searched. The present invention also contemplates allowing a user to specify some number of iterations that the weak methods would cycle through, thus allowing for varying amounts of surety that a precise local optimum has been found. As part of this technique, when the test range became smaller than the minimum value, the test range would be reset to the full range, prior to termination. Note that as long as improvements to the score are being found, the test range may be set to "full range" (as indicated by block 1766) and then narrowed many times during a pass of the weak methods 1506. The parameter that controls the precision of the result is the one that controls how many times the test range is allowed to pass from full range to minimum range without improvements. More of these iterations make it more probable that the optimum found is precise, but take time that might be devoted to finding other optima. Another variant of this technique would permit the penalty factor to fluctuate up and down, within bounds, setting the lower bound as described above as the maximum-minimum penalty factor, but allowing the factor to descend to this point more than one time.

In addition, the present invention also contemplates an embodiment in which, if there are too many variable/value combinations to enumerate quickly, (that is, the number of total possibilities is larger than some threshold), then some random number of the decision variables is chosen to vary.

In a preferred embodiment of the present invention, if the result of decision block 1803 is "no", then the decision variables are varied by some randomly chosen amount, with a ceiling of either the best range or a test range, as indicated by block 1804. Also in a preferred embodiment of the present invention, variance in accordance with the best range will be chosen two-thirds of the time, and variance in accordance with a test range will be chosen the remaining one-third of the time. This is done so the best range is used most of the time, but there is sufficient test range data for empirical adjustment of the best range. However, it should be noted that many other schedules and combinations can also be used.

If the test range is used and it results in an improvement over the previous best score, then for each variable varied at that time, that test range information will be averaged into the best range. This adjustment of the best range occurs when the variables of interest are adjusted, as indicated by block 1622 in FIG. 16.

It should be noted that a preferred embodiment of the present invention recognizes a special class of discrete decision variables whose values can be either "exclusive" or "balanced" over the class. Balanced values are a generalization of the concept of exclusive values. In the case of "exclusive values", once a value is used within a decision variable, it can no longer be used in any other decision variable. Conversely, when a decision variable containing such an exclusive value receives a new value, it returns its former value to the pool of available values. When the number of decision variables and the number of exclusive values in these sets is the same, all changes are made by "trades" (that is, if one decision variable was sent a new value from another decision variable then the "sending" decision variable would have to then receive the value formerly in the "receiving" decision variable in order to maintain the 1-to-1 correspondence).

An example where exclusive values would be useful is in a problem involving the players of a basketball team. In this case, each member of the team could be represented by a value, and there could be five decision variables representative of the positions on the court. Thus, if one player (that is, one value) was playing a certain position (that is, was assigned to a particular decision variable), then that player could not simultaneously play a different position, and thus the value representing that player could not concurrently be assigned to more than one decision variable.

Balanced values, however, permit a somewhat more flexible treatment compared with that of exclusive values in cases where the number of decision variables outnumber the values (in which case some values are used more than once, but within certain bounds) and in cases when values outnumber variables (in which case some of the possible values are always unassigned). This balancing of values is accomplished by maintaining an array indexed by discrete values of pointers to the variables that currently hold those values. The fact that some group of variables and their values form a balanced set is supplied by the user in the problem definition, as a part of the description of the range of variation of the values. Naturally, this only occurs, when the values are discrete integers, or enumerated types (which are mapped into discrete integers for use by the present invention). Use of this allows for the present invention to achieve a result for certain types of problems to more quickly and efficiently than otherwise possible.

A preferred embodiment of the present invention contemplates using parallel processing for certain aspects of the weak methods 1506 to achieve great performance gains. This is accomplished by the use of random numbers, as discussed below.

A preferred embodiment of the present invention contemplates the use of "pseudo-random" number generators, although true random number generators can also be used. Generators of pseudo-random numbers can normally be initialized with different "seed" values. Each distinct "seed" value normally produces a distinct sequence of pseudo-random numbers.

As indicated above, when the present invention is run in an exhaustive mode, each pass through the weak methods 1506 and/or strong methods 1512 begins with a new starting point (that is, with different values for the decision variables). The sequence of these starting points will depend upon the random values generated by the pseudo-random number generator, and thus on the seed value inserted therein. Thus, it can be seen that if N different instances of the weak methods 1506 and/or strong methods 1512 were running at the same time each using N distinct streams of pseudo-random number sequences, then each instance would be searching the "space" of the combined objective function according to a different "schedule." That is, each instance would test every point in the search space eventually, but each would test the points in a different order.

By using the scheme noted above, it can be seen that it would be advantageous to have each of the N instances evaluating points simultaneously each using a different sequence of random numbers (and thus searching according to N different schedules). In this way, an improvement would occur, on the average, N times sooner than would have occurred if only one instance was conducting the search. If all N processes were then informed of the improvement (and each instance were running on a separate CPU), then the next one would occur, on the average, N times sooner. Naturally, there is some overhead associated with transmitting the improvements to all of the parallel processes, but this overhead can be made less significant by enforcing a "threshold" for improvements to be communicated. That is, very slight improvements may not be broadcast to other instances, to keep down the communication overhead.

C. Strong Methods

A more detailed discussion of the strong methods 1512 used in a preferred embodiment of the present invention will now be described. As indicated above, the basic premise behind the strong methods 1512 is that any direction can be chosen (that is, any of the decision variables of the function can be varied), without encountering much discontinuity in the value of the function. Thus, functions having discrete variables, by definition, cannot be acted upon properly by strong methods 1512 of the present invention. The present invention contemplates that, for discrete variables whose range of variation is relatively large, the strong methods described could be applied effectively.

More specifically, in a preferred embodiment of the present invention, the strong methods 1512 use a combination of constrained and unconstrained techniques in attempting to achieve an optimal solution. When the result of the combined objective function (that is, the point generated by the combined objective function) is within some "designated distance" from a constraint, the constraint is said to be "active", and the techniques used in manipulating the decision variables of the combined objective function are "constrained." This "designated distance" is referred to as $C_\epsilon$.

Referring first to FIG. 15, an overview explanation of the Strong methods 1512 will now be set forth. When the strong methods 1512 are executed, the combined objective function will contain scrub values for the decision variables as set either by init numeric 1502 or block 1524 (change variable values). As indicated above, if the values of the decision variables of the combined objective function result in a point which is within $C_\epsilon$ of a constraint boundary (that is, a boundary of a constraint function), then the constraint will become an active constraint. For example, if a constraint (that is, a target) is $X>2$ and $C_\epsilon=3$, then if X (a decision variable of the combined objective function) has a value between $-1$ and 5, the constraint $X>2$ is said to be active.

If there are no active constraints, than the searching technique used will be "unconstrained." More specifically, in a preferred embodiment of the present invention, the Polak Ribiere technique of searching is followed. This technique involves following the combined objective function in the direction of its gradient, after modifying that gradient to reflect previous gradients. The Polak Ribiere technique is a well known technique, and can be obtained from such publications as "Numerical Recipes, The Art Of Scientific Computing", by Press, Flanner, Tellosky and Veterling; Cambridge University Press (1986).

In addition to following the gradient, when there are no active constraints, the same type of penalty function is used as that described in the weak methods 1506 above. However, when used in the strong methods 1512, the penalty factor does not start out nearly as high, nor is it ever lowered. In addition, historical information relating to the way the gradient previously behaved is also calculated in determining the action in which to go. Use of this historical information is part of the Polak Ribiere technique described above.

As indicated above, if the current point is within $C_\epsilon$ of a constraint, then that constraint becomes active, and, if all constraints are either active or satisfied, the unconstrained techniques are no longer used. In essence, this means that the direction of search is then going to be affected by the active constraints. More specifically, the direction, which was initially simply the gradient of the combined objective function, is somewhat changed so that travel in that direction will parallel the active constraint boundar(y)/(ies). This constrained technique is referred to as a reduced gradient technique. In this technique, the gradients of both the combined objective function and the constraint functions are taken into account.

Using the above example to illustrate the effect of a constraint becoming active, if a decision variable X of the combined objective function becomes 4.5, then the constraint will become active. This will cause the direction of search to be such that the value of 4.5 (or greater, as discussed below) for X is maintained, so long as the constraint remains active. Components of the gradient that do not which relate to active constraints continue to point in the direction of improvement of the combined objective function. In this way, those constraint functions that are nearest to their boundaries (that is, those constraints that are active) will each be held at a constant distance from their targets, while other the values of other constraint functions are free to vary, as a search in the direction of the improved combined objective is pursued.

The reduced gradient concept described above prevents the combined objective function from running through constraint boundaries, which would inhibit the maintenance of feasibility. It has been found that better results are usually obtained from using a reduced gradient method which parallels the constraint boundaries as opposed to allowing the combined objective function to proceed into the constraint boundaries. Thus, constraints are followed as much as possible in an attempt to lead the search of the combined objective function to a local optimum.

To promote the strong methods 1512 to more quickly yield a local optimum, the value of $C_\epsilon$ is steadily decreased. This allows constraints to become (or remain) active only if they are increasingly close to the current point. Again, using the above example, if X has a value of 4.5 and $C_\epsilon$ decreases to 2, then X>2 will no longer be an active constraint, and X will no longer be bound to move parallel to the constraint. Instead, it will instead move in accordance with the gradient of the combined objective function. Any other decision variables within $C_\epsilon$ of their associated constraints will continue to move parallel to those constraints. If there are no active constraints at all, then the Polak Ribiere technique will be employed.

Continuing the above example, if there are any over-active constraints whatsoever, then the Polak Ribiere technique will also be used. (An over-active constraint is one where the value of the decision variable is out of the range of $C_\epsilon$ on the infeasible side. In the above example, where $C_\epsilon=3$, such a value would be where X=−7).

The space that the combined objective function can maneuver in is called the "reduced space." In order that the combined objective function be optimized, it may be necessary to remove constraints from the active list. This can occur because there are be too many active constraints for the number of independent variables, causing the gradient to be reduced to no net change, even though some change might lead to a better score. In a preferred embodiment, the present invention selects which active constraints to deactivate based upon the following heuristic: The active constraints whose gradients have the largest scaler products with the gradient of the combined objective function (that is, the constraints are oriented most closely in the same direction) are dropped form the set of active constraints until there are no longer too many active constraints.

If there is no direction in which any improvement in the score would result (that is, the gradient of the combined objective function is 0) or if the combined objective function cannot move and no constraints can be made inactive, then $C_\epsilon$ is reduced. After $C_\epsilon$ is reduced, the present invention again tries to move and to obtain improvement. When the value of $C_\epsilon$ has been reduced so that it is less than some set value, then at least a local optimum is presumed to have been found, and the strong methods 1512 are exited. If they are entered again (as when running an exhaustive search), different initial values for the decision variables will be used. Therefore, the starting point will be different. In this way different local optima will be detected, resulting eventually in the global optimum.

In a preferred embodiment of the present invention, when active constraints are being parallelled by the reduced gradient of the combined objective function, heuristic information is used to determine the local linearity of the constraints. If it is believed that the constraint is linear, then a new point is moved to based upon this linearity. If the constraint is non-linear, then a non-linear model of the constraint is developed, and the combined objective function is moved in accordance with that model. This technique causes the reduced gradient of the combined objective function to "lift" itself in some direction in anticipation of the constraint curving to some degree. In this way, once a curvature (that is, non-linearity) of the constraints (or a portion thereof) is detected, the active constraints are more accurately parallelled without having to reduce the distance of search in the direction of the reduced gradient of the combined objective function. Thus, both linear and non-linear models are used. In essence, this lift factor allows non-linear problems to be handled using a local linear model.

It should be noted that when a problem is empirically found to be totally linear (that is, the forward difference and central difference derivatives relating to the pure objective function are identical, and for each of the constraint functions, the forward difference derivatives and central difference derivatives are found to be identical), the present invention uses the numerical derivatives as coefficients in an initial matrix for a round of linear optimization. This ensures that for purely linear problems, a linear method will be used. After using linear optimization once, however, the other techniques will be used until the stopping conditions are met. This ensures a "best balanced" solution even where the linear technique fails to yield a feasible point.

Figure 19:
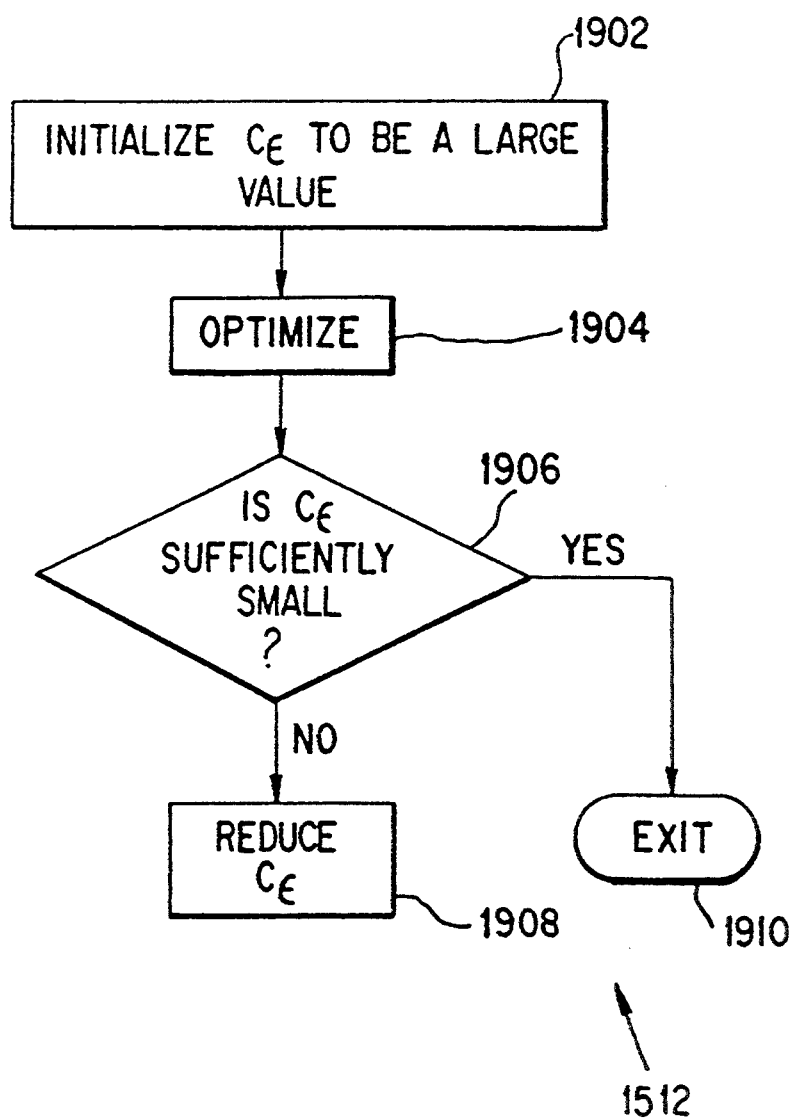
FIG. 19 is a diagram of the operation of the strong methods.

The techniques used in the strong methods 1512 will now be explained with reference to FIG. 19. In the first stage of the strong methods 1512, the value of $C_\epsilon$ is initialized to be a large value, as indicated by block 1902. In a preferred embodiment of the present invention, the value of $C_\epsilon$ is initialized at 10, and eventually decreased to $10^{-6}$, but other bounds are contemplated by the present invention as well. Other bounds would be based on such factors as differences in floating point precision, desired precision of results, etc. Again, the reason that $C_\epsilon$ is initialized to a large value is that the strong methods 1512 are iterative. Many constraints are active initially, and as $C_\epsilon$ decreases, only the constraints closest to the current point are active.

After the initialization of $C_\epsilon$, the values of decision variables with respect to the combined objective function are optimized, as indicated by block 1904. In general, this means that gradient information relating to the current point is used to decide the best direction in which to move, and to invoke different methods to modify that gradient. This occurs iteratively, until there is no improvement to the current point (either by virtue of the fact that no moves yield improvement, or because it has been determined that all of the gradients of combined objective function are zero). This will be explained in greater detail below with reference to FIG. 20.

After the combined objective function is optimized as indicated by block 1904, $C_\epsilon$ is tested to see if it is "sufficiently small", as indicated by decision block 1906. If it is, then the strong methods 1512 are terminated. If it is not, then $C_\epsilon$ is reduced further as indicated by block 1908, and the optimization as indicated by block 1904 is again performed. In a preferred embodiment of the present invention, "sufficiently small" is scaled to the available precision in the floating point calculations of the environment in which the invention is implemented. Also in a preferred embodiment, $C_\epsilon$ is reduced by a factor of 10.0 on each iteration.

A more detailed explanation of the optimization indicated by block 1904 is set forth below, with reference to FIG. 20.

Figure 20:
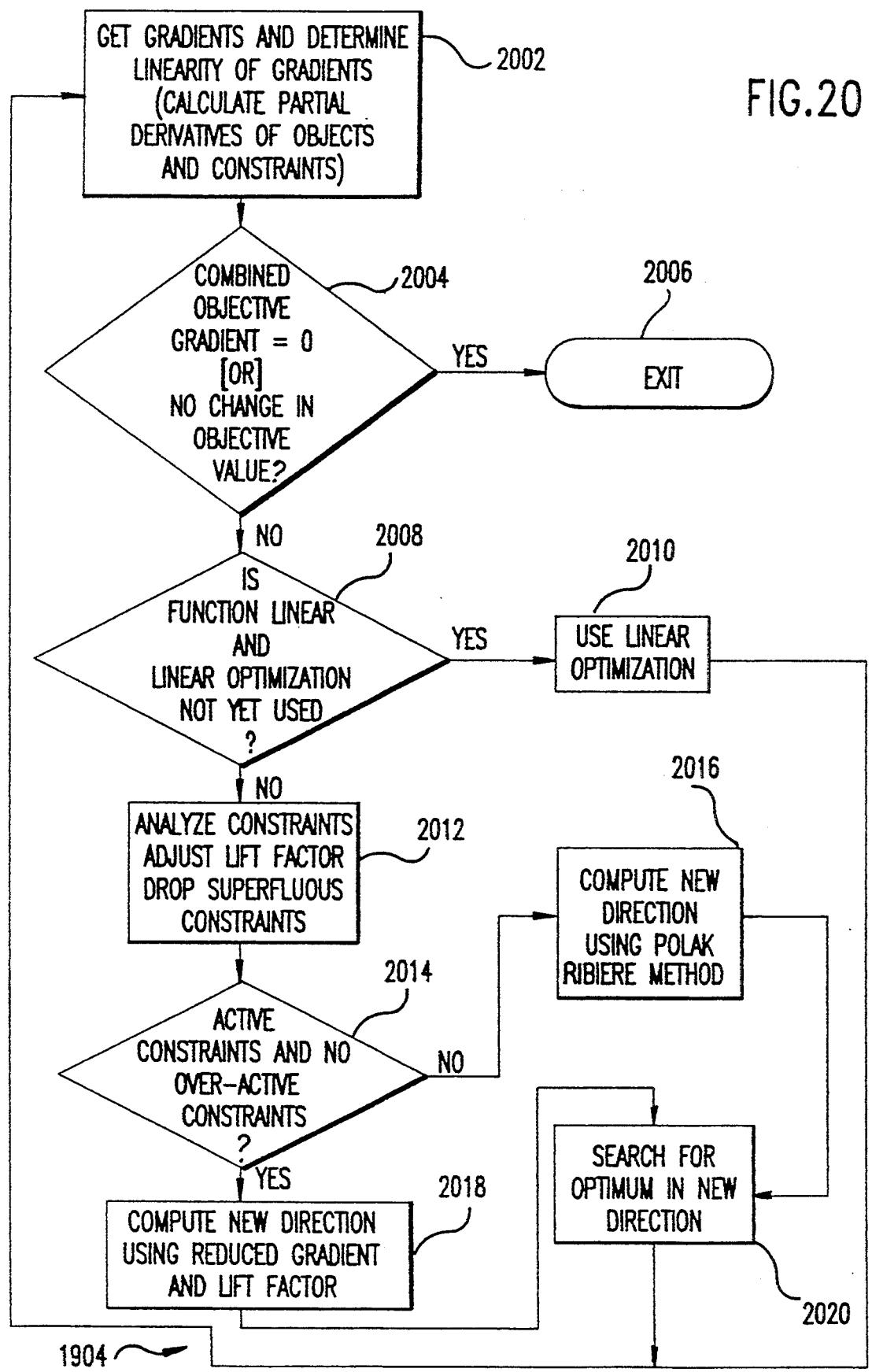
FIG. 20 is an expanded diagram of the operation of the optimization of FIG. 19.

As indicated by block 2002 in FIG. 20, the gradients of the combined objective function and of each of the constraint functions are obtained. This is done by calculating a numerical derivative of both the combined objective function with respect to all of the decision variables, and of each constraint function with respect to each decision variable. As noted above, when there are active constraints, the gradients of both the combined objective function and the constraint functions are utilized.

In a preferred embodiment of the present invention, central difference numeric differentiation is used in determining the gradients. This enables the present invention to determine the degree of curvature of the derivative itself (and thus the linearity of the gradients as indicated in block 2002). If the derivative of the pure form of the objective function, and all of the objectives and constraints is non-curved, then it is assumed (at least initially) that the problem is linear. This linearity determination is used to determine whether a linear or non-linear approach should be used.

After the gradients have been obtained and their linearity determined, a test is conducted to determine if the combined objective gradient is zero, or if there has been no change in the score from moving in any direction (that is, the combined objective function is "stuck" because of surrounding constraints). This is indicated by decision block 2004. If either of the above is true, then the current pass of the optimization is exited, and $C_\epsilon$ is decremented (as indicated above).

If the current iteration of the strong methods 1512 is not terminated as indicated above, then the present invention tests if the pure objective function gradient and all of the constraint function gradients are linear, and if a linear technique (that is, linear optimization) has not yet been used. This is indicated by decision block 2008. If the result is "yes", then linear optimization is invoked, as indicated by block 2010. Once this is completed, the next iteration of the optimization begins starting again at block 2002. In a preferred embodiment of the present invention, the two phase Simplex technique is used as the linear optimization technique, using as coefficients the values of the gradients computed for the derivatives noted above. Of course, it should be understood that other linear optimization techniques could also be used.

If the combined objective function is non-linear, then non-linear techniques will be used. More specifically, the constraints are analyzed to determine which constraints are active constraints, as indicated by block 2012. Also, as indicated by block 2012, the lift factor is adjusted. The lift factor is reduced when successive iterations yield different active constraints, and the lift factor is increased when the same constraints are active on successive iterations.

The present invention also contemplates other techniques to adjust the lift factor. For example, rather than using the reoccurrence of active constraints to adjust the lift factor, the curvature information from the numerical derivatives might be used.

As indicated above regarding a preferred embodiment of the present invention, if there are more active constraints than decision variables, the active constraints that are considered superfluous are dropped until there are the same number of constraints as decision variables. This would also occur regarding block 2012. Also as indicated above, those which would tend to drive the point in the same direction as the gradient of the combined objective function are dropped. This is specifically accomplished by dropping the constraints whose gradients have the highest scaler products with the combined objective function's gradient.

After the lift factor is adjusted and constraints analyzed, then a determination is made regarding the proximity of the constraint boundaries. More specifically, a determination is made regarding whether 1) there are any active constraints, and 2) there are no over-active constraints, as indicated by decision block 2014. If either 1) or 2) above are "no", then the new direction is computed using the Polak Ribiere method, as indicated by block 2016. As described above, this is an unconstrained method.

If there are some active constraints and no over-active constraints, then the reduced gradient with the lift factor is used to compute a new direction for searching the combined objective function, as described above. Again, when a constraint becomes active, the gradient of the combined objective function is changed (or "reduced") such that the search of combined objective function will move in parallel with the active constraint. In addition, the lift factor will also be taken into account when computing the new direction. In a preferred embodiment of the present invention, if the same set of active constraints continues to appear in consecutive iterations, it is likely that the constraints are curved. Consequently, the lift factor is increased. If the set of active constraints continues to change, then the lift factor will be lowered, since it is likely that there is little curvature in the constraints. By anticipating the curvature of the constraints, much searching time is saved.

The present invention also contemplates other techniques for following non-linearities of the constraint functions. For example, one alternative allows the combined objective function to move the point in the direction of the reduced gradient (without lifting), even though the move is taking the point outside of the constraints. Then, subsequent operations move the point back into the feasible region prior to making any other moves.

After the new direction is calculated using either the Polak Ribiere technique 2016 or using the reduced gradient and lift factor 2018, then a more optimal (that is, a better) point is searched for in the new direction, as indicated by block 2020. In a preferred embodiment of the present invention, the search that is done is a line search. This line search is basically the same as that described for the weak methods 1506 described above, except that the log of the penalty factor is not taken into account. In addition, the line search used here moves from the current point in the new direction (or delta) rather calculating the delta from the last point and the current one.

After movement in the new direction has occurred as indicated by block 2020, then the gradients are again obtained as per block 2002, and the optimization 1904 will repeat itself until the conditions of decision block 2004 cause the current iteration through the strong methods 1512 to terminate.

A. Structure of the PSE

Structural organization of the modules that make up the PSE 204 will be described below.

Figure 21:
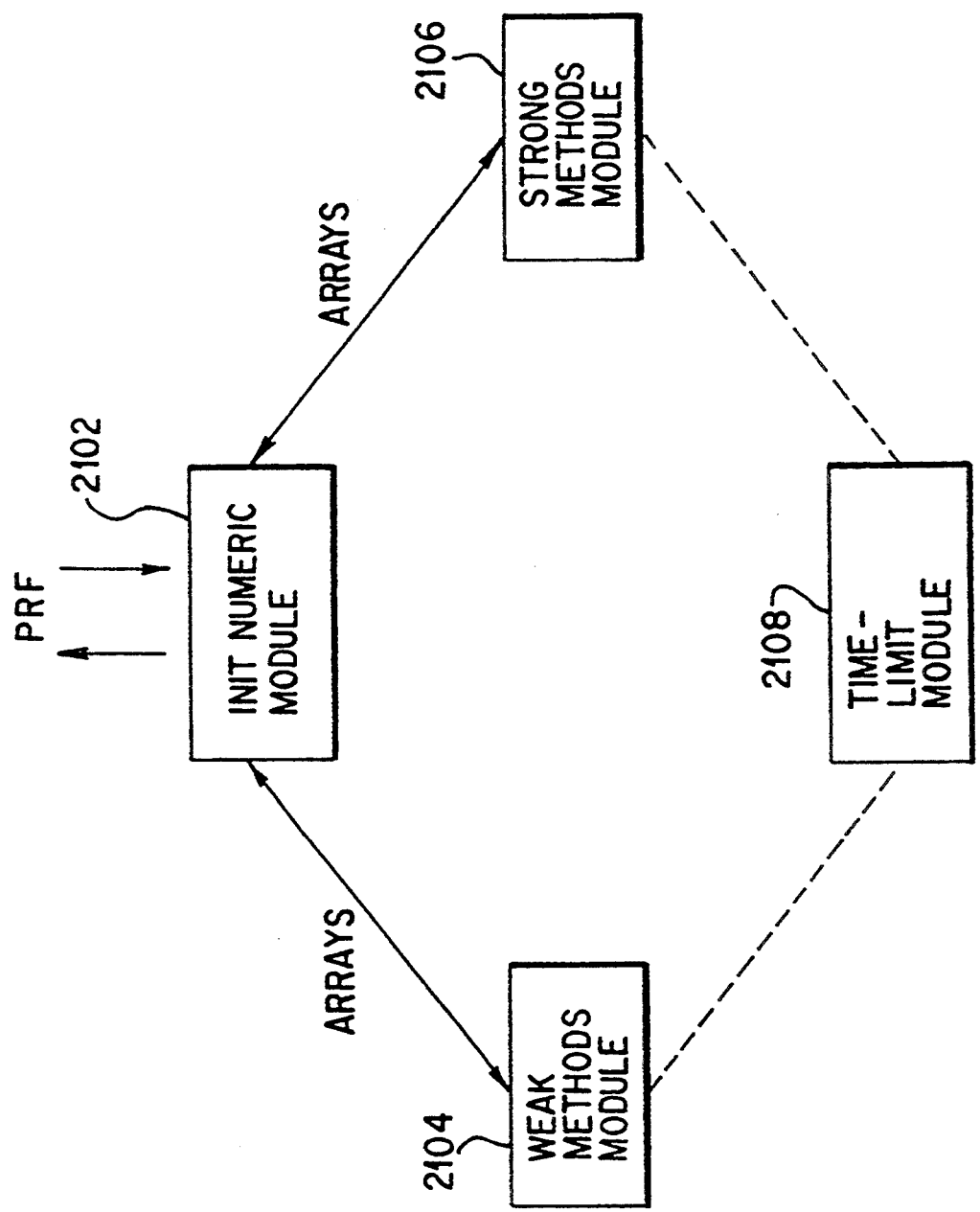
FIG. 21 shows the structure of the PSE.

Referring to FIG. 21, the init_numeric module 2102 is the interface module between the PSE 204 and the PRF 208. In effect, this module receives all of the decision variables, constraint functions, objective functions and dependency information, from the PRF 208. The init_numeric module 2102 receives the information sent to it, and creates the mapping between the PRF 208 and PSE 204, allowing numeric and symbolic variables to be passed freely between the two. Also, the init_numeric module 2102 creates the combined objective function, and constraint functions for use by subsequent modules of the PSE 204. This information received and created by the init_numeric module 2102 is passed back and forth to and from the strong methods module 2106 and weak methods module 2104, so that these modules have access to this data and can manipulate the information appropriately.

The weak methods module 2104 is the module which executes the weak methods 1506 discussed above. Similarly, the strong methods module 2106 executes the strong methods 1512 discussed above. Both the weak methods module 2104 and strong methods module 2106 are responsive to a time limit module 2108. This time limit module 2108 receives input from the user indicating the amount of time the user wishes the present invention to execute. Thus, if the present invention is exhaustively searching, the user may wish that the present invention operate for only ten minutes. In that case, when the time limit module 2108 signals that this time has expired, the program will terminate regardless of whether the weak methods module 2104 or strong methods module 2106 is being executed at that time. Another use of the time limit module 2108 is to terminate the search when no improvement has occurred within a certain threshold of time, also provided by the user. That is, the user may specify that the search will stop if no advances are made in the most recent N seconds.

Figure 22:
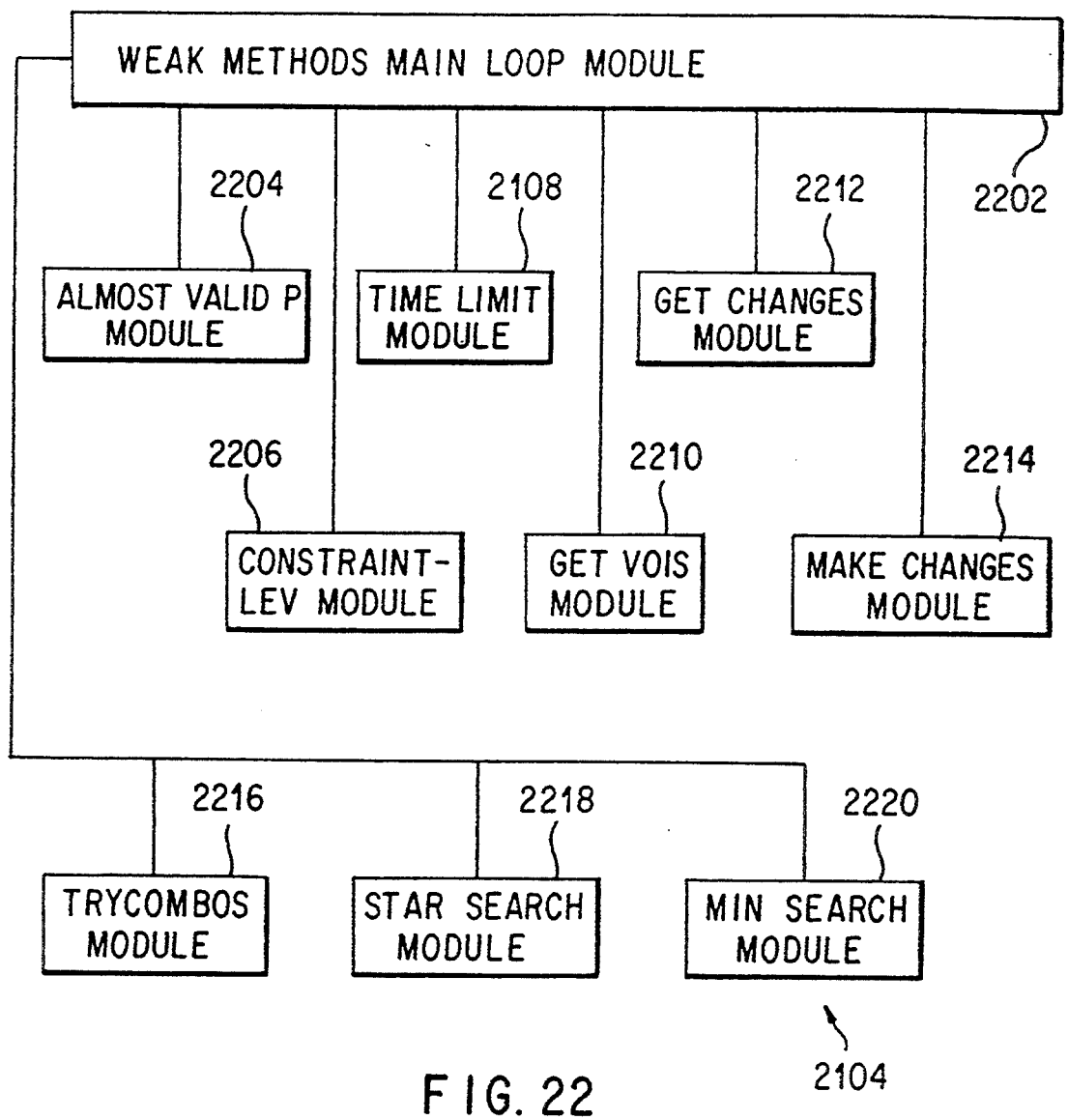
FIG. 22 shows the structure of the weak methods.

The weak methods module 2104 will now be described in more detail with reference to FIG. 22. The weak methods module 2104 includes several sub-modules, including a weak methods main loop module 2202. This module 2202 serves in part as a control loop for the other sub-modules.

The almostvalidp module 2204 has two major functions. One function is that it evaluates the current point of the combined objective function, and returns the score for that point. In addition, it also indicates whether the current point is within some threshold of being valid. Thus, it determines whether a point is "nearly feasible," as discussed with reference to FIG. 16 and decision block 1614.

The constraint-lev module 2206 modifies the current penalty factor, and recalculates the score of the current best point based on the new penalty factor. Giving the penalty factor a new value is indicated above with reference to FIG. 16, and boxes 1624 and 1630.

The timelimit module 2108 is described above with reference to FIG. 22. It is inserted in this Figure to indicate that it is called from the weak methods in order to return the status of the timer. In addition, when the weak methods 1510 are to stop early, as indicated by decision block 1754 at FIG. 17b, it is also used to determined whether the weak methods 1510 have been running within a certain amount of time without finding any improvement to the score. In a preferred embodiment of the present invention, this is one of the criteria for stopping the weak methods 1510 early.

As indicated above, the basic idea behind the weak methods 1506 is to generate a point, test it for improvement compared with previous scores, generate another point according to the original of the score just obtained, and continue with this sequence. In a preferred embodiment of the present invention, this basic sequence is accomplished by the getvois module 2210, get changes module 2212, and make changes module 2214. The getvois module 2210 finds those constraints which are farthest from being satisfied. These variables are denoted as "the variables of interest" above, as discussed in conjunction with block 1622, and with reference to FIG. 18, block 1802.

The getchanges submodule 2212 is the module which selects which of the variables of interest will be manipulated. As indicated above, not all variables of interest are manipulated during each pass through the weak methods 1506.

Make changes module 2214 actually makes the changes to the values of the variables of interest as chosen by the get changes module 2212.

The trycombos module 2216 determines which of the constraints appears hardest to satisfy, which variable assignments of values to variables are least limiting, and tries to satisfy those constraints with those assignments. In a preferred embodiment, the trycombos module 2216 is used before any other module which would change the current point.

The star search module 2218 is the module which executes the star search described with reference to FIG. 17a above. The min search module 2220 is the module which executes the line search for the weak methods 1506, as described above with reference to block 1626 in FIG. 16.

Figure 23:
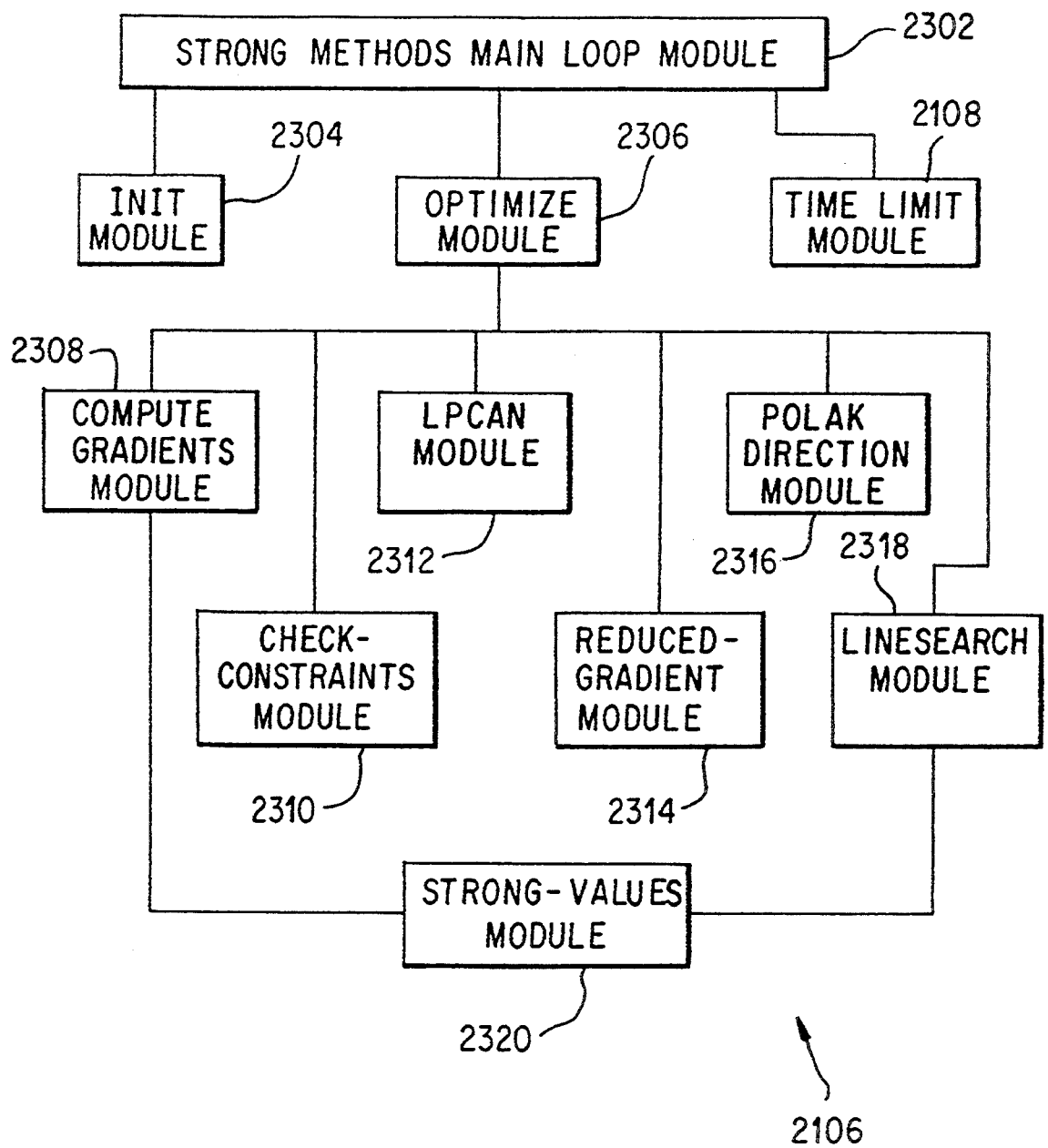
FIG. 23 shows the structure of the strong methods.

The strong methods module 2106 will now be discussed in greater detail with respect to FIG. 23. Referring to FIG. 23, there is a strong methods main loop module 2302 which directs the control of the other modules within the strong methods module 2106. These other modules controlled by strong methods main loop module 2302 will be discussed below.

The init_module 2304 initializes certain arrays and values to be used in the strong methods 1512. More specifically, certain assays for manipulating the objective function gradients and constrained function gradients are created, and $C_\epsilon$ is initialized to a very large value, as indicated in FIG. 19, block 1902.

The primary module within the strong methods 1512 is the optimize module 2306. This module 2306, in conjunction with other modules which it uses, attempts to find an optimum point (that is, optimize the score) by repeatedly generating a new direction in which to search, and then searching in that direction until no improvements over previous scores are obtained. This optimize module 2306 receives decision variables from the strong methods main loop module 2302, and outputs to the strong methods main loop module 2302 the value for the decision variables which it found to achieve the best score.

The modules used by the optimize module 2306 will now be discussed below. The compute gradients module 2308 computes the gradients of the functions used in the problem, such as the pure objective function, combined objective function, and constraint functions. This module 2308 uses a central difference version of numerical derivative to compute the gradient, in that it samples a point slightly in front of and slightly behind the current value for every variable.

The check-constraints module 2310 determines which constraints are active constraints. In addition, it also adjusts the lift factor, using information relating to previously active constraints. Further, it determines whether there are too many active constraints. If so, it reduces the set of active constraints. All of this is discussed above with regard to block 2012 of FIG. 20.

The lpcan module 2312 implements the linear optimization that is used, as discussed with regard to block 2010 of FIG. 20. As stated there above, in a preferred embodiment of the present invention, the linear optimization technique used is called two phase Simplex.

The reduced gradient module 2314 is the module which modifies the gradient when the function is within $C_\epsilon$ of a constraint. Thus, when the constraint becomes an active constraint, the reduced gradient module 2314 modifies the gradient so that the direction of search will be parallel to the constraint boundaries. This is discussed with respect to block 2018 of FIG. 20.

The Polak Ribiere direction module 2316 implements the Polak Ribiere method discussed above regarding block 2016 of FIG. 20.

The line search module 2318 implements the line search used in the strong methods 1512 as discussed above regarding block 2020 of FIG. 20. Also as noted above, the line search used for the strong methods 1512 is somewhat different from that used for the weak methods 1506. Thus, line search module 2318 performs a slightly different line search than that perform by the min search module 2220 for the weak methods 1506.

Both the compute gradients module 2308 and the line search module 2318 use the strong-values module 2320. This module evaluates a point regarding its source.

As with the weak methods module, Timelimit module 2108 is inserted in this Figure to indicate that it is called from the strong methods in order to return the status of the timer. It should be noted that the timelimit module 2108 is also called, with a special parameter, when an improvement has been made to the current position, as that event resets the "time since last improvement" timer.

Of course, it should be understood that the present invention contemplates other configurations of modules, and is not limited to the specific structural implementation noted above.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

What we claim is:

1. A machine system for solving an optimization or constraint satisfaction problem, comprising:
   a digital computer, said digital computer comprising:
   one or more memory devices for storing weak and strong problem solving methods, decision variables having decision variable values, and heuristics;
   first means for utilizing said weak and strong problem solving methods to manipulate the decision variable values to find at least a best balanced solution to the problem; and
   second means for utilizing said heuristics to dynamically alternate between said weak and strong problem solving methods.

2. The machine system of claim 1, wherein said weak methods, used by said first means for utilizing, comprise the usage of at least one of the following techniques: generation of a new point, star search, line search, and trycombos search.

3. The machine system of claim 1, wherein said strong methods, used by said first means for utilizing, further comprise usage of at least one of the following techniques: simplex, unconstrained gradient, and constrained gradient.

4. The machine system of claim 1, further comprising means for generating N instances of the system for solving a problem, working in parallel on M processors, wherein each instance has a schedule to search a search space.

5. The machine system of claim 1, wherein said weak methods, used by said first means for utilizing, further comprise a penalty factor which permits constraints to be combined with a pure objective function, said weak methods also comprising means for finding a maximum/minimum penalty factor for use in said constraints combined with said pure objective function.

6. The machine system of claim 1, wherein said weak problem solving methods, used by said first means for utilizing, further comprise means for maintaining a balanced distribution of M values over N variables where N is less than, greater than, or equal to M.

7. The machine system of claim 1, wherein said weak problem solving methods, used by said first means for utilizing, further comprise means for generating new trial values within the full range for symbolic, integer and real valued decision variables.

8. The machine system of claim 1, wherein said weak problem solving methods, used by said first means for utilizing, further comprise means for dynamically determining and adjusting a best range of variation for decision variables.

9. The machine system of claim 1, wherein said weak problem solving methods, used by said first means for utilizing, further comprise means for using two local optima to move along a crease valley during optimization.

10. The machine system of claim 1, wherein said weak problem solving methods, used by said first means for utilizing, alternate between using star search trycombos, variables of interest and line search techniques and wherein said strong problem solving methods alternate between using reduced gradient, Polak Ribiere and linear optimization techniques.

11. The machine system of claim 1, wherein said weak problem solving methods, used by said first means for utilizing, further comprise means for using variables of interest in generating new points.

12. A machine system for solving an optimization or constraint satisfaction problem, comprising:
   a digital computer for receiving and manipulating information in the form of user-defined targets and/or objectives of the problem, said digital computer comprising:
   one or more memory devices for storing said user-defined targets and/or objectives,
   a pure objective function and constraint functions representative of said user-defined targets and/or objectives, said pure objective function and constraint functions containing decision variables capable of accepting a value;
   first means for performing a test on said pure objective function and constraint functions to determine local linearity; and
   second means using linear techniques for manipulating said values of said decision variables to attempt to achieve said targets and/or objectives when the results of said test indicate local linearity, and using non-linear techniques for manipulating said values when the results of said test indicate local non-linearity.

13. A machine system for solving an optimization or constraint satisfaction problem, comprising:
- a digital computer for receiving and manipulating information in the form of user-defined targets and/or objectives of the problem, said digital computer comprising:
  - one or more memory devices for storing said user-defined targets and/or objectives,
  - a pure objective function and constraint functions representative of said user-defined targets and/or objectives, said pure objective function and said constraint functions containing functions of decision variables capable of accepting a value;
  - first means for determining the proximity of constraint boundaries; and
  - second means for using a combination of constrained and unconstrained optimization techniques for manipulating said values of said decision variables to attempt to achieve said targets and/or objectives, based on the proximity of constraint boundaries.

14. A method for operating a digital computer to solve an optimization or constraint satisfaction problem, the digital computer having an electronic memory device for storing said problem, comprising the steps of:
  (1) storing, in the electronic memory device, weak and strong problem solving methods, decision variables having decision variable values, and heuristics;
  (2) utilizing said weak and strong problem solving methods to manipulate the decision variable values to find at least a best balanced solution to the problem; and
  (3) using said heuristics for dynamically interleaving alternating between said weak and strong problem solving methods.

15. The method of claim 14, wherein said weak problem solving methods of said step (2) comprise the step of maintaining a balanced distribution of M values over N variables where N is less than, greater than, or equal to M.

16. The method of claim 14, wherein said weak problem solving methods of said step (2) comprise the step of generating new trial values within the full range for symbolic, integer and real valued decision variables.

17. The method of claim 14, wherein said weak problem solving methods of said step (2) comprise the step of dynamically determining and adjusting a best range of variation for decision variables.

18. The method of claim 14, wherein said weak problem solving methods of said step (2) comprise the step of using two local optima to move along a crease valley during optimization.

19. The method of claim 14, wherein said weak and strong problem solving methods of said step (2) comprise the step of combining a plurality of objective functions in a scheme which infers weight and scale factors for a combined objective function.

20. The method of claim 14, wherein said weak problem solving methods of said step (2) comprise the step of using variables of interest in generating new points.

21. The method of claim 14, wherein said weak methods comprise the step of using at least one of the following techniques: generation of a new point, star search, line search, and trycombos search.

22. The method of claim 14, wherein said strong methods comprise the step of using at least one of the following techniques: simplex, unconstrained gradient, and constrained gradient.

23. The method of claim 14, further comprising the step of generating N instances of the method for solving a problem, working in parallel on N processors, wherein each instance has a schedule to search a search space.

24. The method of claim 14, wherein said weak methods comprise the step of using a penalty factor permitting constraints to be combined with a pure objective function, said weak methods also comprising the step of finding a maximum/minimum penalty factor for use in said constraints combined with said pure objective function.

25. A method for operating a digital computer to solve an optimization or constraint satisfaction problem, wherein the problem comprises a set of constraint and/or objective functions, said digital computer having an electronic memory device for storing said problem, comprising the steps of:
  (1) creating a pure objective function and constraint functions representative of user-defined targets and/or objectives of the problem in the electronic memory device, said pure objective function and said constraint functions containing functions of decision variables capable of accepting a value;
  (2) determining the proximity of constraint boundaries; and
  (3) using a combination of constrained and unconstrained optimization techniques for manipulating said values of said decision variables to attempt to achieve said targets and/or objectives, based on the proximity of constraint boundaries.

26. The method of claim 25, wherein said step (3) further comprises the step of alternating between using reduced gradient, Polak Ribiere and linear optimization techniques.

27. The method of claim 25, wherein said step (3) comprises the step of empirically determining when a problem is locally linear, and using gradient information as coefficients for a phase of linear optimization.

28. The method of claim 25, wherein said step (3) comprises the step of maintaining a measure of the degree of non-linearity of said constraint boundaries and using said measure to manipulate said values of said decision variables to keep the search within the boundaries of the constraints.

29. The method of claim 25, comprising the step of employing said constrained and unconstrained optimization techniques so that solutions to the problem will approach feasibility if feasibility is not possible or will maintain feasibility if feasible points are found.

30. A device for representing and solving problems in the form of objects, attributes and constructs, comprising:
  - a computer-readable medium for use with a digital computer;
  - a first module for parsing and translating said constructs into a machine evaluable form;
  - a second module for automatically defining a tabular representation where said tabular representation contains cells corresponding to object-attribute pairs;
  - a third module for automatically defining dependencies from said machine evaluable form;
  - a fourth module for automatically attaching said constructs to object-attribute pairs and for attaching said dependencies;

a fifth module for allowing said object-attribute pairs to inherit said constructs from other object-attribute pairs;

a sixth module for automatically operating on related object-attribute pairs as a function of said defined constructs and dependencies;

a seventh module for automatically utilizing weak and strong problem solving methods in conjunction with said dependencies and chosen values of said object-attribute pairs to find at least a best balanced solution to the problem; and an eighth module for using heuristics for dynamically alternating between said weak and strong methods;

said computer-readable medium for storing computer program logic representative of said objects, attributes and constructs and of said modules.

* * * * *